(12) United States Patent
Russ et al.

(10) Patent No.: US 10,412,439 B2
(45) Date of Patent: Sep. 10, 2019

(54) PVR CHANNEL AND PVR IPG INFORMATION

(75) Inventors: Samuel H. Russ, Lawrenceville, GA (US); Michael A. Gaul, Lawrenceville, GA (US); Dariusz S. Kaminski, Duluth, GA (US)

(73) Assignee: Thomson Licensing, Cesson-Sevigne (FR)

( * ) Notice: Subject to any disclaimer, the term of this patent is extended or adjusted under 35 U.S.C. 154(b) by 297 days.

(21) Appl. No.: 13/471,682

(22) Filed: May 15, 2012

(65) Prior Publication Data

US 2012/0227072 A1    Sep. 6, 2012

Related U.S. Application Data

(62) Division of application No. 10/253,115, filed on Sep. 24, 2002, now Pat. No. 8,181,205.

(51) Int. Cl.
*H04N 5/445* (2011.01)
*G06F 3/00* (2006.01)
(Continued)

(52) U.S. Cl.
CPC ....... *H04N 21/4147* (2013.01); *G11B 27/105* (2013.01); *G11B 27/34* (2013.01); *H04N 5/44543* (2013.01); *H04N 5/76* (2013.01); *H04N 7/17318* (2013.01); *H04N 21/26283* (2013.01); *H04N 21/42204* (2013.01); *H04N 21/4334* (2013.01); *H04N 21/4438* (2013.01); *H04N 21/4755* (2013.01); *H04N 21/47214* (2013.01); *H04N 21/4821* (2013.01); *H04N 21/4828* (2013.01); *H04N 21/84* (2013.01); *G11B 2220/20* (2013.01); *H04N 5/765* (2013.01); *H04N 5/775* (2013.01);
(Continued)

(58) Field of Classification Search
CPC ............. H04N 5/44543; H04N 21/482; H04N 21/4532; H04N 21/84; H04N 7/163
USPC ................................................. 725/45–47, 58
See application file for complete search history.

(56) References Cited

U.S. PATENT DOCUMENTS 4,393,502 A    7/1983  Tanaka et al.
4,706,121 A   11/1987  Young
(Continued)

FOREIGN PATENT DOCUMENTS

CA    2469517    8/2011
CA    2571256   12/2011
(Continued)

OTHER PUBLICATIONS

Canadian Office Action dated Oct. 19, 2010 cited in Application No. 2,469,554, 5 pgs.
(Continued)

*Primary Examiner* — Jason P Salce
(74) *Attorney, Agent, or Firm* — Vincent E. Duffy

(57) ABSTRACT

A system that maps media content information to an interactive program guide displayed on a screen includes, among other things, a memory with logic, and a processor configured with the logic to display at least one personal video recording display channel in the interactive program guide. The processor is further preferably configured with the logic to display media content instance listings in the personal video recording display channel for corresponding media content instance recordings.

6 Claims, 41 Drawing Sheets

(51) Int. Cl.

| | | |
|---|---|---|
| G06F 13/00 | (2006.01) | |
| H04N 21/4147 | (2011.01) | |
| G11B 27/10 | (2006.01) | |
| G11B 27/34 | (2006.01) | |
| H04N 5/76 | (2006.01) | |
| H04N 7/173 | (2011.01) | |
| H04N 21/262 | (2011.01) | |
| H04N 21/422 | (2011.01) | |
| H04N 21/433 | (2011.01) | |
| H04N 21/443 | (2011.01) | |
| H04N 21/472 | (2011.01) | |
| H04N 21/475 | (2011.01) | |
| H04N 21/482 | (2011.01) | |
| H04N 21/84 | (2011.01) | |
| H04N 5/765 | (2006.01) | |
| H04N 5/775 | (2006.01) | |
| H04N 5/781 | (2006.01) | |
| H04N 5/85 | (2006.01) | |
| H04N 9/804 | (2006.01) | |

(52) U.S. Cl.
CPC ............... *H04N 5/781* (2013.01); *H04N 5/85* (2013.01); *H04N 9/8042* (2013.01)

(56) References Cited

U.S. PATENT DOCUMENTS

| | | |
|---|---|---|
| 4,908,713 A | 3/1990 | Levine |
| 4,963,994 A | 10/1990 | Levine |
| 5,253,066 A | 10/1993 | Vogel |
| 5,262,856 A | 11/1993 | Lippman et al. |
| 5,293,357 A | 3/1994 | Hallenbeck |
| 5,343,250 A | 8/1994 | Iwamura |
| 5,353,121 A | 10/1994 | Young et al. |
| 5,357,276 A | 10/1994 | Banker et al. |
| 5,361,173 A | 11/1994 | Ishii et al. |
| 5,371,551 A | 12/1994 | Logan et al. |
| 5,410,343 A | 4/1995 | Coddington et al. |
| 5,438,423 A | 8/1995 | Lynch et al. |
| 5,477,262 A | 12/1995 | Banker et al. |
| 5,479,268 A | 12/1995 | Young et al. |
| 5,488,409 A | 1/1996 | Yuen et al. |
| 5,508,815 A | 4/1996 | Levine |
| 5,530,754 A | 6/1996 | Garfinkle |
| 5,534,911 A | 7/1996 | Levitan |
| 5,568,272 A | 10/1996 | Levine |
| 5,600,573 A | 2/1997 | Hendricks et al. |
| 5,661,526 A | 8/1997 | Harnamoto et al. |
| 5,675,375 A | 10/1997 | Riffee |
| 5,694,176 A | 12/1997 | Bruette et al. |
| 5,701,383 A | 12/1997 | Russo et al. |
| 5,721,815 A | 2/1998 | Ottesen et al. |
| 5,724,646 A | 3/1998 | Ganek et al. |
| 5,729,280 A | 3/1998 | Inoue et al. |
| 5,790,935 A | 8/1998 | Payton |
| 5,809,204 A | 9/1998 | Young et al. |
| 5,815,204 A | 9/1998 | Ueda |
| 5,854,887 A | 12/1998 | Kindell et al. |
| 5,864,639 A | 1/1999 | Chao |
| 5,880,768 A | 3/1999 | Lemmons et al. |
| 5,889,920 A | 3/1999 | Compoint et al. |
| 5,890,169 A | 3/1999 | Wong et al. |
| 5,990,885 A | 5/1999 | Stortz |
| 5,915,068 A | 6/1999 | Levine |
| 5,963,702 A | 10/1999 | Yamashita |
| 5,974,218 A | 10/1999 | Nagasaka et al. |
| 5,978,043 A | 11/1999 | Blonstein et al. |
| 5,990,881 A | 11/1999 | Inoue |
| 5,990,975 A | 11/1999 | Nan et al. |
| 5,999,691 A | 12/1999 | Takagi et al. |
| 6,002,832 A | 12/1999 | Yoneda |
| 6,014,727 A | 1/2000 | Creemer |
| 6,018,612 A | 1/2000 | Thomason et al. |
| 6,023,720 A | 2/2000 | Aref et al. |
| 6,029,160 A | 2/2000 | Cabrera et al. |
| 6,032,180 A | 2/2000 | Nishikawa |
| 6,032,216 A | 2/2000 | Schmuck et al. |
| 6,032,219 A | 2/2000 | Robinson et al. |
| 6,052,562 A | 4/2000 | Dorenbosch |
| 6,055,314 A | 4/2000 | Spies et al. |
| 6,088,722 A | 7/2000 | Herz et al. |
| 6,094,695 A | 7/2000 | Kornher |
| RE36,801 E | 8/2000 | Logan et al. |
| 6,100,883 A | 8/2000 | Hoarty |
| 6,118,498 A | 9/2000 | Reitmeier |
| 6,118,834 A | 9/2000 | Rasanen |
| 6,151,059 A | 11/2000 | Schein et al. |
| 6,151,688 A | 11/2000 | Wipfel et al. |
| 6,163,335 A | 12/2000 | Barraclough |
| 6,167,377 A | 12/2000 | Gillick et al. |
| 6,175,871 B1 | 1/2001 | Schuster et al. |
| 6,177,931 B1 | 1/2001 | Alexander |
| 6,192,340 B1 | 2/2001 | Abecasis |
| 6,211,858 B1 | 4/2001 | Moon et al. |
| 6,216,264 B1 | 4/2001 | Maze et al. |
| 6,226,441 B1 | 5/2001 | Hartung et al. |
| 6,226,447 B1 | 5/2001 | Sasaki et al. |
| 6,230,220 B1 | 5/2001 | Cohen et al. |
| 6,233,389 B1 | 5/2001 | Barton et al. |
| 6,233,390 B1 | 5/2001 | Yoneda |
| 6,263,308 B1 | 7/2001 | Heckerman |
| 6,272,610 B1 | 8/2001 | Katayama et al. |
| 6,275,506 B1 | 8/2001 | Fazel et al. |
| 6,292,624 B1 | 9/2001 | Saib et al. |
| 6,298,373 B1 | 10/2001 | Burns et al. |
| 6,301,313 B1 | 10/2001 | Gevargiz et al. |
| 6,311,011 B1 | 10/2001 | Kuroda |
| 6,324,338 B1 | 11/2001 | Wood et al. |
| 6,330,252 B1 | 12/2001 | Shojima |
| 6,334,217 B1 | 12/2001 | Kim |
| 6,374,336 B1 | 4/2002 | Peters et al. |
| 6,378,035 B1 | 4/2002 | Parry et al. |
| 6,378,129 B1 | 4/2002 | Zetts |
| 6,385,386 B1 | 5/2002 | Aotake |
| 6,430,363 B2 | 8/2002 | Sasaki et al. |
| 6,434,748 B1 | 8/2002 | Shen et al. |
| 6,441,832 B1 | 8/2002 | Tao et al. |
| 6,445,872 B1 | 9/2002 | Sano et al. |
| 6,490,000 B1 | 12/2002 | Schaefer et al. |
| 6,498,895 B2 | 12/2002 | Young et al. |
| 6,501,397 B1 | 12/2002 | Radha et al. |
| 6,542,203 B1 | 4/2003 | Shadwell et al. |
| 6,543,053 B1 | 4/2003 | Li et al. |
| 6,570,729 B1 | 5/2003 | Takayama |
| 6,591,421 B1 | 7/2003 | Sullivan |
| 6,594,329 B1 | 7/2003 | Susnow |
| 6,601,237 B1 | 7/2003 | Ten Kate et al. |
| 6,625,709 B2 | 9/2003 | Aiken et al. |
| 6,625,811 B1 | 9/2003 | Kaneko |
| 6,642,939 B1 | 11/2003 | Vallone et al. |
| 6,654,539 B1 | 11/2003 | Duruoz et al. |
| 6,665,869 B1 | 12/2003 | Ellis et al. |
| 6,670,971 B1 | 12/2003 | Oral |
| 6,678,463 B1 | 1/2004 | Pierre et al. |
| 6,681,396 B1 | 1/2004 | Bates et al. |
| 6,701,332 B1 | 3/2004 | Vella |
| 6,714,722 B1 | 3/2004 | Tsukidate |
| 6,744,967 B2 | 6/2004 | Kaminski et al. |
| 6,757,906 B1 | 6/2004 | Look et al. |
| 6,766,100 B1 | 7/2004 | Komar et al. |
| 6,774,926 B1 | 8/2004 | Ellis et al. |
| 6,775,843 B1 | 8/2004 | McDermott |
| 6,782,550 B1 | 8/2004 | Cao |
| 6,798,971 B2 | 9/2004 | Potrebic |
| 6,803,968 B1 | 10/2004 | Numata |
| 6,822,661 B2 * | 11/2004 | Sai .................. H04N 21/8352 348/E5.105 |
| 6,850,691 B1 | 2/2005 | Stam et al. |
| 6,868,225 B1 | 3/2005 | Brown et al. |
| 6,920,567 B1 | 7/2005 | Doherty et al. |
| 6,970,947 B2 | 11/2005 | Ebling et al. |
| 6,971,121 B2 | 11/2005 | West et al. |

(56) References Cited

U.S. PATENT DOCUMENTS

| | | |
|---|---|---|
| 6,985,567 B2 | 1/2006 | Vallinen et al. |
| 6,985,669 B1 | 1/2006 | Unger |
| 6,993,782 B1 | 1/2006 | Newberry et al. |
| 7,003,213 B1 | 2/2006 | Hasegawa |
| 7,024,676 B1 | 4/2006 | Klopfenstein |
| 7,028,329 B1 | 4/2006 | Mizutani |
| 7,051,173 B2 | 5/2006 | Tsuchiya et al. |
| 7,177,530 B1 | 2/2007 | Suzuka et al. |
| 7,194,563 B2 | 3/2007 | Plourde, Jr. |
| 7,231,136 B2 | 6/2007 | Sasaki et al. |
| 7,245,822 B2 | 7/2007 | Shigaki |
| 7,257,308 B2 | 8/2007 | Plourde, Jr. et al. |
| 7,369,749 B2 | 5/2008 | Ichioka et al. |
| 7,395,547 B2 | 7/2008 | Hammett et al. |
| 7,409,140 B2 | 8/2008 | Rodriguez et al. |
| 7,443,871 B2 | 10/2008 | Newson et al. |
| 7,512,136 B2 | 3/2009 | Kaminski et al. |
| 7,512,315 B2 | 3/2009 | Kaminski et al. |
| 7,522,817 B2 | 4/2009 | Srinivasan et al. |
| 7,551,832 B2 | 6/2009 | Plourde, Jr. |
| 7,577,336 B2 | 8/2009 | Srinivasan et al. |
| 7,769,925 B2 | 8/2010 | Plourde, Jr. |
| 7,773,859 B1 | 8/2010 | Potrebic et al. |
| 7,779,181 B2 | 8/2010 | Plourde, Jr. |
| 7,835,910 B1 | 11/2010 | Hakkani-Tur et al. |
| 7,962,011 B2 | 6/2011 | Plourde, Jr. et al. |
| 8,015,006 B2 | 9/2011 | Kennewick et al. |
| 8,181,205 B2 | 5/2012 | Russ et al. |
| 8,321,220 B1 | 11/2012 | Chotimongkol et al. |
| 8,326,634 B2 | 12/2012 | Di Cristo et al. |
| 8,346,563 B1 | 1/2013 | Hjelm et al. |
| 8,400,332 B2 | 3/2013 | Szwabowski et al. |
| 8,565,578 B2 | 10/2013 | Plourde, Jr. et al. |
| 8,577,201 B2 | 11/2013 | Kaminski et al. |
| 8,620,135 B2 | 12/2013 | Plourde, Jr. |
| 2001/0002224 A1 | 5/2001 | Sasaki et al. |
| 2001/0019658 A1 | 9/2001 | Barton et al. |
| 2001/0028782 A1 | 10/2001 | Ohno et al. |
| 2001/0032293 A1 | 10/2001 | Korst et al. |
| 2001/0033343 A1 | 10/2001 | Yap et al. |
| 2001/0033736 A1 | 10/2001 | Yap et al. |
| 2001/0043800 A1 | 11/2001 | Gotoh et al. |
| 2001/0051037 A1 | 12/2001 | Safadi et al. |
| 2002/0009285 A1 | 1/2002 | Safadi et al. |
| 2002/0012517 A1 | 1/2002 | Ichioka et al. |
| 2002/0019984 A1 | 2/2002 | Rakib |
| 2002/0037160 A1 | 3/2002 | Locket et al. |
| 2002/0040475 A1 | 4/2002 | Yap et al. |
| 2002/0046404 A1 | 4/2002 | Mizutani |
| 2002/0054752 A1 * | 5/2002 | Wood et al. .................. 386/83 |
| 2002/0059623 A1 * | 5/2002 | Rodriguez et al. |
| 2002/0059649 A1 | 5/2002 | Ichioka |
| 2002/0071653 A1 | 6/2002 | Cowley et al. |
| 2002/0073423 A1 * | 6/2002 | Krakirian ............... G06F 3/033 725/40 |
| 2002/0073425 A1 | 6/2002 | Aria et al. |
| 2002/0076195 A1 | 6/2002 | Nakajima et al. |
| 2002/0076203 A1 | 6/2002 | Takahashi |
| 2002/0090004 A1 | 7/2002 | Rinchiuso |
| 2002/0103889 A1 | 8/2002 | Markson et al. |
| 2002/0110352 A1 | 8/2002 | Potrebic |
| 2002/0122656 A1 | 9/2002 | Gates et al. |
| 2002/0133491 A1 | 9/2002 | Sim et al. |
| 2002/0136406 A1 | 9/2002 | Fitzhardinge et al. |
| 2002/0138641 A1 | 9/2002 | Taylor et al. |
| 2002/0146233 A1 | 10/2002 | Barton et al. |
| 2002/0147977 A1 | 10/2002 | Hammett et al. |
| 2002/0168178 A1 | 11/2002 | Rodriguez et al. |
| 2002/0174430 A1 * | 11/2002 | Ellis et al. ................ 725/46 |
| 2002/0174445 A1 | 11/2002 | Miller et al. |
| 2002/0184637 A1 | 12/2002 | Perlman |
| 2002/0199185 A1 | 12/2002 | Kaminski et al. |
| 2003/0014753 A1 | 1/2003 | Beach et al. |
| 2003/0028706 A1 | 2/2003 | Okada |
| 2003/0035650 A1 | 2/2003 | Demas et al. |
| 2003/0040962 A1 | 2/2003 | Lewis |
| 2003/0068154 A1 | 4/2003 | Zylka |
| 2003/0095792 A1 | 5/2003 | Ogikubo |
| 2003/0099458 A1 | 5/2003 | Mizukami et al. |
| 2003/0105918 A1 | 6/2003 | Plourde, Jr. |
| 2003/0106064 A1 | 6/2003 | Plourde, Jr. |
| 2003/0108331 A1 | 6/2003 | Plourde, Jr. et al. |
| 2003/0110504 A1 | 6/2003 | Plourde, Jr. et al. |
| 2003/0110513 A1 | 6/2003 | Plourde, Jr. et al. |
| 2003/0121055 A1 | 6/2003 | Kaminski et al. |
| 2003/0128302 A1 | 7/2003 | Potrebic et al. |
| 2003/0149988 A1 * | 8/2003 | Ellis .................. H04N 5/44543 725/87 |
| 2003/0154484 A1 | 8/2003 | Plourde et al. |
| 2003/0156826 A1 | 8/2003 | Sonoda et al. |
| 2003/0177495 A1 | 9/2003 | Needham et al. |
| 2003/0206719 A1 | 11/2003 | Bumgardner et al. |
| 2003/0215211 A1 | 11/2003 | Coffin |
| 2003/0228126 A1 | 12/2003 | Buxton |
| 2003/0231855 A1 | 12/2003 | Gates et al. |
| 2003/0235391 A1 | 12/2003 | Gates et al. |
| 2004/0005142 A1 | 1/2004 | Yoo et al. |
| 2004/0013406 A1 | 1/2004 | Barton et al. |
| 2004/0042103 A1 | 3/2004 | Mayer |
| 2004/0060063 A1 | 3/2004 | Russ et al. |
| 2004/0088726 A1 | 5/2004 | Ma et al. |
| 2004/0091249 A1 | 5/2004 | Mekenkamp et al. |
| 2004/0175094 A1 | 9/2004 | Mautner et al. |
| 2004/0181814 A1 | 9/2004 | Ellis et al. |
| 2004/0184776 A1 | 9/2004 | Inoue et al. |
| 2004/0197078 A1 | 10/2004 | Yoon et al. |
| 2004/0208477 A1 | 10/2004 | Bumgardner et al. |
| 2004/0218905 A1 | 11/2004 | Green et al. |
| 2004/0228609 A1 | 11/2004 | Nakamura et al. |
| 2004/0240840 A1 | 12/2004 | Ledermann et al. |
| 2004/0258389 A1 | 12/2004 | Castillo |
| 2004/0258396 A1 | 12/2004 | Nakamura et al. |
| 2005/0002638 A1 | 1/2005 | Putterman et al. |
| 2005/0002639 A1 | 1/2005 | Putterman et al. |
| 2005/0002640 A1 | 1/2005 | Putterman et al. |
| 2005/0041954 A1 | 2/2005 | Austin |
| 2005/0047749 A1 | 3/2005 | Kaibe |
| 2005/0078938 A1 | 4/2005 | Crohas |
| 2005/0111819 A1 | 5/2005 | Cormack et al. |
| 2005/0111838 A1 | 5/2005 | Arishima |
| 2005/0120373 A1 | 6/2005 | Thomas et al. |
| 2005/0132418 A1 | 6/2005 | Barton et al. |
| 2005/0158029 A1 | 7/2005 | Irikuchi et al. |
| 2005/0165598 A1 | 7/2005 | Cote et al. |
| 2005/0229213 A1 | 10/2005 | Ellis et al. |
| 2005/0246457 A1 | 11/2005 | Parry et al. |
| 2005/0259961 A1 | 11/2005 | Sano |
| 2005/0259962 A1 | 11/2005 | Sano |
| 2005/0259963 A1 | 11/2005 | Sano |
| 2005/0265694 A1 | 12/2005 | Green et al. |
| 2005/0276567 A1 | 12/2005 | Okuyama et al. |
| 2006/0002682 A1 | 1/2006 | Kanamori |
| 2006/0045472 A1 | 3/2006 | Poslinski |
| 2006/0051059 A1 | 3/2006 | Krakirian et al. |
| 2006/0140584 A1 | 6/2006 | Ellis et al. |
| 2006/0153523 A1 | 7/2006 | Ishida et al. |
| 2006/0177197 A1 | 8/2006 | Nakamura et al. |
| 2006/0188221 A1 | 8/2006 | Kee |
| 2006/0190983 A1 | 8/2006 | Plourde, Jr. |
| 2006/0193604 A1 | 8/2006 | Hoshi et al. |
| 2006/0206912 A1 | 9/2006 | Klarfield et al. |
| 2006/0228096 A1 | 10/2006 | Hoshino et al. |
| 2006/0239659 A1 | 10/2006 | Chng |
| 2007/0038436 A1 | 2/2007 | Cristo et al. |
| 2007/0047919 A1 | 3/2007 | Yoshida et al. |
| 2007/0077028 A1 | 4/2007 | Bodkin et al. |
| 2007/0110393 A1 | 5/2007 | Jang |
| 2007/0154174 A1 | 7/2007 | Sasaki et al. |
| 2007/0156392 A1 | 7/2007 | Balchandran et al. |
| 2007/0168601 A1 | 7/2007 | Plourde, Jr. |
| 2007/0226649 A1 | 9/2007 | Agmon |
| 2007/0226767 A1 | 9/2007 | Kaminski |
| 2008/0013920 A1 | 1/2008 | Plourde, Jr. et al. |
| 2008/0138033 A1 | 6/2008 | Rodriquez et al. |

(56) References Cited

U.S. PATENT DOCUMENTS

| | | |
|---|---|---|
| 2008/0181574 A1 | 7/2008 | Ellis et al. |
| 2008/0195388 A1 | 8/2008 | Bower et al. |
| 2008/0235017 A1 | 9/2008 | Satomura |
| 2009/0030697 A1 | 1/2009 | Cerra et al. |
| 2009/0196568 A1 | 8/2009 | Kaminski et al. |
| 2009/0202216 A1 | 8/2009 | Kaminski et al. |
| 2009/0204994 A1 | 8/2009 | Kaminski et al. |
| 2010/0128863 A1 | 5/2010 | Krum |
| 2010/0211695 A1 | 8/2010 | Steinmetz et al. |
| 2010/0251284 A1 | 9/2010 | Ellis et al. |
| 2011/0093459 A1 | 4/2011 | Dong et al. |
| 2011/0144999 A1 | 6/2011 | Jang et al. |
| 2011/0153324 A1 | 6/2011 | Ballinger et al. |
| 2011/0305440 A1 | 12/2011 | Plourde, Jr. et al. |
| 2012/0232885 A1 | 9/2012 | Barbosa et al. |
| 2012/0253802 A1 | 10/2012 | Heck et al. |
| 2012/0254227 A1 | 10/2012 | Heck et al. |
| 2012/0265531 A1 | 10/2012 | Bennett |
| 2012/0271617 A1 | 10/2012 | Nakajima et al. |
| 2012/0290293 A1 | 11/2012 | Hakkani-Tur et al. |
| 2013/0031476 A1 | 1/2013 | Coin et al. |
| 2013/0085756 A1 | 4/2013 | Chotimongkol et al. |
| 2013/0152092 A1 | 6/2013 | Yadgar |
| 2013/0185065 A1 | 7/2013 | Tzirkel-Hancock et al. |
| 2014/0025380 A1 | 1/2014 | Koch et al. |
| 2014/0257803 A1 | 9/2014 | Yu et al. |
| 2014/0379326 A1 | 12/2014 | Sarikaya et al. |
| 2014/0379353 A1 | 12/2014 | Boies et al. |
| 2015/0255061 A1 | 9/2015 | Xue et al. |
| 2015/0255069 A1 | 9/2015 | Adams |
| 2015/0278191 A1 | 10/2015 | Levit et al. |
| 2015/0310858 A1 | 10/2015 | Li et al. |

FOREIGN PATENT DOCUMENTS

| | | |
|---|---|---|
| CA | 2479347 | 1/2012 |
| CA | 2446604 | 3/2012 |
| CA | 2 469 554 | 10/2012 |
| EP | 0 789 488 | 8/1997 |
| EP | 0 834 798 | 4/1998 |
| EP | 0 936 615 | 8/1999 |
| EP | 1 014 715 | 6/2000 |
| EP | 1 102 482 A1 | 5/2001 |
| EP | 1 113 668 | 7/2001 |
| EP | 1 126 701 | 8/2001 |
| EP | 2575128 A2 | 4/2013 |
| JP | 2-228842 | 11/1990 |
| JP | 2002/091477 A | 3/2002 |
| WO | WO 92/22983 | 12/1992 |
| WO | WO 96/41740 | 12/1996 |
| WO | WO 99/33265 A1 | 7/1999 |
| WO | WO 99/37045 A1 | 7/1999 |
| WO | WO 99/65237 | 12/1999 |
| WO | WO 00/04726 | 1/2000 |
| WO | WO 00/27114 | 5/2000 |
| WO | WO 00/58967 | 10/2000 |
| WO | WO 00/59214 | 10/2000 |
| WO | WO 00/60500 | 10/2000 |
| WO | WO 00/60591 | 10/2000 |
| WO | WO 01/47238 A2 | 6/2001 |
| WO | WO 01/47249 A2 | 6/2001 |
| WO | WO 01/60064 A2 | 8/2001 |
| WO | WO 01/82600 | 11/2001 |
| WO | WO 02/43353 A2 | 5/2002 |
| WO | WO 02/093299 A2 | 11/2002 |
| WO | WO 02/093901 A2 | 11/2002 |
| WO | WO 03/051044 A1 | 6/2003 |
| WO | WO 03/051047 A1 | 6/2003 |
| WO | WO 03/051052 A1 | 6/2003 |
| WO | WO 03/081915 A1 | 10/2003 |
| WO | 2005/013262 A1 | 2/2005 |
| WO | 2013/171481 A2 | 11/2013 |

OTHER PUBLICATIONS

Canadian Office Action dated Jun. 2, 2011 cited in Application No. 2,469,542, 4 pgs.
European Summons to Attend Oral Proceedings dated Aug. 18, 2011 cited in Application No. 02791374.8, 6 pgs.
Canadian Office Action dated Nov. 19, 2012 cited in Application No. 2,469,542, 5 pgs.
U.S. Office Action dated Jun. 9, 2008 cited in U.S. Appl. No. 10/008,439, 23 pgs.
U.S. Final Office Action dated Jan. 27, 2009 cited in U.S. Appl. No. 10/008,439, 24 pgs.
U.S. Office Action dated Aug. 21, 2009 cited in U.S. Appl. No. 10/008,439, 17 pgs.
U.S. Final Office Action dated Jan. 22, 2010 cited in U.S. Appl. No. 10/008,439, 26 pgs.
U.S. Office Action dated Oct. 7, 2010 cited in U.S. Appl. No. 10/008,439, 29 pgs.
U.S. Office Action dated Apr. 13, 2011 cited in U.S. Appl. No. 10/008,439, 14 pgs.
U.S. Final Office Action dated Oct. 7, 2011 cited in U.S. Appl. No. 10/008,439, 15 pgs.
U.S. Office Action dated Mar. 12, 2013 cited in U.S. Appl. No. 10/008,439, 14 pgs.
T. Raadt et al., "Cryptography in OpenBSD: An Overview," In Proc. of the 1999 USENIX Annual Technical Conference, Freenix Track, pp. 93-101, Jun. 1999.
U.S. Appl. No. 10/143,647, filed May 10, 2002 entitled "Managing Time Shift Buffers".
U.S. Appl. No. 12/389,082, filed Feb. 19, 2009 entitled "Retention of Program Portions Viewed in Prior Displayed TV Channels".
U.S. Appl. No. 12/389,093, filed Feb. 19, 2009 entitled "Management of TV Programs by their Buffered Lengths".
U.S. Appl. No. 10/143,123, filed May 10, 2002 entitled "Channel Buffering and Display Management System for Multi-Tuner Set-Top Box".
U.S. Appl. No. 12/389,107, filed Feb. 19, 2009, entitled "Buffering of Prior Displayed Television Channels Upon Accessing a Different Channel".
U.S. Appl. No. 12/033,203, filed Feb. 19, 2008, entitled "Multi-Tuner Multi-Buffer Digital Home Communication Terminal".
U.S. Appl. No. 11/751,754, filed May 22, 2007, entitled "Managing Time Shift Buffers".
U.S. Appl. No. 10/008,439, filed Dec. 6, 2001 entitled "Dividing and Managing Time-Shift Buffering into Program Specific Segments Based on Defined Durations".
U.S. Appl. No. 10/010,270, filed Dec. 6, 2001 entitled "Controlling Substantially Constant Buffer Capacity for Personal Video Recording with Consistent User Interface of Available Disk Space".
U.S. Appl. No. 10/102,043, filed Mar. 20, 2002, entitled "Composite Buffering".
U.S. Appl. No. 13/159,406, filed Jun. 13, 2011 entitled "Management of Buffer Capacity for Video Recording and Time Shift Operations".
U.S. Appl. No. 10/005,628, filed Dec. 5, 2001 entitled "Disk Driver Cluster Management of Time Shift Buffer with File Allocation Table Structure".
U.S. Appl. No. 11/679,625, filed Feb. 27, 2007 entitled "Disk Driver Cluster Management of Time Shift Buffer With File Allocation Table Structure".
U.S. Appl. No. 11/381,892, filed May 5, 2006 entitled "Disk Driver Cluster Management of Time Shift Buffer with File Allocation Table Structure".
U.S. Appl. No. 10/253,115, filed Sep. 24, 2002 entitled "PVR Channel and PVR IPG Information".
U.S. Appl. No. 10/010,781, filed Dec. 5, 2001 entitled "Application Management and Interface for Cluster Control of Time Shift Buffer".
U.S. Appl. No. 09/827,470, filed Apr. 6, 2001 entitled "System and Method for Providing User-Defined Media Presentations".

(56) References Cited

OTHER PUBLICATIONS

U.S. Appl. No. 10/008,624, filed Dec. 6, 2001 entitled "Converting Time-Shift Buffering for Personal Video Recording Into Permanent Recordings".
U.S. Appl. No. 11/772,966, filed Jul. 3, 2007, entitled "Converting Time-Shift Buffering for Personal Video Recording Into Permanent Recordings".
U.S. Appl. No. 10/034,028, filed Dec. 20, 2001, entitled "Program Position User Interface for Personal Video Recording Time Shift Buffer".
U.S. Appl. No. 10/015,349, filed Dec. 11, 2001, entitled "Controlling Personal Video Recording Functions from Interactive Television" (Abandoned).
U.S. Appl. No. 09/918,376, filed Jul. 30, 2001, entitled "Digital Subscriber Television Networks with Local Physical Storage Devices and Virtual Storage".
Dish Network DVR/PVR Receiver—DVR Receiver (Dual-Turner), DVR 921 High Definition; DVR Receiver (Dual-Turner), found at www.afreedish.com/com/dish-network-dvr-receiver.html; 4 pgs.; printed Jul. 13, 2007.
IPTV Dual Turner SD-DVR; entitled "Pace Introduces Vegas DVR Product"; found at http://www.iptv.industry.com/ar/3o.htm; 3 pgs.; printed Jul. 13, 2007.
Mavromatic; entitled "Pioneer's Dual Tuner HD-DVR"; found at http://www.mavromatic.com/archives/000228; 4 pgs.; printed Jul. 13, 2007.
Motorola—Connected Home Solutions—Digital Video Solutions—DCH3416 Host Set-top; DCH3416 Host set-top; found at http://broadband.motorola.com/ business/digitalvideo/product_dch3416_settop.asp; 2 pgs.; printed Jul. 13, 2007.
Motorola DVR; entitled "Motorola Dual-Tuner DVR High-Definition Set-top DCT6412"; found at http://broadband.motorola.com/dvr/dct6412asp; 4 pgs.; printed Jul. 13, 2007.
Sanna et al., Special Edition Using Windows NT Workstation 4.0, Second Edition, pp. 128-143 (cited in Jul. 26, 2006 OA).
TiVo.com Buy TiVo; entitled "Choose a price plan", found at http://dynamic.tivo.com/2.0boxdetails.asp?box-series280hrDTDVR; 2 pages; printed Jul. 13, 2007.
International Search Report cited in Application No. PCT/US02/14887 dated Nov. 12, 2002, 6 pgs.
International Search Report cited in Application No. PCT/US02/14874 dated Nov. 20, 2002, 4 pgs.
PCT Written Opinion Appl. No. PCT/US02/14874 dated Feb. 11, 2003, 5 pgs.
International Search Report cited in Application No. PCT/US02/38868 dated Mar. 26, 2003, 5 pgs.
International Search Report cited in Application No. PCT/US02/38778 dated Apr. 3, 2003, 4 pgs.
International Search Report cited in Application No. PCT/US02/38777 dated Apr. 4, 2003, 4 pgs.
International Search Report cited in Application No. PCT/US03/08597 dated Jul. 11, 2003, 4 pgs.
PCT Written Opinion Appl. No. PCT/US02/38868 dated Sep. 25, 2003, 5 pgs.
PCT Written Opinion Appl. No. PCT/US02/38778 dated Oct. 27, 2003, 5 pgs.
PCT Written Opinion Appl. No. PCT/US02/38777 dated Oct. 28, 2003, 5 pgs.
PCT Written Opinion of the International Preliminary Examining Authority Appl. No. PCT/US03/08597 dated Oct. 28, 2004, 5 pgs.
Canadian Office Action dated Jun. 22, 2006 cited in Appln No. 2,446,604, 3 pgs.
Canadian Office Action dated Jan. 11, 2007 cited in Appln No. 2,446,617, 3 pgs.
Canadian Office Action dated Mar. 19, 2007 cited in Appln No. 2,469,554, 2 pgs.
Supplementary European Search Report cited in Application No. 02 804 729.8 dated Jun. 21, 2007.
European Examination dated Nov. 14, 2007 cited in Appln No. 02 804 729.8.
Canadian Office Action dated Apr. 8, 2008 cited in Appln No. 2,469,558.
Supplementary European Search Report cited in Application No. 03 745 157.2 dated Jun. 19, 2008.
Canadian Office Action dated Sep. 16, 2008 cited in Appln No. 2,446,617.
Canadian Office Action dated Feb. 10, 2009 cited in Appln No. 2,479,347.
Supplementary European Search Report cited in Application No. 02 791 374.8 dated Feb. 13, 2009.
Canadian Office Action dated Feb. 13, 2009 cited in Appln No. 2,469,542.
Supplementary European Search Report cited in Application No. 02 736 739.0 dated Mar. 23, 2009.
Canadian Office Action dated Mar. 31, 2009 cited in Appln No. 2,571,256.
European Examination dated Apr. 2, 2009 cited in Appln No. 02 794 161.6.
European Search Report cited in Application No. 02747828.8 dated Jul. 3, 2009.
European Examination dated Oct. 13, 2009 cited in Appln No. 02 736 739.0, 3 pgs.
European Examination dated Oct. 22, 2009 cited in Appln No. 02 794 161.6, 3 pgs.
European Examination dated Dec. 17, 2009 cited in Appln No. 02 747 828.8.
Canadian Office Action dated Apr. 12, 2010 cited in Appln No. 2,479,347, 4 pages.
Canadian Office Action dated Apr. 14, 2010 cited in Appln No. 2,469,542, 4 pages.
European Examination dated May 25, 2010 cited in Appln No. 02 791 374.8, 5 pages.
Canadian Office Action dated Dec. 20, 2010 cited in Appln No. 2,446,604, 3 pgs.
European Communication dated Feb. 17, 2011 cited in Appln. No. 02 747 828.8, 5 pages.
European Communication dated Jan. 17, 2012 cited in Application No. 02 736 739.0, 4 pages.
Canadian Office Action dated Oct. 2, 2012 cited in Application No. 2,658,766, 2 pgs.
U.S. Official Action dated Aug. 17, 2004 in U.S. Appl. No. 10/253,115, 17 pgs.
U.S. Official Action dated Oct. 21, 2004 in U.S. Appl. No. 10/102,043, 13 pgs.
U.S. Official Action dated Mar. 21, 2005 in U.S. Appl. No. 10/005,628, 7 pgs.
U.S. Official Action dated Apr. 7, 2005 in U.S. Appl. No. 10/253,115, 16 pgs.
U.S. Official Action dated Apr. 25, 2005 in U.S. Appl. No. 09/827,470, 15 pgs.
U.S. Official Action dated Jul. 25, 2005 in U.S. Appl. No. 10/253,115, 13 pgs.
U.S. Official Action dated Oct. 19, 2005 in U.S. Appl. No. 09/827,470, 20 pgs.
U.S. Official Action dated Feb. 8, 2006 in U.S. Appl. No. 10/010,270, 26 pgs.
U.S. Official Action dated Apr. 6, 2006 in U.S. 09/827,470, 6 pgs.
U.S. Official Action dated May 3, 2006 in U.S. Appl. No. 10/008,624, 19 pgs.
U.S. Official Action dated May 11, 2006 in U.S. 10/253,115, 13 pgs.
U.S. Official Action dated Jun. 30, 2006 in U.S. Appl. No. 10/005,628, 9 pgs.
U.S. Official Action dated Jul. 26, 2006 in U.S. Appl. No. 10/010,270, 20 pgs.
U.S. Official Action dated Sep. 8, 2006 in U.S. Appl. No. 09/827,470, 19 pgs.
U.S. Official Action dated Oct. 19, 2006 in U.S. Appl. No. 10/008,624, 15 pgs.
U.S. Official Action dated Jan. 25, 2007 in U.S. Appl. No. 09/827,470, 19 pgs.
U.S. Official Action dated Feb. 26, 2007 in U.S. Appl. No. 10/010,270, 15 pgs.

(56) References Cited

OTHER PUBLICATIONS

U.S. Official Action dated May 21, 2007 in U.S. Appl. No. 10/143,647, 8 pgs.
U.S. Official Action dated Aug. 10, 2007 in U.S. Appl. No. 10/010,270, 16 pgs.
U.S. Official Action dated Aug. 28, 2007 in U.S. Appl. No. 09/827,470, 19 pgs.
U.S. Official Action dated Sep. 5, 2007 in U.S. Appl. No. 11/381,892, 9 pgs.
U.S. Official Action dated Oct. 16, 2007 in U.S. 10/253,115, 14 pgs.
U.S. Official Action dated Nov. 19, 2007 in U.S. Appl. No. 10/143,647, 8 pgs.
U.S. Official Action dated Jan. 18, 2008 in U.S. Appl. No. 10/253,115, 12 pgs.
U.S. Official Action dated Apr. 2, 2008 in U.S. Appl. No. 10/010,270, 30 pgs.
U.S. Official Action dated Apr. 17, 2008 in U.S. Appl. No. 11/381,892, 8 pgs.
U.S. Official Action dated Jul. 21, 2008 in U.S. Appl. No. 10/253,115, 18 pgs.
U.S. Office Action dated Aug. 8, 2008 in U.S. Appl. No. 10/010,781, 31 pgs.
U.S. Office Action dated Aug. 19, 2008 in U.S. Appl. No. 10/008,439, 15 pgs.
U.S. Official Action dated Nov. 28, 2008 in U.S. Appl. No. 11/381,892, 9 pgs.
U.S. Official Action dated Feb. 19, 2009 in U.S. Appl. No. 10/010,270, 23 pgs.
U.S. Official Action dated Jun. 12, 2009 in U.S. Appl. No. 11/381,892, 11 pgs.
U.S. Official Action dated Jul. 6, 2009 in U.S. Appl. No. 11/679,625, 8 pgs.
U.S. Official Action dated Jul. 22, 2009 in U.S. Appl. No. 11/751,754, 9 pgs.
U.S. Official Action dated Oct. 9, 2009 in U.S. Appl. No. 11/381,892, 6 pgs.
U.S. Official Action dated Oct. 13, 2009 in U.S. Appl. No. 10/010,270, 16 pgs.
U.S. Official Action dated Nov. 12, 2009 in U.S. Appl. No. 11/679,625, 10 pgs.
U.S. Official Action dated Dec. 1, 2009 in U.S. Appl. No. 11/751,754, 20 pgs.
U.S. Official Action dated Mar. 17, 2010 in U.S. Appl. No. 10/010,270, 48 pgs.
U.S. Official Action dated Jun. 18, 2010 in U.S. Appl. No. 11/751,754, 8 pgs.
U.S. Official Action dated Jan. 21, 2011 in U.S. Appl. No. 11/751,754, 11 pgs.
U.S. Official Action dated Jun. 20, 2011 in U.S. Appl. No. 11/751,754, 10 pgs.
U.S. Office Action dated Dec. 27, 2011 in U.S. Appl. No. 11/751,754, 10 pgs.
U.S. Office Action dated Feb. 14, 2012 in U.S. Appl. No. 11/772,966, 59 pgs.
U.S. Office Action dated Mar. 27, 2012 in U.S. Appl. No. 12/389,107, 23 pgs.
U.S. Office Action dated Apr. 10, 2012 in U.S. Appl. No. 12/033,203, 39 pgs.
U.S. Office Action dated Jul. 3, 2012 in U.S. Appl. No. 11/772,966, 43 pgs.
U.S. Office Action dated Jul. 16, 2012 in U.S. Appl. No. 12/033,203, 10 pgs.
U.S. Office Action dated Aug. 30, 2012 in U.S. Appl. No. 12/389,107, 5 pgs.
U.S. Office Action dated Nov. 7, 2012 in U.S. Appl. No. 11/772,966, 46 pgs.
U.S. Office Action dated Dec. 26, 2012 in U.S. Appl. No. 12/033,203, 11 pgs.
U.S. Office Action dated Mar. 29, 2013 in U.S. Appl. No. 11/751,754, 11 pgs.
U.S. Office Action dated May 14, 2013 in U.S. Appl. No. 11/772,966, 43 pgs.
U.S. Office Action dated Jul. 10, 2013 in U.S. Appl. No. 12/033,203, 13 pgs.
U.S. Office Action dated Nov. 26, 2013 in U.S. Appl. No. 12/033,203, 12 pgs.
U.S. Office Action dated Dec. 6, 2013 in U.S. Appl. No. 11/751,754, 10 pgs.
U.S. Office Action dated Mar. 20, 2014 in U.S. Appl. No. 13/159,406, 11 pgs.
U.S. Office Action dated Mar. 24, 2014 in U.S. Appl. No. 12/033,203, 12 pgs.
International Search Report dated Feb. 7, 2003 cited in Appl. No. PCT/US02/37282, 4 pgs.
Canadian Office Action dated Jul. 30, 2009 cited in Appl. No. 2,469,402, 2 pgs.
Canadian Office Action dated Mar. 11, 2010 cited in Appl. No. 2,469,402, 2 pgs.
European Office Action dated May 7, 2010 with Supplemental European Search Report dated Apr. 27, 2010 cited in Appl. No. 02 782 336.8, 3 pgs.
Canadian Office Action dated May 31, 2010 cited in Appl. No. 2,499,920, 5 pgs.
European Office Action dated Feb. 24, 2011 cited in Appl. No. 02 782 336.8, 6 pgs.
Canadian Office Action dated Jun. 15, 2011 cited in Appl. No. 2,499,920, 3 pgs.
European Office Action dated Aug. 31, 2011 cited in Appl. No. 02 782 336.8, 5 pgs.
U.S. Office Action dated Aug. 28, 2014 in U.S. Appl. No. 13/159,406, 30 pgs.
EP Communication dated Jun. 3, 2014 in Appln No. 03 745 157.2, 6 pgs.
U.S. Office Action dated Jan. 16, 2015 in U.S. Appl. No. 13/159,406, 16 pages.
U.S. Appl. No. 14/227,492, filed Mar. 27, 2014, entitled "Flexible Schema for Language Model Customization".
Bohus, et al., "Olympus: An Open-Source Framework for Conversational Spoken Language Interface Research", In Proceedings of the Workshop on Bridging the Gap: Academic and Industrial Research in Dialog Technologies, Apr. 2007, 8 pages.
Dos Reis Mota, Pedro Jose, "LUP: A Language Understanding Platform", A Dissertation for the Degree of Master of Information Systems and Computer Engineering, Jul. 2012, 128 pages.
Eagle, et al., "Common Sense Conversations: Understanding Casual Conversation using a Common Sense Database", In Proceedings of the Artificial Intelligence, Information Access, and Mobile Computing Workshop, Aug. 2003, 6 pages.
He et al; "What is Discriminative Learning"; Achorn International; Jun. 25, 2008; 25 pgs. (cited in Jul. 7, 2015 ISR).
Hoffmeister et al., "Log-Linear Model Combination with Word-Dependent Scaling Factors"; Human Language Technology and Pattern Recognition Computer Science Department; Sep. 6-10; Brighton UK; Copyright © 2009 ISCA; 4 pgs. (cited in Jul. 7, 2015 ISR).
Huang et al., "Unified Stochastic Engine (USE) for Speech Recognition"; School of Computer Science; 1993 IEEE; 4 pgs. (cited in Jul. 7, 2015 ISR).
"Integrated Development Environments for Natural Language Processing", Published on: Oct. 2001, Available at: http://www.textanalysis.com/TAI-IDE-WP.pdf; 13 pgs.
Keshtkar et al., "A Corpus-based Method for Extracting Paraphrases of Emotion Terms"; Proceedings of the NAACL HLT 2010 Workshop on Computational Appraoches to Analysis and Generation of Emotion in Text; Jun. 2010; 10 pgs. (cited in Jun. 3, 2015 ISR).
Ko, et al., "Cammia—A Context-Aware Spoken Dialog System for Mobile Environments", In Automatic Speech Recognition and Understanding Workshop, Jul. 29, 2011, 2 pages.
Lee, et al., "Intention-Based Corrective Feedback Generationusing Context-Aware Model", In Proceedings of the Second International Conference on Computer Supported Education, Apr. 7, 2010, 8 pages.

(56) References Cited

OTHER PUBLICATIONS

Liu, et al., "Language Model Combination and Adaptation using Weighted Finite State Transducers", In Proceedings of IEEE International Conference on Acoustics Speech and Signal Processing, Mar. 14, 2010, 4 pages.
Moreira, et al., "Towards the Rapid Development of a Natural Language Understanding Module", In Proceedings of the 10th International Conference on Intelligent Virtual Agents, Jan. 2011, 7 pages.
Sarukkai et al., "Word Set Probability Boosting for Improved Spontaneous Dialog Recognition"; IEEE Transactions on Speech and Audio Processing, vol. 5, No. 5, Sep. 1997; 13 pgs. (cited in Jul. 7, 2015 ISR).
Seneff, et al., "Galaxy-II: A Reference Architecture for Conversational System Development", In Proceedings of the 5th International Conference on Spoken Language Processing, Nov. 2008, 4 pages.
Sing, et al., "Domain Metric Knowledge Model for Embodied Conversation Agents", In 5th International Conference on Research, Innovation & Vision for the Future, Mar. 5, 2007, 7 pages.
Xue, et al., "Singular Value Decomposition Based Low-Footprint Speaker Adaptation and Personalization for Deep Neural Network", In Proceedings of the IEEE International Conference on Acoustics, Speech and Signal Processing, May 4, 2014, pp. 6359-6363 (cited in Jun. 25, 2015 ISR).
International Search Report and Written Opinion Issued in PCT Application No. PCT/US2014/041014, dated Oct. 2, 2014, 9 Pages.
International Search Report and Written Opinion Issued in PCT Application No. PCT/US2014/041023, dated Jun. 3, 2015, 17 Pages.
International Search Report and Written Opinion Issued in PCT Application No. PCT/US2015/017872, dated Jun. 25, 2015, 11 Pages.
International Search Report and Written Opinion Issued in PCT Application No. PCT/US2015/029334, dated Jul. 7, 2015, 12 Pages.
International Search Report and Written Opinion Issued in PCT Application No. PCT/US2015/021921, dated Jul. 17, 2015, 11 Pages.
Preliminary Report on Patentability dated Sep. 15, 2015 in Appln No. PCT/US2014/041014, 6 pgs.
U.S. Official Action dated May 6, 2015 in U.S. Appl. No. 13/923,969, 12 pgs.
U.S. Official Action dated May 28, 2015 in U.S. Appl. No. 13/923,917, 18 pgs.
U.S. Official Action dated Jul. 1, 2015 in U.S. Appl. No. 14/201,704, 17 pgs.
Response dated Aug. 6, 2015 in U.S. Appl. No. 13/923,969, 7 pgs.
Response dated Aug. 7, 2015 in U.S. Appl. No. 13/923,917, 10 pgs.
U.S. Official Action dated Aug. 13, 2015 in U.S. Appl. No. 14/227,492, 41 pgs.
U.S. Official Action dated Sep. 29, 2015 in U.S. Appl. No. 13/923,917, 9 pgs.
U.S. Official Action dated Oct. 1, 2015 in U.S. Appl. No. 13/920,323, 34 pgs.
Notice of Allowance dated Oct. 1, 2015 in U.S. Appl. No. 13/923,969, 7 pgs.
Notice of Allowance dated Nov. 30, 2015 in U.S. Appl. No. 13/923,969, 12 pgs.

\* cited by examiner

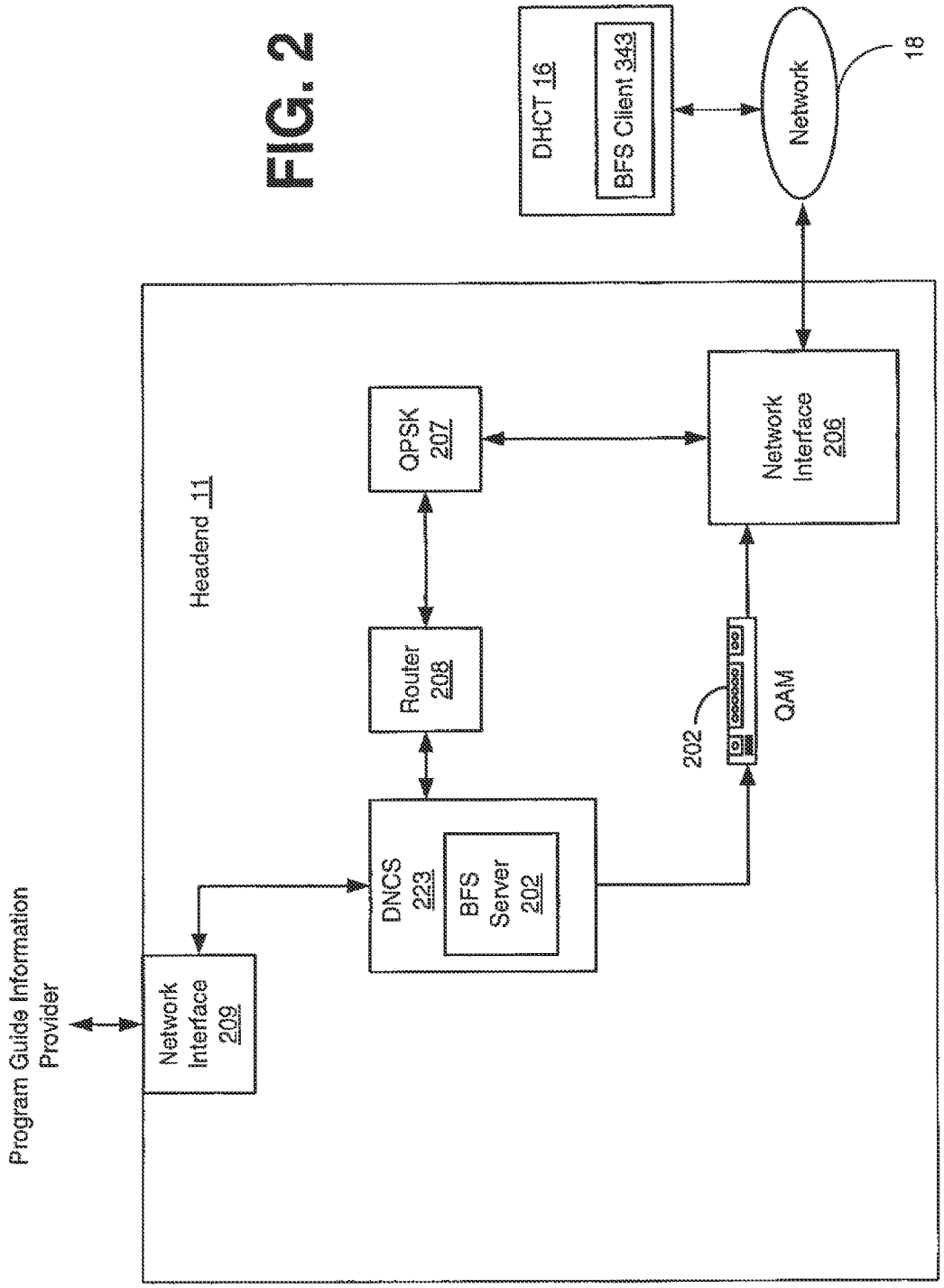

900

| CH 220 Nickelodean | | | | |
|---|---|---|---|---|
| Barney 7:00 AM - 7:30 AM Barney shows us how to play nice | (Video) | | | |
| | 7 | Sat 1/19 | | |
| | 7:00 AM | 7:30 AM | 8:00 AM | 7:00 AM |
| NICK 220 | Barney | Funschool | Kidstuff | |
| NICK 221 | Magicbus | Blimpy | Popeye | |
| WE 222 | Health | Aerobics | Rafting | |
| HIST 223 | Roman Empire | | | |
| BRAVO 224 | Lifestyles | Old Homes | Profiles | ⇑ |
| Sat 1/19 | △ A Browse By | B Date | C Customize | |

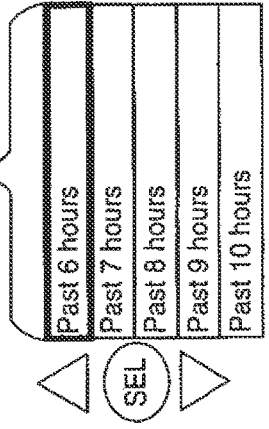
FIG. 21

| | 7:30 | Sat 1/19 | 7:35PM |
|---|---|---|---|
| | 9:00 | 9:30 | 10:00 |
| PVR CH 301 | Johnny Bravo | | |
| Barney CH 302 | Barney | Barney | Barney |
| Past 6 hours CH 303 | ≪ Auburn versus Ga | | |
| News CH 304 | ABC News | | ABC News |
| Auburn Football CH 305 | ≪ Auburn versus Ga | | |
| Sat 1/19 | △ A Browse By | ☐ B Date | ◯ C Customize |

Past 6 hours
CH 303 PVR

Auburn versus Ga
College basketball game
Recorded Sat, 1/19, 3:00-5:00PM
on ESPN Ch.130

(Video)

CH 322
PVR Buffer (Video)

Brady Bunch
Marcia gets hit with the football
Buffered Sunday, 1/20, 4:30- 5:00PM
on Nickelodean (Ch. 220)

| | 5:00 PM | 5:30 PM | Sun 1/20 5:15 PM | |
| --- | --- | --- | --- | --- |
| | | | 6:00 PM | |
| PVR 319 | | | | |
| PVR 320 | | CNN | ESPN | Family Feud ⇑ |
| PVR Buffer321 | | Brady Bunch | Partridge Family | Foxnews ⇑ |
| PVR Buffer322 | | | | ⇑ |
| Shop 323 | | Shop Till You Drop | | |
| Sun 1/20 | △ A Browse By | B Date | C Customize | |

PVR CHANNEL AND PVR IPG INFORMATION

RELATED APPLICATION

This application is a Divisional of co-pending U.S. application Ser. No. 10/253,115 entitled "PVR Channel and PVR IPG Information" filed Sep. 24, 2002, which is incorporated herein by reference.

This application is related to copending U.S. application Ser. No. 09/827,470 entitled "System and Method for Providing User-Defined Media Presentations," filed on Apr. 6, 2001, which issued on Jul. 1, 2008 as U.S. Pat. No. 7,395,547, which is entirely incorporated herein by reference.

TECHNICAL FIELD

The present invention is generally related to television systems, and, more particularly, is related to personal video recording and interactive program guides.

BACKGROUND OF THE INVENTION

With recent advances in digital transmission technology, subscriber television systems are now capable of providing much more than the traditional analog broadcast video. In implementing enhanced programming, the home communication terminal device ("HCT"), otherwise known as the set-top box, has become an important computing device for accessing media content services (and media content within those services) and navigating a user through a maze of available services. In addition to supporting traditional analog broadcast video functionality, digital HCTs (or "DHCTs") now also support an increasing number of two-way digital services such as video-on-demand and personal video recording.

Typically, a DHCT is connected to a cable or satellite, or generally, a subscriber television system, and includes hardware and software necessary to provide the functionality of the digital television system at the user's site. Some of the software executed by a DHCT can be downloaded and/or updated via the subscriber television system. Each DHCT also typically includes a processor, communication components, and memory, and is connected to a television or other display device, such as a personal computer. While many conventional DHCTs are stand-alone devices that are externally connected to a television, a DHCT and/or its functionality may be integrated into a television or personal computer or even an audio device such as a programmable radio, as will be appreciated by those of ordinary skill in the art.

DHCTs are typically capable of providing users with a very large number and variety of media content choices. DHCTs equipped with personal video recording functionality (e.g., via the use of a coupled storage device) provide the user with the opportunity to record favorite media content and/or to record and subsequently view media content he or she would otherwise have missed due to, for example, scheduling conflicts. Many DHCTs provide users with television program information via interactive program guides (IPGs), which allow a user to scroll through and/or search available program information for broadcast and/or on-demand media content, but current mechanisms provide limited program information for recorded media content and are cumbersome to use.

Thus, a heretofore unaddressed need exists in the industry to address the aforementioned deficiencies and inadequacies.

BRIEF DESCRIPTION OF THE DRAWINGS

The preferred embodiments of the invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

FIG. 2 is a block diagram of an example headend as depicted in FIG. 1 and related equipment, in accordance with one embodiment of the invention.

FIG. 9 is a screen diagram of an example IPG screen in which the user has scrolled to a channel that includes a scheduled broadcast presentation of Barney to record episodes of Barney, in accordance with one embodiment of the invention.

FIG. 21 is a screen diagram of an example PVR channel configuration categories screen resulting from the user selecting the relative time recording time choice from the example screen shown in FIG. 20, in accordance with one embodiment of the invention.

FIG. 37 is a screen diagram of an example IPG screen that the user has evoked by scrolling to the right of the highlighted listing shown in the example screen shown in FIG. 36 in the Past Six Hours channel, in accordance with one embodiment of the invention.

FIG. 38 is a screen diagram of an example IPG screen that illustrates the PVR buffer channels, in accordance with one embodiment of the invention.

DETAILED DESCRIPTION OF THE PREFERRED EMBODIMENTS

Figure 1:
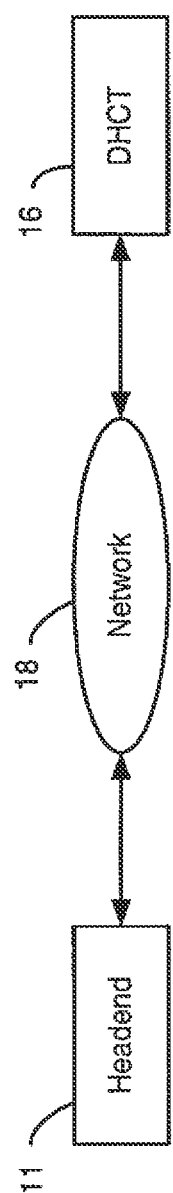
FIG. 1 is a block diagram of an example subscriber television system (STS), in accordance with one embodiment of the invention.

The preferred embodiments of the invention now will be described more fully hereinafter with reference to the accompanying drawings, in which preferred embodiments of the invention are shown. One way of understanding the preferred embodiments of the invention includes viewing them within the context of a subscriber television system, and more particularly within the context of a media client device, such as a digital home communication terminal (DHCT), that provides for user interaction with what is displayed on a television. Although other communication environments are considered to be within the scope of the preferred embodiments, the preferred embodiments of the invention will be described in the context of a DHCT that receives media content from a headend over a subscriber network as one example implementation among many.

Because the preferred embodiments of the invention can be well understood in the context of a subscriber television system environment, an initial description of a subscriber television system is followed with further description of the headend and DHCT (and coupled storage device) that are included within the subscriber television system. The preferred embodiments of the invention include, among other things, a system that displays information about media content recorded in the storage device that is coupled to the DHCT. Following the description of the subscriber television system components is a description of an interactive program guide (IPG), and how the preferred embodiments of the invention are used in the context of an IPG. The displayed information, or media content information, will preferably be manifested in one or more display channels in an IPG. An IPG is typically presented as a grid with rows of display channels and columns of time slots. Listings of current and scheduled media content instance presentations, preferably identified by title of a particular media content instance (e.g., TV episode, movie), are placed in the grid according to the scheduled presentation.

In the preferred embodiments, listings for the media content stored in a storage device coupled to the DHCT are presented in the IPG in a somewhat similar format to that used for broadcast media content. In one preferred embodiment, broadcast media content that is recorded (either temporarily or permanently recorded, including scheduled recordings, live recordings, or recordings designated as permanent from a storage buffer, among others) to the storage device automatically has the corresponding title displayed in a personal video recording (PVR) channel in the IPG within a time slot that reflects the duration of the recorded presentation.

Following the description of how the preferred embodiments can be used in an IPG is a description of how the preferred embodiments include a series of user interface screens for configuring PVR channels in the IPG. These screens, as will be explained below, can be evoked during the recording process of the PVR functions of the DHCT and/or via a user settings menu screen. In the preferred embodiments, the user can configure one or more PVR channels to reflect the type of media content that is recorded in the storage device. For example, assume the user desires to record all Barney episodes for his or her child. The user can configure the DHCT PVR functionality to record all episodes of Barney to the storage device. Also, the user can configure one of a plurality of PVR channels in the IPG to not only be entitled the Barney Channel, but also to display the titles of all of the recorded Barney episodes into the newly configured Barney channel. Displaying the titles, or other media content information, of the recorded media content into PVR channels in the IPG is herein referred to as channel mapping. Similarly, the user can configure other PVR channels based on the type of downloaded media content. For example, the user can configure a News Channel to channel map all of the instances of recorded news programming. Further, the user can configure time-based channels, such as a Last Night Channel to channel map all of the media content recorded from the prior evening, for example.

The preferred embodiments of the invention may, however, be embodied in many different forms and should not be construed as limited to the embodiments set forth herein; rather, these embodiments are provided so that this disclosure will be thorough and complete, and will fully convey the scope of the invention to those having ordinary skill in the art. Furthermore, all "examples" given herein are intended to be non-limiting, and are provided as an exemplary list among many other examples contemplated but not shown.

FIG. 1 is a block diagram depicting a non-limiting example of a subscriber television system (STS) 10. In this example, the STS 10 includes a headend 11 and a digital home communication terminal (DHCT) 16 that are coupled via a communications network 18. It will be appreciated that the STS 10 shown in FIG. 1 is merely illustrative and should not be construed as implying any limitations upon the scope of the preferred embodiments of the invention. For example, although single components (e.g., a headend and a DHCT) are illustrated in FIG. 1, the STS 10 can feature a plurality of any one of the illustrated components, or may be configured with alternative embodiments for any one of the individual components or with yet other additional components not enumerated above. Subscriber television systems also included within the scope of the preferred embodiments of the invention include systems not utilizing physical structured cabling for transmission, such as, but not limited to, satellite systems.

A DHCT 16 is typically situated at the residence or place of business of a user and may be a stand-alone unit or integrated into another device such as, for example, a television set or a personal computer or other display devices, or an audio device. The customer's premises may be a user's residence or place of business. The DHCT 16 receives signals (video, audio and/or other data) from the headend 11 through the network 18 and provides any reverse information to the headend 11 through the network 18.

The headend 11 receives, among other data and/or media content, program guide data from a program guide information provider (not shown). The program guide information (data) preferably comprises data corresponding to services that may be provided via the DHCT 16. The headend 11 edits the program guide data and transmits the edited program guide data to the DHCT 16 via the network 18. The headend 11 may include one or more server devices (not shown) for providing video and/or audio and/or data to media client devices such as the DHCT 16. The headend 11 and the DHCT 16 cooperate to provide a user with television services via the television (not shown). The television services may include, for example, broadcast television services, cable television services, premium television services, video-on-demand (VOD) services, and/or pay-per-view (PPV) services, among others.

FIG. 2 depicts a non-limiting example of selected components of a headend 11 that is configured in accordance with one embodiment of the present invention. It will be understood that the headend 11 shown in FIG. 2 is merely illustrative and should not be construed as implying any limitations upon the scope of the preferred embodiments of the invention. The headend 11 receives media content from a variety of service and content providers, which can provide input in a variety of ways. The headend 11 combines the media content from the various sources and distributes the media content to subscribers via the distribution systems of the network 18. The input signals may be transmitted from sources to the headend 11 via a variety of transmission paths, including satellites (not shown), and terrestrial broadcast transmitters and antennas (not shown).

A digital network control system (DNCS) 223 provides management, monitoring, and control of the network's elements and of the broadcast services provided to users. A content provider such as a program guide information provider transmits data for television program guides through a network interface 209 to the DNCS 223 of the headend 11, preferably using a file transfer protocol (FTP). The DNCS 223 includes functionality that defines relationships between channel names listed in the program guide data received from the program guide provider and the numbered channels that are available via the DHCT 16. This functionality is used by the DNCS 223 to edit the program guide data to include channel numbers that correspond to the listed channel names. After the program guide data is edited by the DNCS 223, it is transmitted to the DHCT 16 preferably using a broadcast file system (BFS) server 202. The BFS server 202 and its counterpart, a BFS client module 343 in the DHCT 16, are part of a file broadcasting system. The BFS server 202 repeatedly sends data through a network interface 206 to the DHCT 16 via a quadrature amplitude modulation (QAM) modem 203 over a period of time in a cyclical manner so that the DHCT 16 may access the data as needed. Of course other mechanisms and techniques may be utilized to transfer data to the DHCT 16.

A quadrature phase shift keying (QPSK) modem 207 is responsible for transporting out-of-band IP (internet protocol) datagram traffic between the distribution headend 11 and a DHCT 16. Data transmitted or received by the QPSK modem 207 may be routed by a headend router 208. The headend router 208 may be used to deliver upstream data to the various server applications (not shown).

Figure 3A:
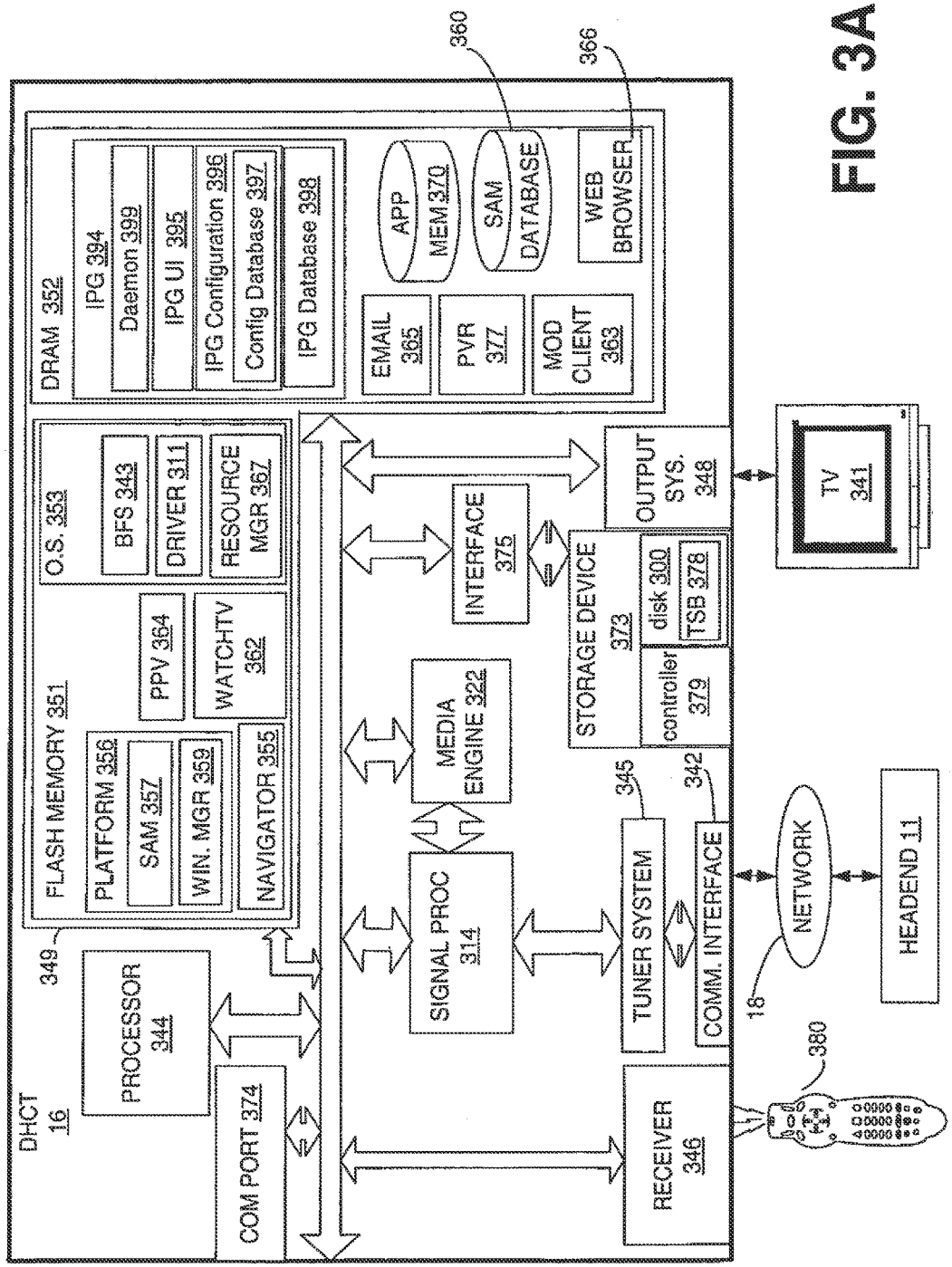
FIG. 3A is a block diagram of an example DHCT as depicted in FIG. 1 and related equipment, in accordance with one embodiment of the invention.

FIG. 3A is a block diagram illustration of an example DHCT 16 that is coupled to a headend 11 and to a television 341, in accordance with one embodiment of the invention. It will be understood that the DHCT 16 shown in FIG. 3A is merely illustrative and should not be construed as implying any limitations upon the scope of the preferred embodiments of the invention. For example, some of the functionality performed by applications executed in the DHCT 16 (such as an MOD application 363) may instead be performed completely or in part at the headend 11 and vice versa, or not at all in some embodiments. The DHCT 16 preferably includes a communications interface 342 for receiving signals (video, audio and/or other data) from the headend 11 through the network 18 and for providing any reverse information to the headend 11 through the network 18.

The DHCT 16 preferably includes one or more processors, such as processor 344, for controlling operations of the DHCT 16, an output system 348 for driving the television display 341, and at least one tuner system 345 for tuning into a particular television channel or frequency to display media content and for sending and receiving various types of data or media content to and from the headend 11. The DHCT 16 may include, in other embodiments, multiple tuners for receiving downloaded (or transmitted) media content. The tuner system 345 enables the DHCT 16 to tune to downstream media and data transmissions, thereby allowing a user to receive digital and/or analog media content delivered in the downstream transmission via the subscriber television system. The tuner system 345 includes, in one implementation, an out-of-band tuner for bidirectional QPSK data communication and one or more QAM tuners (in band) for receiving television signals. Additionally, a receiver 346 receives externally generated information, such as user inputs or commands from an input device, such as remote control device 380, or other devices.

The DHCT 16 processes analog and/or digital transmission signals for storage in the storage device 373, and/or for display to the television 341. The DHCT 16 preferably includes a signal processing system 314 and a media engine 322. The components of the signal processing system 314 are capable of QAM demodulation, forward error correction, and demultiplexing MPEG-2 transport streams, and parsing elementary streams and packetized elementary streams. Additional components, not shown, include an analog decoder and compression engine for processing an analog transmission signal and, in one implementation, converting it to compressed audio and video streams that are produced in accordance with the syntax and semantics of a designated audio and video coding method, such as specified by the MPEG-2 audio and MPEG-2 video ISO (International Organization for Standardization or ISO) standard, among others.

The signal processing system 314 outputs packetized compressed streams and presents them as input for storage in the storage device 373 via an interface 375, or in other implementations, as input to a media engine 322 for decompression by a video decompression engine (not shown) and an audio decompression engine (not shown) for display on the TV 341. One having ordinary skill in the art will appreciate that the signal processing system 314 will preferably include other components not shown, including memory, decryptors, samplers, digitizers (e.g., analog-to-digital converters), and multiplexers, among other components. Further, it will be understood that one or more of the components listed above will interface with the processor 344 and/or system memory 349 (and/or dedicated memory for a particular component), to facilitate data transfer and/or processing of the video and/or audio signal for display and/or storage.

One or more programmed software applications are executed by utilizing the computing resources in the DHCT 16. Note that an application typically includes a client part and a server counterpart that cooperate to provide the complete functionality of the application. The applications may be resident in FLASH memory 351 or downloaded (or uploaded) into DRAM 352. Applications stored in FLASH memory 351 or DRAM 352 are executed by the processor 344 (e.g., a central processing unit or digital signal processor) under the auspices of the operating system 353. Data required as input by an application is stored in DRAM 352 or FLASH memory 351 and read by the processor 344 as need be during the course of application execution. Input data may be data stored in DRAM 352 by a secondary application or other source, either internal or external to the DHCT 16, or possibly anticipated by the application and thus created with the application at the time it was generated as a software application, in which case it is stored in FLASH memory 351. Data generated by an application is stored in DRAM 352 by the processor 344 during the course of application execution. DRAM 352 also includes application memory 370 that various applications may use for storing and/or retrieving-data.

An application referred to as a navigator 355 is also resident in FLASH memory 351 for providing a navigation framework for services provided by the DHCT 16. The navigator 355 registers for and in some cases reserves certain user inputs related to navigational keys such as channel increment/decrement, last channel, favorite channel, etc. The navigator 355 also provides users with television related menu options that correspond to DHCT functions such as, for example, blocking a channel or a group of channels from being displayed in a channel menu presented on a screen display.

The FLASH memory 351 also contains a platform library 356. The platform library 356 is a collection of utilities useful to applications, such as a timer manager, a compression manager, a configuration manager, a hyper text markup language (HTML) parser, a database manager, a widget toolkit, a string manager, and other utilities (not shown). These utilities are accessed by applications via application programming interfaces (APIs) as necessary so that each application does not have to contain these utilities. Two components of the platform library 356 that are shown in FIG. 3A are a window manager 359 and a service application manager (SAM) client 357.

The window manager 359 provides a mechanism for implementing the sharing of the screen regions and user input. The window manager 359 on the DHCT 16 is responsible for, as directed by one or more applications, implementing the creation, display, and deallocation of the limited DHCT 16 screen resources. It allows multiple applications to share the screen by assigning ownership of screen regions, or windows. The window manager 359 communicates with the resource manager 367 to coordinate available resources (such as display memory) among different resource consuming processes. Such processes may be directly or indirectly invoked by one or more applications.

The SAM client 357 is a client component of a client-server pair of components, with the server component (not shown) being located on the headend 11, preferably in the DNCS 323 (FIG. 2). A SAM database 360 (i.e., structured data such as a database or data structure) in DRAM 352 includes a data structure of services and a data structure of channels that are created and updated by the headend 11. Herein, database will refer to a database, structured data or other data structures as is well known to those of ordinary skill in the art. Applications can also be downloaded into DRAM 352 at the request of the SAM client 357, typically in response to a request by the user or in response to a message from the headend 11. In the example DHCT 16 illustrated in FIG. 3A, DRAM 352 includes a media-on-demand (MOD) application 363, an e-mail application 365, a PVR application 377, and a web browser application 366. It should be clear to one with ordinary skill in the art that these applications are not limiting and merely serve as examples for embodiments of the invention. Furthermore, one or more DRAM based applications may be resident, as an alternative embodiment, in FLASH memory 351. These applications, and others provided by the subscriber television system operator, are top-level software entities on the network for providing services to the user.

FLASH also includes a BFS client module 343 that is preferably resident in the operating system 353, and which cooperates with a server counterpart (as described above) to provide a directory of modules such as applications that are cyclically broadcast.

An executable program or algorithm corresponding to an operating system (OS) component, or to a client platform component, or to an application, or to respective parts thereof, can reside in and execute out of DRAM 352 and/or FLASH memory 351. Likewise, data input into or output from any executable program can reside in DRAM 352 or FLASH memory 351. Furthermore, an executable program or algorithm corresponding to an operating system component, or to a client platform component, or to an application, or to respective parts thereof, can reside in FLASH memory 351, or in a local storage device (such as storage device 373) externally connected to or integrated into the DHCT 16 and be transferred into DRAM 352 for execution. Likewise, data input for an executable program can reside in FLASH memory 351 or a storage device and be transferred into DRAM 352 for use by an executable program or algorithm. In addition, data output by an executable program can be written into DRAM 352 by an executable program or algorithm and be transferred into FLASH memory 351 or into a storage device. In other embodiments, the executable code is not transferred, but instead, functionality is effected by other mechanisms.

The DHCT 16 can also include one or more wireless or wired interfaces, also called communication ports 374, for receiving and/or transmitting data to other devices. For instance, the DHCT 16 may feature USB (Universal Serial Bus), Ethernet (for connection to a computer), IEEE-1394 (for connection to media content devices in an entertainment center), serial, and/or parallel ports. The user inputs may be, for example, provided by an input device including a computer or transmitter with buttons or keys located either on the exterior of the terminal or by a hand-held remote control device 380 or keyboard that includes user actuated buttons, or even aural input (e.g., voice activated).

The DHCT 16 includes at least one storage device 373 to provide storage for downloaded media content. The storage device 373 can be an optical storage device or a magnetic storage device, among others, and is preferably a hard disk drive. The storage device 373 comprises storage for media content and/or data that can be written to for storage and later read from for retrieval for presentation. The storage device 373 preferably includes at least one hard disk 300. Throughout this disclosure, references relating to writing to or reading from the storage device 373, or references regarding recordings from or to the storage device 373 will be understood to mean that such read or write operations are occurring to the actual medium (for example, the hard disk 300) of the storage device 373. The storage device 373 is also comprised of a controller 379 that preferably receives operating instructions from the device driver 311 of the operating system 353 and implements those instructions to cause read and/or write operations to the hard disk 300.

The storage device 373 is preferably internal to the DHCT 16, coupled to a common bus through a communication interface 375, preferably an integrated drive electronics (IDE) interface or small computer system interface (SCSI), although IEEE-1394 or USB can be used. In other embodiments, the storage device 373 can be externally connected to (and thus removable from) the DHCT 16 via a communication port 374 implemented as IEEE-1394 or USB or as a data interface port such as a SCSI or an IDE interface. In one implementation, under the auspices of the real-time operating system 353 and executed by the processor 344, and in coordination with the personal video recording (PVR) application 377, the device driver 311, and the device controller 379, downloaded media content (herein understood to also refer to other types of data, in addition to, or instead of, media content instances) are received in the DHCT 16 via the communications interface 342, processed as described above, and stored in a temporary cache (not shown) in memory 349. The temporary cache is implemented and managed to enable media content transfers from the temporary cache to the storage device 373, or, in concert with the insertion of a newly arriving media content into the temporary cache.

In one implementation, the processor 344, in communication generally with the device driver 311 and the storage device controller 379 and the signal processing system 314, effect retrieval of compressed video streams, compressed audio streams, and data streams corresponding to one or more media content instances from the storage device 373. Retrieved streams are deposited in an output cache in the storage device 373 and transferred to DRAM 352, and then processed for playback according to mechanisms well known to those having ordinary skill in the art. In some embodiments, one or more media content instances are retrieved and routed from the hard disk 300 to the media engine 322 for video and audio decoding simultaneously, and then further processed for eventual presentation on a display device or other device.

The PVR application 377 provides for media content recording functionality by enabling the temporary writing to, and if requested, more permanent recording (i.e., relatively permanent) to the storage device 373. Media content can be transmitted (or downloaded) from a remote location, such as, for example, a remote server located in the headend 11, or from a home communication network, or from consumer electronic devices. Downloaded media content that is received at each tuner of tuner system 345 is temporarily stored, or buffered, on the hard disk 300 of the storage device 373. The corresponding space on the hard disk 300 is called buffer space, or a time shift buffer (TSB) 378. In a preferred embodiment, each tuner in tuner system 345 has a respective TSB 378. Although one TSB 378 is shown, it will be understood that more TSBs can be used with multiple tuners. Note that buffering is understood to include temporarily storing media content, received from a local attached device (e.g., a camera, etc.) and/or either from reception of a broadcast digital channel or a digital compressed version of a broadcast analog channel, and/or data, in the buffer space, or TSB 378, of the storage device 373.

Under normal operation, the PVR application 377 effectively associates a temporary recording designation with the media content received into the TSB 378. The media content stored in the TSB 378 will either be deleted (i.e., the clusters storing the media content will be configured as writeable for eventual write operations that overwrite the media content within those clusters) or retained (through election by the user as one example) as a permanent recording. A permanent recording will be understood to include media content that is stored for an extended period of time, for example as decided by the user. Permanent recordings can be implemented by the user electing in advance to make a scheduled recording of a media content instance that has not yet been tuned to at the DHCT 16. A permanent recording can also be achieved by selecting a media content instance stored in the TSB 378 and designating the media content instance as permanent. Permanent recordings will preferably be more permanent than media content in the TSB 378, and permanent recordings can eventually be deleted from the disk space, typically at the explicit request of a user, as one example. The PVR application 377 maintains a data structure, or data record, for every downloaded media content instance. This data structure is preferably maintained on the hard disk 300 of the storage device 373, but can be maintained in memory 349 also.

The time shift buffer can be managed and implemented according to several mechanisms. Further information pertaining to creating and maintaining the TSB 378, as well as information pertaining to the processing of incoming digital and/or analog transmission signals, can be found in the applications entitled, "Controlling Substantially Constant Buffer Capacity for Personal Video Recording with Consistent User Interface of Available Disk Space," filed Dec. 6, 2001 under application Ser. No. 10/010,270, which issued on Jun. 14, 2011 as U.S. Pat. No. 7,962,011; "Converting Time-Shift Buffering for Personal Video Recording Into Permanent Recordings," filed Dec. 6, 2001 under application Ser. No. 10/008,624, which issued on Aug. 14, 2007 as U.S. Pat. No. 7,257,308; "Dividing and Managing Time-Shift Buffering into Program Specific Segments Based on Defined Durations," filed Dec. 6, 2001 under application Ser. No. 10/008,439, which published on Jun. 12, 2003 as U.S. Publication No. 2003/0110504 A1; "Disk Driver Cluster Management of Time Shift Buffer with File Allocation Table Structure," filed Dec. 5, 2001 under application Ser. No. 10/005,628, which issued on Mar. 20, 2007 as U.S. Pat. No. 7,194,563; and "Application Management and Interface for Cluster Control of Time Shift Buffer," filed Dec. 5, 2001 under application Ser. No. 10/010,781, which issued on Jun. 23, 2009 as U.S. Pat. No. 7,551,832, all assigned to Scientific Atlanta, and all herein entirely incorporated by reference.

Figure 3B:
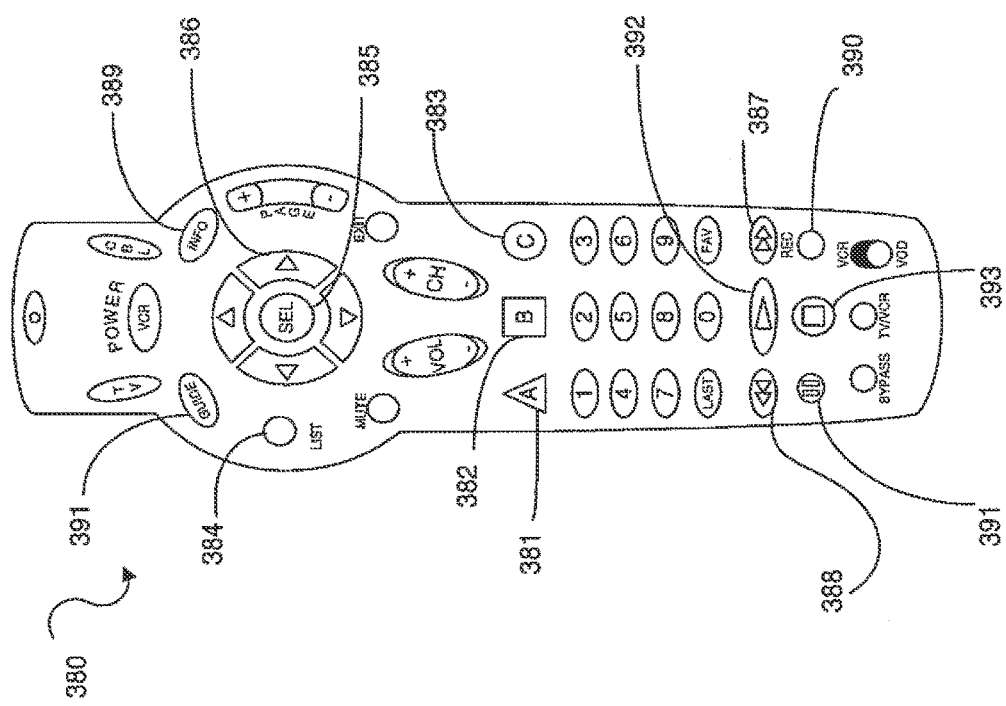
FIG. 3B is a schematic diagram of an example remote control device to provide input to the DHCT 16 illustrated in FIG. 3A, in accordance with one embodiment of the invention.

As described above, the user preferably permanently records from the TSB 378 by designating as permanent a currently viewed media content instance during real-time viewing or returning (e.g., rewinding) to any part of a media content instance in the TSB 378 and selecting the record button from a remote control device 380, or alternatively, from selecting a record button (not shown) on the DHCT 16. In one preferred embodiment, the user can record from an IPG screen, as will be described below. An example remote control device 380 to provide input to the DHCT 16 is illustrated in FIG. 3B. Rewind 388 and fast-forward 387 buttons enable a user to access buffered media content instances in the TSB 378. Record button 390 enables the user to designate as permanently recorded any media content instance buffered into the TSB 378, or to schedule recordings. Pause button 391 or the stop button 393 enables the user to pause a media content instance, or pause during a search for a particular media content instance. Playback 392 enables the playback of a media content instance. "A" 381 "B" 382, and "C" 383 buttons can correspond to certain application-defined functions that have a corresponding "A", "B", or "C" symbol displayed in a graphic user interface (GUI) presented on a display device. List button 384 can be used to evoke various PVR user interface screens. The guide button 391 may be used to access a television program guide such as, for example, an IPG screen. The information button 389 can be used to access additional information about a particular media content instance. Many alternative methods of providing user input may be used including a remote control device with different buttons and/or button layouts, a keyboard device, a voice activated device, etc. The embodiments of the invention described herein are not limited by the type of device used to provide user input.

Referring again to FIG. 3A, the IPG application 394 displays a program guide to the user and populates the guide with information about television services. The IPG application 394 includes an IPG user interface module 395 that creates an IPG for presentation to the user. The IPG user interface module 395 accesses configuration settings stored in an EPG configuration module 396 to implement an appropriate configuration for the IPG. The EPG configuration module 396 preferably includes a configuration database 397 for storing a plurality of IPG configurations. The IPG user interface module 395 populates the IPG with information contained in an IPG database 398. The IPG database 398 contains data files corresponding to current and future services that are or will be available via the DHCT 16 and/or other local devices.

Based on the configuration information stored in the IPG configuration module 396, the IPG user interface module 395 utilizes the window manager 359 and other graphics utilities provided by the operating system 353 to render an IPG on the television 341. The window manager 359 is a component that, in one embodiment, is part of the platform 356, but in other embodiments may be part of the operating system 353. The window manager 359 contains functionality for allocating screen areas and managing screen use among multiple applications. The operating system 353 provides primitives to the IPG user interface module 395 in order to help render images on the television 341.

As a window is generated on a display device, the IPG user interface module 395 registers with the window manager 359 for particular user input commands that may be required for selecting options provided by a newly-created window. The EPG application 394 also contains a daemon application 399 that receives IPG data files transmitted by the headend 11 and stores them in the IPG database 398 for utilization by the user interface module 395. The PVR application 377 also includes functionality for searching for and retrieving from multiple sources of PVR media content and/or data for storage in the IPG database 398. Such sources include, for example, the storage device 373 or a navigator database (not shown), or other pluggable database modules (not shown).

Figure 4:
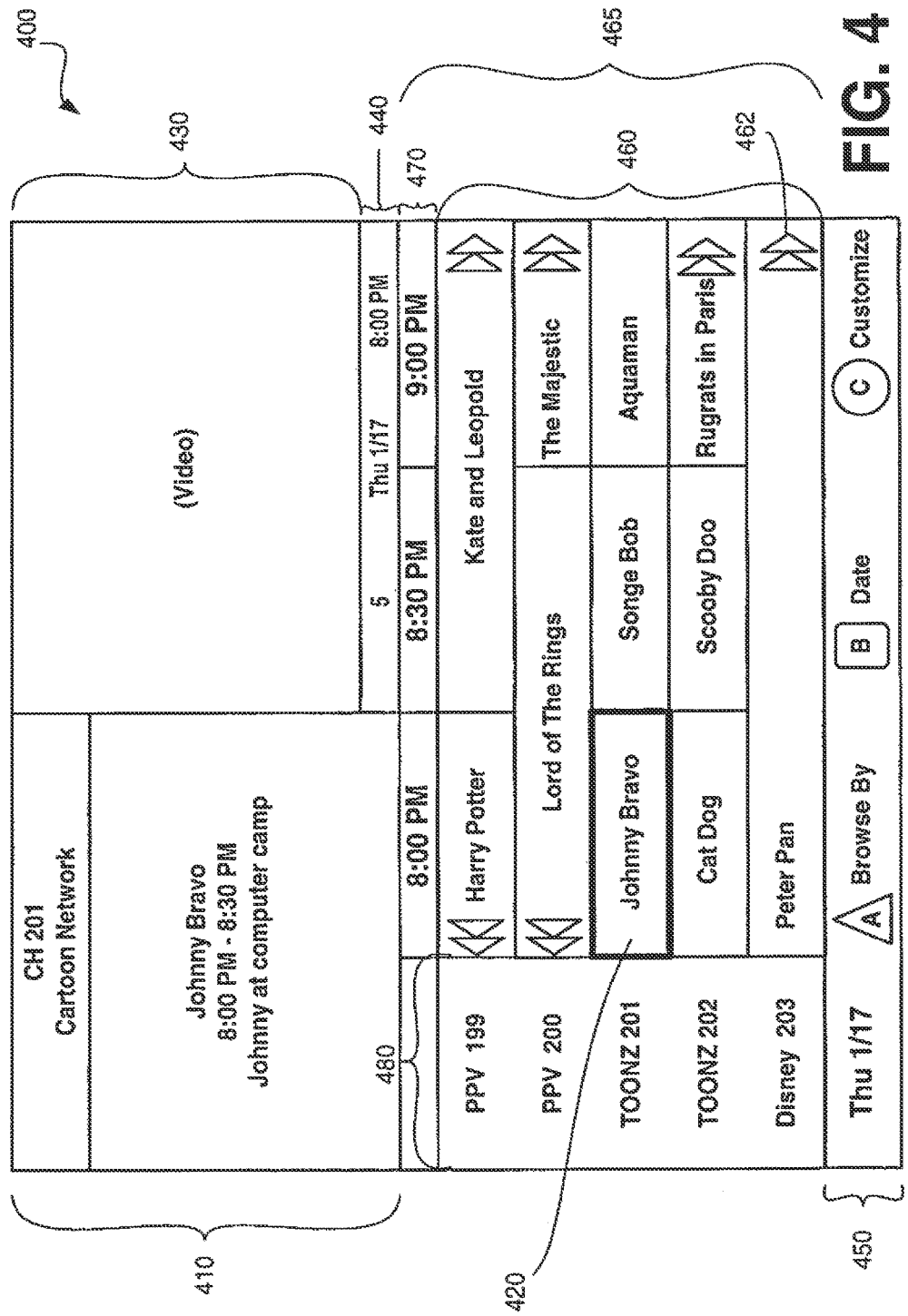
FIG. 4 is a screen diagram of an example interactive program guide (IPG) screen from which the user has selected a Johnny Bravo listing for permanent recording, in accordance with one embodiment of the invention.

FIG. 4 depicts an example IPG screen 400 that illustrates an initial program guide arrangement in a time format. Other browse-by formats can be presented to the user, including, browse-by theme, as one example. The example IPG screen 400 can be presented by the IPG application 394 (FIG. 3A) in response to a user activating the guide key 391 (FIG. 3B), as one example. The IPG application 394 works in cooperation with the window manager 359 (FIG. 3A) to present a user with IPG screens that are formatted in accordance with IPG configuration data that is stored in configuration database 397 (FIG. 3A). Furthermore, an IPG application 394 can retrieve media content instance listing information from the IPG database 398 (FIG. 3A) as needed for presentation via an IPG screen. The top left portion of the IPG screen 400 is a detailed focus area 410 that includes detailed information for a currently highlighted media content instance listing which, in the current example, is the Johnny Bravo listing 420. The detailed media content instance listing information may include display channel number, service name (e.g., Cartoon Network), media content instance listing title (e.g., Johnny Bravo), media content instance listing description, media content instance listing duration, and/or any episode information or rating, as well as recording information for the PVR display channels, as is described below.

Video corresponding to the television service to which the DHCT 16 (FIG. 3A) is currently tuned (for which audio may also be playing, and which preferably corresponds to a television presentation occupying the full screen before the user is presented with the IPG screen 400) is displayed in a video area 430. Immediately below the video area 430 is an information banner 440 for displaying the television display channel number corresponding to the service to which the DHCT 16 is currently tuned (e.g., display channel 5), the current day and date (e.g., Thursday, January 17), and the current time (e.g., 8:00 p.m.).

An IPG grid 465 includes a main media content instance listing display area 460, a time area 470, and a service identification area 480. The media content instance listing display area 460 contains listings of service instances that correspond to respective television services identified in the service identification area 480 that are scheduled to be available during the time periods listed in the time area 470. Each media content instance listing is preferably formatted as a rectangle, or block, that has a length that depends on the duration of the scheduled presentation of the media content instance. The media content instance listing, such as the Johnny Bravo listing 420, includes an identifier such as the title of the media content instance (e.g., Johnny Bravo), and can include other identifiers like parental control icons or differences in shading and/or color to represent different functionality. The service identification area 480 includes, in one implementation, a vertical list of television services organized sequentially from top to bottom by increasing television display channel number (except for the highest numbered television service which is typically listed immediately above the lowest numbered television service). In one embodiment, the arrow buttons 386 of the remote control device 380 (FIG. 3B) can be used to scroll through the media content instance listing display area 460 to highlight a desired media content instance listing, such as the Johnny Bravo listing 420. As a user scrolls in time across a calendar day boundary, the day and date indications displayed in various areas are updated.

In this non-limiting example, the left-most time column (i.e., under the 8:00 time slot) in the media content instance listing display area 460 includes the titles of media content instance listings, including the highlighted Johnny Bravo listing 420, which is scheduled to be provided via the Cartoon Network (i.e., Toonz on display channel number 201). It should be noted that the current media content instance listing shown in video area 430 with corresponding information referenced in information banner 440, corresponds to the currently tuned television service (display channel number 5), and not to the service corresponding to the currently highlighted Johnny Bravo listing 420. The bottom area 450 of the IPG screen 400 indicates the selected day for which media content instance listing data is being displayed as well as information about the current functions of the "A", "B", and "C" buttons on the remote control device 380 (FIG. 3B).

In an alternative embodiment, the IPG screen 400 may have fewer, additional, and/or different components and may have a different layout. For example, the IPG screen 400 might not include one or more of a detailed focus area 410, a video area 430, an information banner 440, and/or a bottom area 450. The double arrow icons 462 indicate that a given media content instance listing has a duration that expands beyond the time period shown in the current IPG display screen, suggesting to the user that the balance of the listing can be viewed in another IPG display by selecting the right or left navigation arrow buttons 386 on the remote control device 380 (FIG. 3B), depending on the direction of the double arrow icon 462. Note that the functions of highlighting, scrolling, and other navigation functions for interacting with a particular screen involve selecting buttons on the remote control device 380 that often correspond to symbols displayed on the screen. It will be understood that terminology that describes making selections on a particular screen will be understood to include making the corresponding selections using a remote control device 380. Other input devices contemplated to be within the scope of the preferred embodiments of the invention include a touch screen, a mouse, an IR keyboard, among others.

Figure 5:
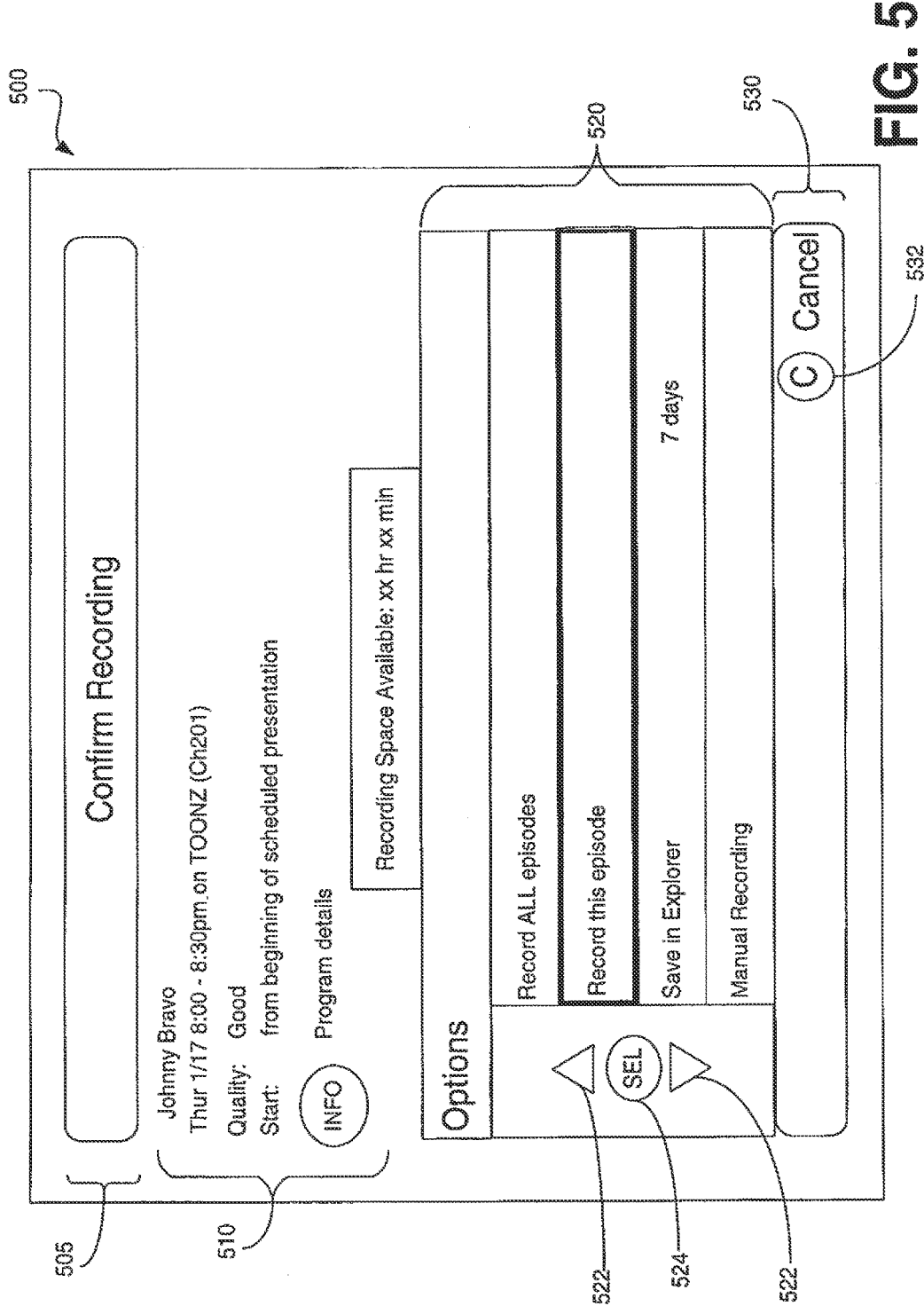
FIG. 5 is a screen diagram of an example confirm recording screen from which the user selects to record the episode of Johnny Bravo selected from the example IPG screen of FIG. 4, in accordance with one embodiment of the invention.

In one preferred embodiment, the IPG application 394 (FIG. 3A) will be used in cooperation with the PVR application 377 (FIG. 3A) to provide channel mapping of media content stored in the storage device 373 (FIG. 3A). More specifically, media content stored in buffer (e.g., TSB 378) and non-buffer space on the hard disk 300 (FIG. 3A) of the storage device 373 will have display channel listings in the IPG screen 400. Further, each individual display channel row for PVR content will preferably be segmented into listings that are formatted as titled blocks, with the boundaries of each block preferably representing the duration of each recorded media content instance (wherein recorded media content instance includes scheduled recordings, active recordings, and completed recordings) stored or scheduled to be stored in the storage device 373 (FIG. 3A). PVR channel mapping into an IPG screen can be implemented through the use of a user settings menu (not shown), or during the recording process from the IPG screen 400. For example, starting with the recording process implementation, the user can highlight one of the media content instance listings in the media content instance listing display area 460, and press the record button 390 (FIG. 3B) on the remote control device 380 (FIG. 3B) to initiate permanent recordings for the selected media content instance. Assume the user has highlighted the Johnny Bravo listing 420, and selected the record button 390. In response, the user will be presented with an example confirm recording screen 500, as shown in FIG. 5.

Figure 6:
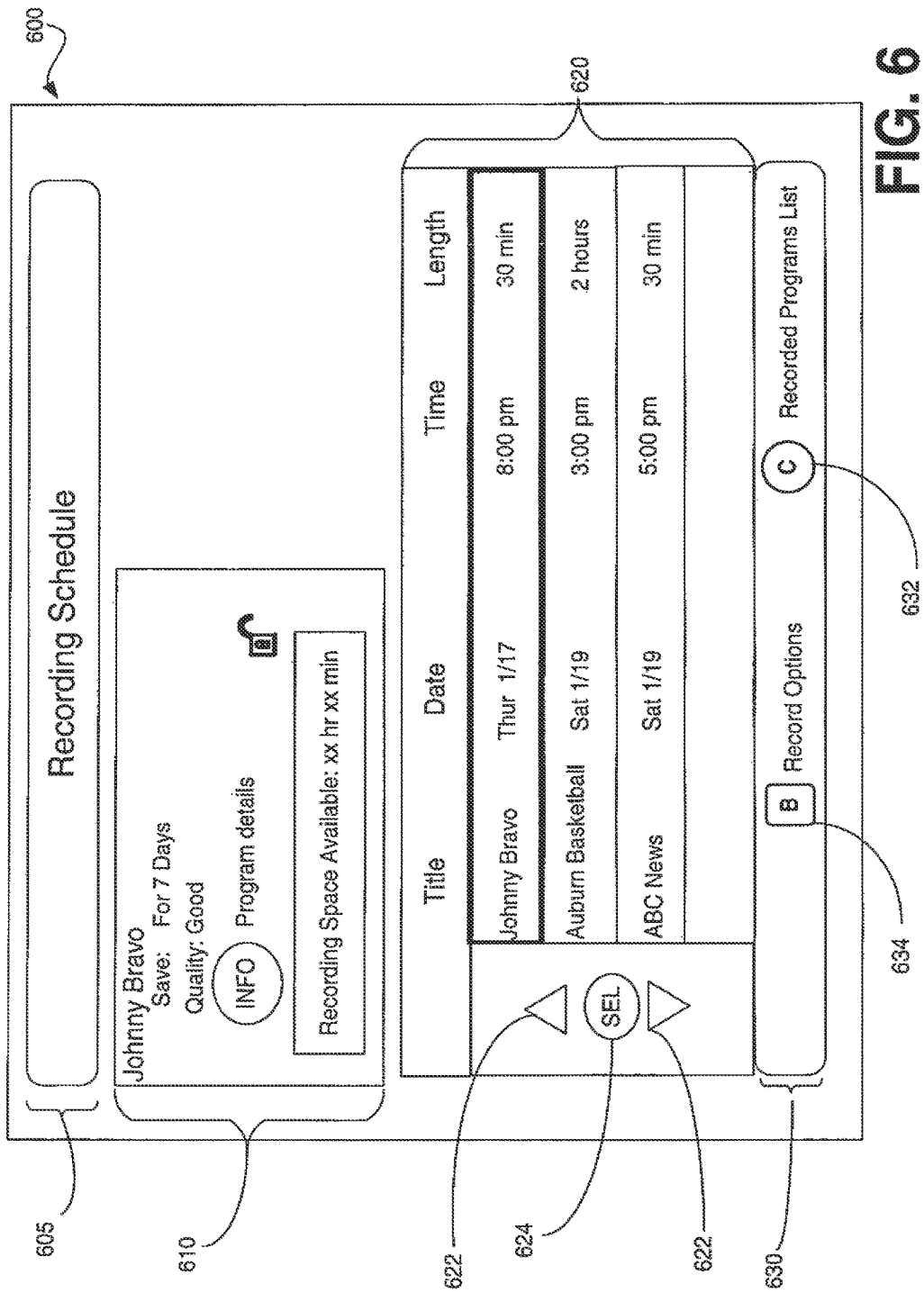
FIG. 6 is a screen diagram of an example recording schedule screen that results from the user selecting to record the episode of Johnny Bravo in the example confirm recording screen of FIG. 5, in accordance with one embodiment of the invention.

The example confirm recording screen 500 includes a confirm recording header 505 to identify the screen 500. Also included is an information area 510, that includes the title of the media content instance (e.g., Johnny Bravo), the date, time, display channel, and associated service of the scheduled presentation, as well as the default quality and the default start time, which in this case is from the beginning of the scheduled presentation. Note that the quality refers to the recording quality level. In one implementation, there exists three recording quality levels: good (with a video data rate of 3 MegaBytes per second), better (5 MegaBytes per second), and best (8 Megabytes per second). Other data rates and quality levels can also be used in other embodiments. Also included is an information button icon, which corresponds to the information button 389 on the remote control device 380 (FIG. 3B) to provide further media content instance information. The confirm recording screen 500 also includes an options block 520, which includes such options as the ability to record all episodes, to record this single episode, among other options shown and not shown. The user preferably scrolls through these options in the options block 520 by using the arrow buttons 386 (FIG. 3B) of the remote control device 380, as suggested by the navigation arrow icons 522. The blocks of the option block 520 preferably become highlighted as the user scrolls to the block. The user can select one of the options of the option block 520 as suggested by the select button icon 524, which corresponds to the select button 385 (FIG. 3B) on the remote control device 380. Also included is a bottom area 530, which includes a cancel button icon 532. Assume in this example that the user desires to record this episode of Johnny Bravo, and does so by highlighting and selecting the "record this episode" option in the option block 520. This selection results in the user being presented with an example recorded programs list screen 600, as shown in FIG. 6.

The example recording schedule screen 600 includes a recording schedule header 605, an information area 610, a list block 620, and a bottom area 630. As shown, the information area 610 includes the title of the selected media content instance for recording, as well as default values for the amount of days the media content instances will be saved (e.g., for seven days). Other default values include the quality, which is shown here as "good," as well as an information button icon as described in respect to FIG. 5. Also note the open padlock icon, signifying a parental control feature that is not enabled (thus permitting a user to view the associated media content instance without the requirement for inputting a personal identification number). The list block 620 shows Johnny Bravo as one of the current scheduled recordings. As shown by the highlighted block in the list block 620, Johnny Bravo is listed as an entry scheduled to be recorded on Thursday, the 17th of January, at 8:00 p.m., with a duration of 30 minutes. Further note that the list block 620 includes the select button icon 624 for making a selection and navigation arrow icons 622 for scrolling to the next displayed entry, as described in association with FIG. 5. Assume the user previously scheduled to record an Auburn basketball game on Saturday afternoon, as well as the ABC news later that same afternoon. The bottom area 630 includes two navigation button icons corresponding to the lettered navigation buttons 382 and 383 on the remote control device 380 (FIG. 3B). The recorded programs list button icon 632, when selected, presents the user a list of recordings stored in the storage device 373 (FIG. 3A). The record options button icon 634, presents the user with various recording options, including changing the default values of the information area 610. At this point, the user now has the Johnny Bravo episode scheduled to be recorded into the storage device 373, along with other scheduled recordings.

Figure 7:
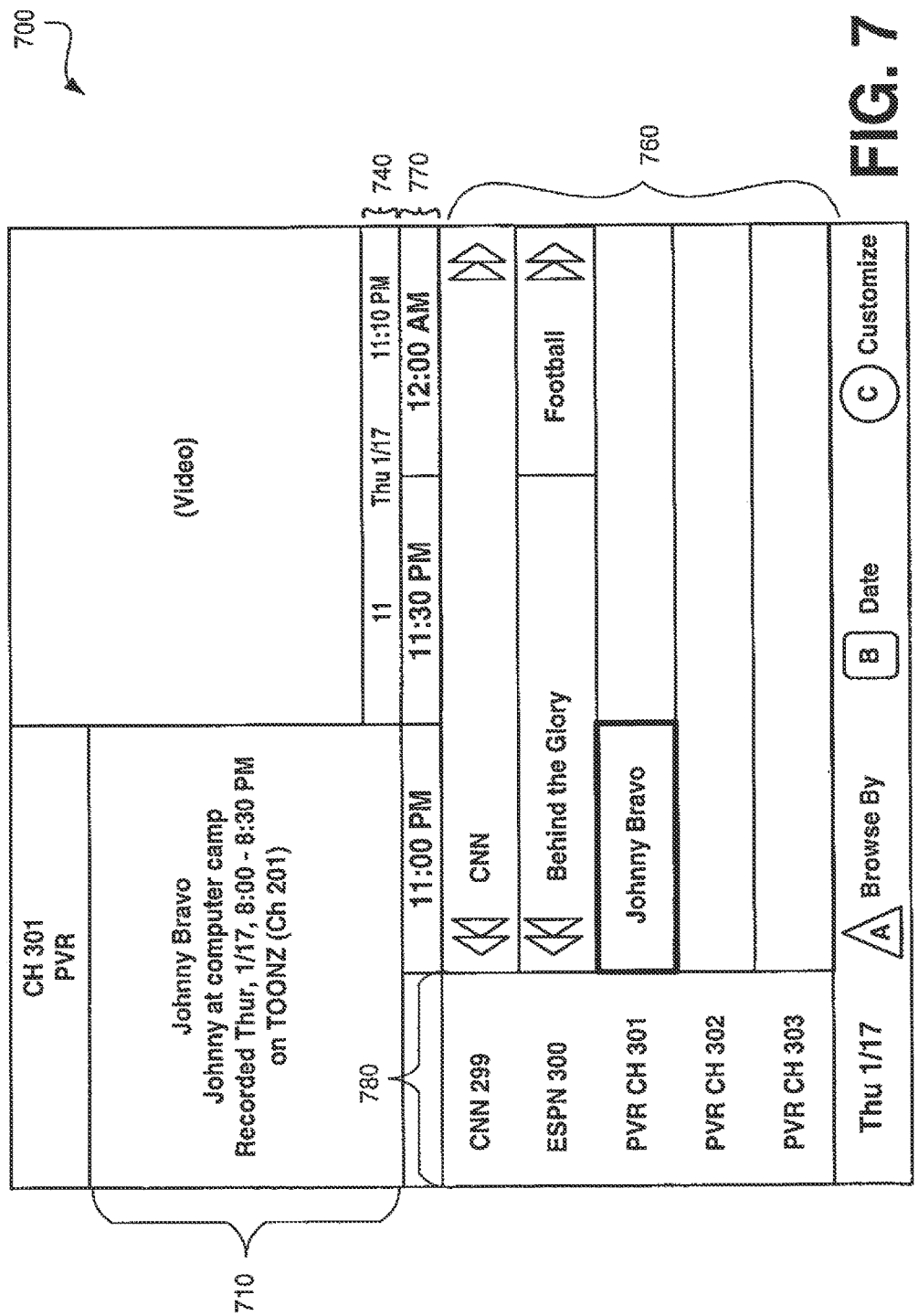
FIG. 7 is a screen diagram of an example IPG screen, prompted by the user after the scheduled recording of the Johnny Bravo episode, the title of which is displayed in a Personal Video Recording (PVR) channel, in accordance with one embodiment of the invention.

FIG. 7 is a screen diagram of an example IPG screen 700 similar to the IPG screen 400 of FIG. 4, but with PVR channels shown. This screen 700 can be evoked by the user through the selection of the guide button 391 (FIG. 3B), as one example. FIG. 7 is used to illustrate how scheduled recorded media content that has not been configured for a particular PVR channel is automatically mapped to a miscellaneous, or default, PVR channel (e.g., PVR channel 301). In other embodiments, all recorded media content, scheduled, configured for a particular PVR channel, or otherwise, can have a corresponding listing displayed in the default PVR channel. Assume the user has evoked this screen 700 after the scheduled recording times for Johnny Bravo have passed (e.g., it is now 11:10 p.m. on Thursday, as shown by the information banner 740), and that the user has scrolled to the PVR channels. Note that in other embodiments, after the user has scheduled the recording in the confirm recording screen 500 (FIG. 5), the listings for the scheduled media content instances can be displayed in the PVR channel in an IPG screen and be distinguished from listings corresponding to completed recordings, such as by a different color, as one example. The user can configure this feature, for example, in a record options screen, or a general settings menu. The currently displayed PVR channels 301 through 303 are shown in the service identification area 780. As illustrated, Johnny Bravo is the recorded media content instance that has been automatically channel mapped into the IPG screen 700, in accordance with one embodiment. The PVR channel 301, in one implementation, can be a default, or miscellaneous, PVR channel among the plurality of PVR channels for recorded media content. Note that the detailed focus area 710 preferably includes the time, date, and/or channel of the recording of the highlighted listing (e.g., the Johnny Bravo listing).

In a preferred embodiment, the blocks representing the recorded media content listings in the PVR channel 301 can be in synchronization with the time periods illustrated in the time area 770. In other words, the PVR channel media content listings are preferably aligned along the time area 770, having a similar appearance to the listings associated with broadcast media content. For example, since Johnny Bravo is a half hour presentation, its block boundaries in the IPG screen 700 are defined by the column positioned between the beginning of the 11:00 p.m. time slot and the beginning of the 11:30 p.m. time slot illustrated in the time area 770. In one implementation, because the media content instance listings in the IPG screen 700 for PVR content are synchronized with the time indicated in the time area 770, a user selecting Johnny Bravo for playback at the current time of 11:10 p.m. will be positioned 10 minutes into the presentation (i.e., ten minutes past the relative hour) of Johnny Bravo. Thus, at the end of the presentation of a recorded media content instance, the user can go to other display channels, for example, broadcast channels, to view from the beginning of a scheduled presentation of one of the broadcast media content. Further, scheduled live broadcasts can be inserted into the PVR channel, as described above, providing the user the opportunity to view the presentation while it is being recorded. In other embodiments, the user can choose to be positioned at the beginning of the presentation of the selected media content instance, regardless of what the current time is relative to the hour. This positioning can be user configurable via a user settings menu, as one example. Note that as time advances, as shown in the time area 770, the relative positions of the media content listings with respect to the boundaries of the media content instance listing display area 760 for the PVR channels remains the same in the IPG screen 700. For example, when the IPG screen 700 advances to 12:30 p.m., Johnny Bravo will still positioned relative to the hour, starting at the left-most position of the IPG grid (i.e., the under the 12:30 column). An exception to this relative positioning occurs when scheduled media content is inserted into the PVR channel, since the scheduled recordings will preferably be tied to a set, or scheduled presentation time.

In other embodiments, the time area 770 can take on other forms and functionality. Unlike broadcast media content, PVR listings that are associated with completed recordings can be viewed at any time. Thus, when a listing in a PVR channel is selected, the time area 770 can be altered to reflect this selection and accessibility feature. For example, responsive to selecting a listing in a PVR channel, the time area 770 can be grayed out. In another embodiment, the time area 770 can depict the duration in "seconds," and/or "minutes," and/or "hours" of each recorded media content instance. Other embodiments include not having a time area, or having a time area with index numbers corresponding to the number and/or the recorded sequence of the recorded media content, or a ticker banner, among others. The ticker banner can include a scrolling banner that is displayed to the user when he or she has highlighted one of the listings for recorded media content instances displayed in the PVR channels. In other embodiments, the time area can still illustrate the current time increments by half an hour (as shown by the IPG screen 700), but have relevance only to broadcast media content.

Figure 8:
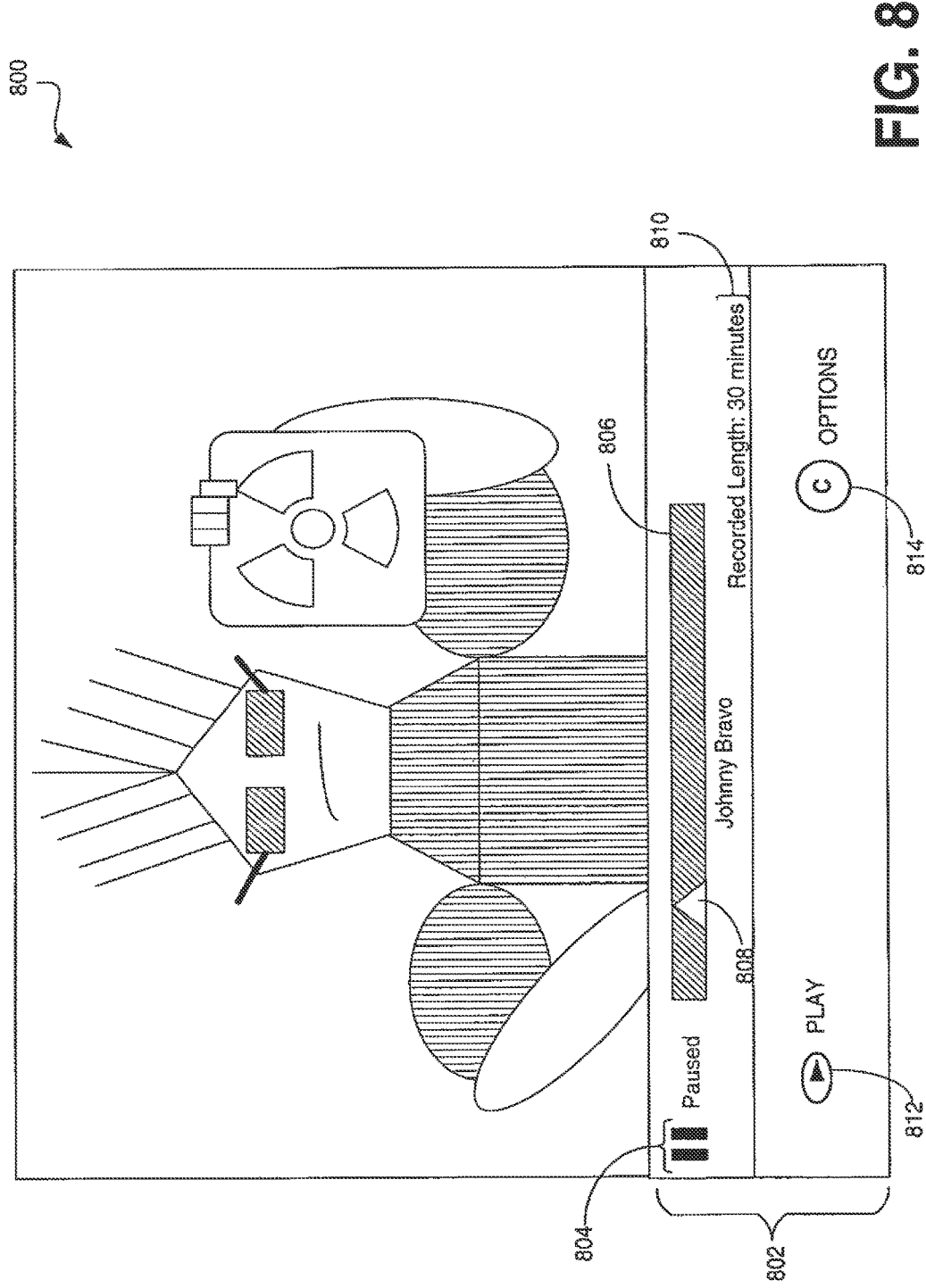
FIG. 8 is a screen diagram of an example screen display of the presentation of Johnny Bravo, prompted by the user selecting the Johnny Bravo episode in the IPG of FIG. 7, with a pause banner and playback bar overlaid on the display of Johnny Bravo, in accordance with one embodiment of the invention.

FIG. 8 is a screen diagram of an example display of the presentation of Johnny Bravo after highlighting and selecting the Johnny Bravo listing from the IPG screen 700 (FIG. 7). As described above, the user has selected Johnny Bravo ten minutes past the start of the presentation of Johnny Bravo, and thus is placed ten minutes into the presentation, in one implementation. Overlaid on the presentation of Johnny Bravo is a pause banner 802. The pause banner 802 can be evoked by pressing the pause button 391 on the remote control device 380 (FIG. 3B), as one example. The PVR application 377 (FIG. 3A) recognizes this keypress event and subsequently, in cooperation with the operating system 353 (FIG. 3A), causes the current picture frame to "freeze". Further, the PVR application 377 generates the pause banner 802 and components therein based largely on the data maintained in a data structure maintained by the PVR application 377. The pause banner 802 includes several descriptive elements, including a pause icon 804, and a playback bar 806. The playback bar 806 represents both the scheduled presentation duration and the recorded duration of Johnny Bravo. Since Johnny Bravo was recorded in its entirety, the playback bar 806 will preferably have a uniform color, as indicated by the uniform hashing within the playback bar 806.

If there was a portion of Johnny Bravo that was not recorded, the playback bar 806 would preferably be divided into two distinct regions. For example, the unrecorded portion can be colored red, and the recorded portion can be colored green, as one example. Such a scenario can arise for scheduled recordings (i.e., scheduled to be recorded in the future), and/or recordings that are in progress, as non-limiting examples. It would be understood, in the context of the detailed description, that other mechanisms can exist to indicate the difference between unrecorded and recorded content including differences in gray shading, etc. The playback bar 806 also includes a playback position indicator 808. As described earlier, the user is positioned, in one implementation, in the presentation of Johnny Bravo ten minutes past the start of the scheduled presentation of Johnny Bravo. The playback position indicator 808 reflects this relative position. The recorded length of Johnny Bravo is also indicated in the recorded length area 810. The pause banner 802 also includes a play button icon 812 and an options button icon 814. The user might select the options button icon 814, for example, to delete a selected recorded media content instance. Preferably, by selecting a delete option (not shown) in a screen prompted by the selection of the options button icon 814, the corresponding listing will also be removed from the IPG screen 700 (FIG. 7). The user can begin the playback presentation of Johnny Bravo by selecting the play button 392 on the remote control device 380 (FIG. 3B). The user can also choose to rewind to the beginning of Johnny Bravo, by selecting the rewind button 388 on the remote control device 380. The options button icon 814 can be selected (i.e., via the remote control device 380) to choose various PVR options, such as creating a PVR channel, as will be described below. Further information on the playback bar 806 and the pause banner 802 can be found in the patent application entitled, "Program Position User Interface for Personal Video Recording Time Shift Buffer," filed Dec. 20, 2001 under application Ser. No. 10/034,028, which issued on Jun. 1, 2004 as U.S. Pat. No. 6,744,967, assigned to Scientific Atlanta, and herein entirely incorporated by reference.

Figure 10:
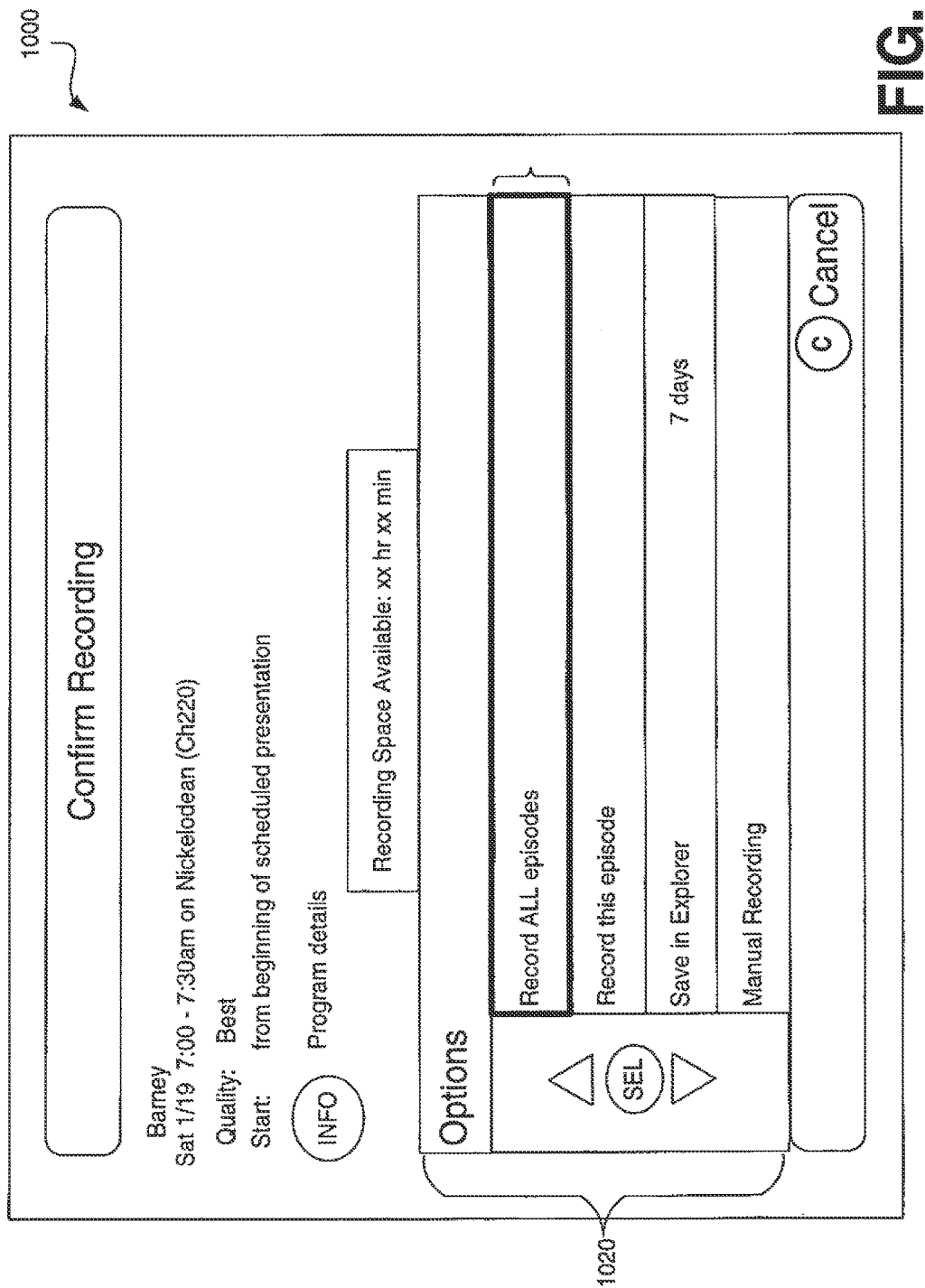
FIG. 10 is a screen diagram of an example confirm recording screen prompted by the user selecting to record the Barney episode from the example IPG screen of FIG. 9, in accordance with one embodiment of the invention.

FIG. 9 is a screen diagram of an example IPG screen 900 that is used to illustrate how a user can configure a PVR channel. Assume the user has decided that he or she wants to record the Barney program (in addition to other Barney programs), which begins at 7:00 a.m. and runs until 7:30 a.m. As indicated, the user has highlighted the Barney listing 920 in the Nickelodeon channel 220 scheduled to begin at 7:00 a.m. The user presses the record button 390 on the remote control device 380 (FIG. 3B), and in response, the example confirm recording screen 1000 is displayed, as shown in FIG. 10.

Figure 11:
FIG. 11 is a screen diagram of an example recording schedule screen resulting from the user selecting to record all episodes of Barney from the example confirm recording screen of FIG. 10, in accordance with one embodiment of the invention.
Figure 12:
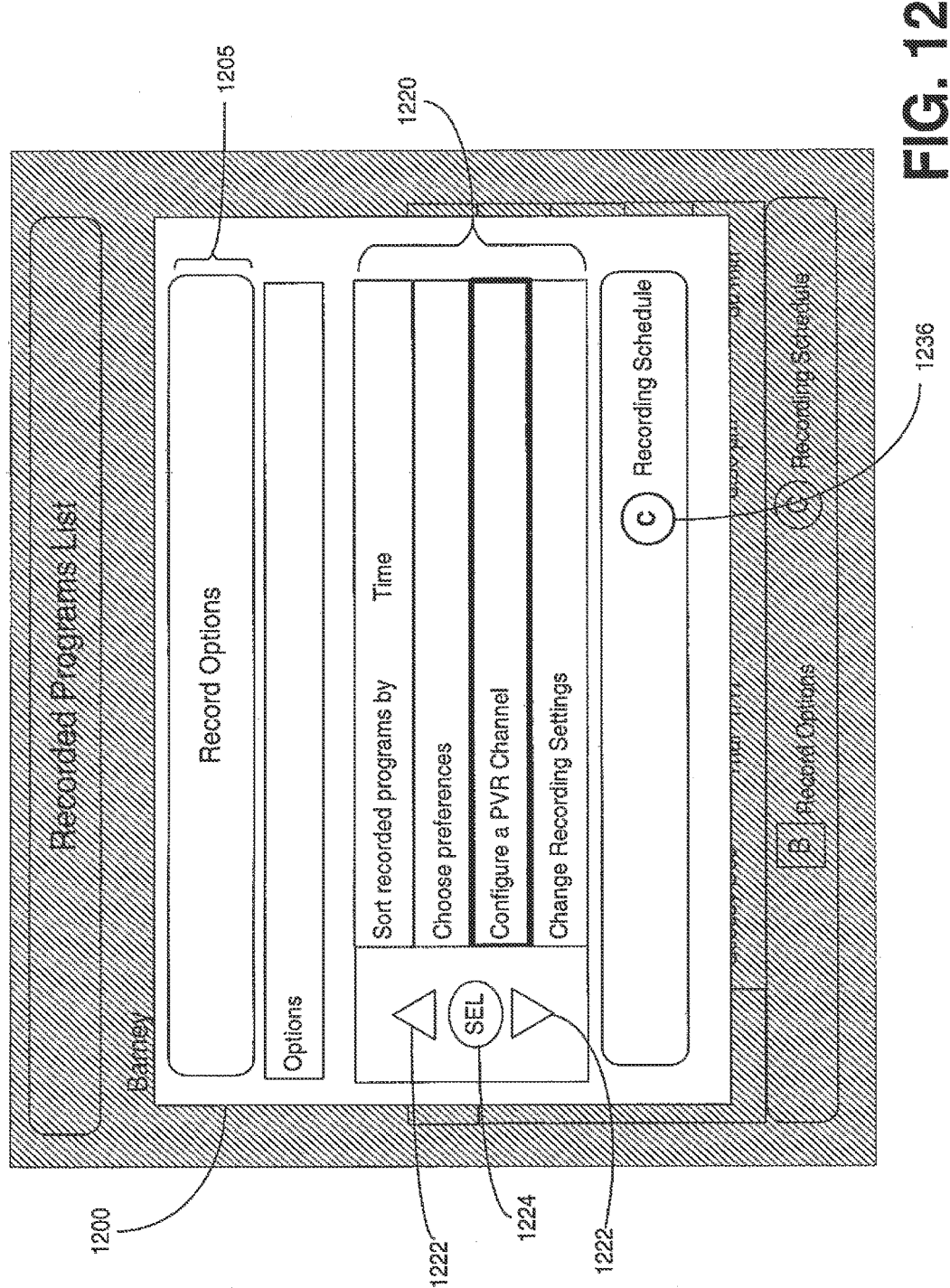
FIG. 12 is a screen diagram of an example record options screen presented to the user after selecting a record options button from the example recording schedule screen of FIG. 11, in accordance with one embodiment of the invention.

Assume the user has decided to record all episodes of Barney and in addition, the user has decided that he or she wants to configure a PVR channel as a Barney channel. By highlighting and selecting the "record all episodes" option in the options block 1020 of the confirm recording screen 1000, the user is presented with the example recording schedule screen 1100 as shown in FIG. 11. Reviewing the list block 1120 of the recording schedule screen 1100, the user has selected all episodes of Barney for recording. Preferably, the episodes of Barney for recording that will be presented on Saturday, January 19, the current day in this example, are listed, as well as other scheduled recorded programs for Saturday, such as the Auburn basketball game as mentioned above. In one embodiment, the Barney episodes scheduled for recording can be displayed in the list block 1120 for a defined period, such as one day, several days, one week, etc. This defined period can be user configurable in other screens prompted by selecting the record options button icon 1122. Continuing with the example, the user has highlighted the Barney episode shown in the top row of the list block 1120, and has selected the record options button icon 1122. The resulting screen is shown in FIG. 12.

Figure 13:
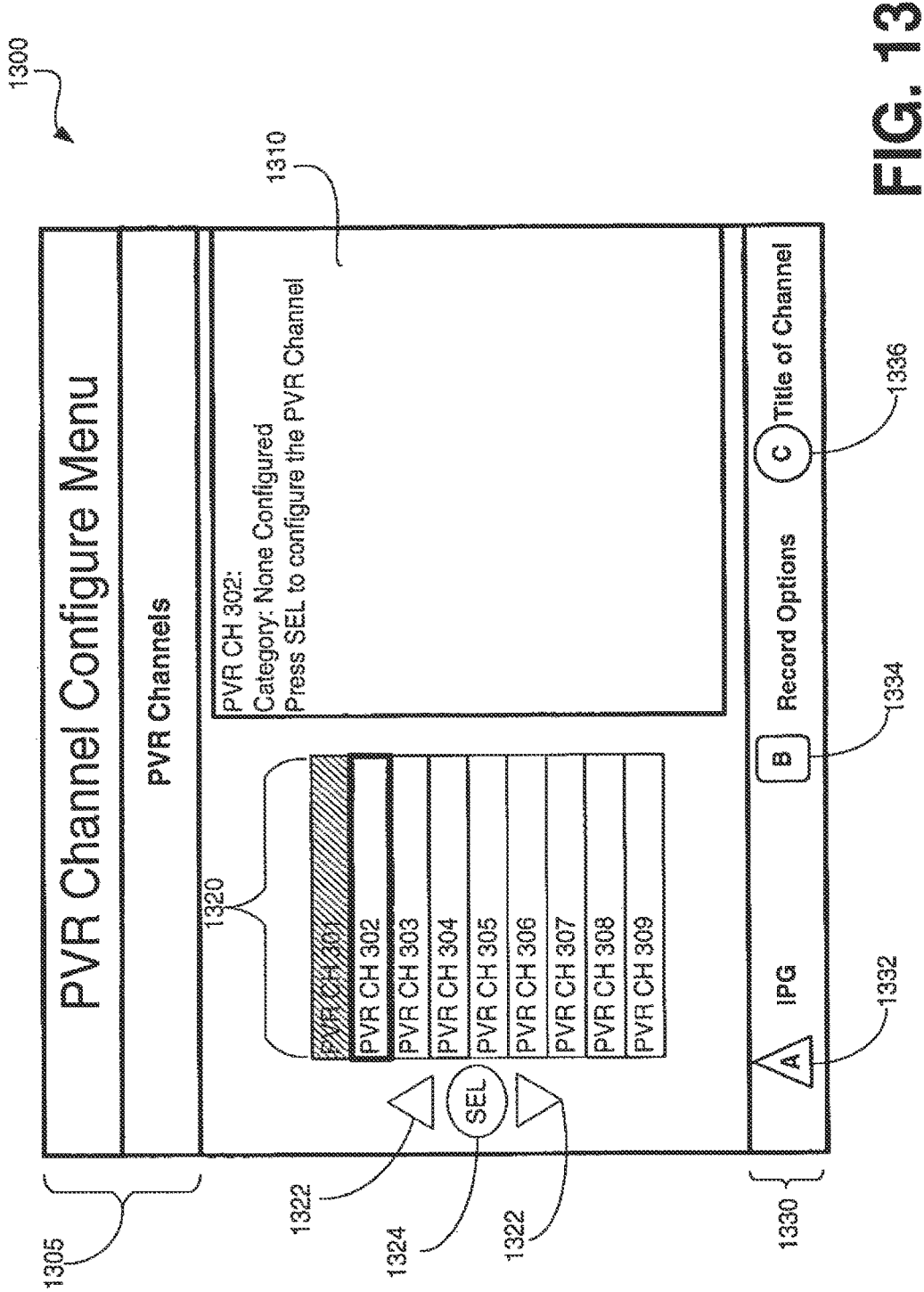
FIG. 13 is a screen diagram of an example PVR channel configure menu screen prompted by the user selecting to configure a PVR channel from the example record options screen of FIG. 12, in accordance with one embodiment of the invention.

The record options screen 1200 is shown overlaid on a grayed out recording schedule screen 1100 (FIG. 11), but in other embodiments, the record options screen 1200 can be displayed independently of the recording schedule screen 1100. The record options screen 1200 includes a record options header 1205, an options block 1220, and a return to recording schedule button icon 1236. The options block 1220 includes navigation arrow icons 1222, as well as a select button icon 1224. As with other screen displays, the user can scroll through the various options by using the navigation arrow buttons 386 of the remote control device 380 (FIG. 3B) as suggested by the navigation arrow icons 1222, and the user can make a selection by using the select button 385 of the remote control device 380 as suggested by the select button icon 1224. As shown, the options from the options block 1220 include the option to configure a PVR channel. Assume the user has highlighted and selected the "configure a PVR channel" option in the options block 1220, resulting in the example PVR channel configure menu screen 1300 as shown in FIG. 13.

The example PVR channel configure menu screen 1300 is a screen where the user can configure a particular PVR channel to catalog past, current, and/or future recordings based on one or more pre-defined and/or user configured categories. The PVR channel configure menu screen 1300 includes a header 1305, a display area 1310, navigation arrow icons 1322, a select button icon 1324, and a bottom header 1330. The header 1305 identifies the PVR channel configuration menu screen 1300. The display area 1310 displays information corresponding to the highlighted PVR channel selection in the PVR channel list 1320. For example, PVR channel 302 is highlighted in the PVR channel list 1320, as indicated in the display area 1310. As shown in the display area 1310, the first line preferably identifies the highlighted PVR channel, which is entitled, PVR channel 302. The next line in the display area 1310 is entitled category, which the user has not yet configured. The bottom line in the display area 1310 instructs the user to press select to configure a highlighted PVR channel. It will be appreciated by those of ordinary skill in the art that this display area can be configured in various forms while being contemplated within the scope of the preferred embodiments. As described above, the PVR channel list 1320 includes a list of configurable PVR channel numbers for channel mapping recorded media content. Herein, it will be understood that recorded media content (or media content instances, or similarly, media content instance recordings) includes media content that is scheduled to be recorded, as well as media content where recording is in progress or has been completed.

In one embodiment, the first listed PVR channel, which is PVR channel 301, is grayed out. As described above, this PVR channel will preferably be used as a default, or miscellaneous channel for recorded media content that does not match a user configured PVR channel. For example, for any recorded media content that does not fall into a configured category (as will be described below), such non-configured, recorded media content will fall under the PVR channel 301 entry in an IPG screen. Accordingly, upon the user being presented with the PVR channel configure menu screen 1300 for the first time, the defaulted highlighted channel available for configuration by the user will preferably be the PVR channel 302. The user can use the navigation arrow icons 1322 and select button icon 1324 to highlight and select to configure other PVR channels. For example, the user can navigate to the PVR channel 305 to configure that PVR channel out of the default display order. The bottom header 1330 includes an IPG button icon 1332, a record options button icon 1334, and a title channel button icon 1336. For example, the user can select the "A" button 381 on the remote control device 380 (FIG. 3B), and the user will be presented with an IPG screen display. The user can also select the guide button 391 on the remote control device 380 to accomplish similar functionality.

Figure 14:
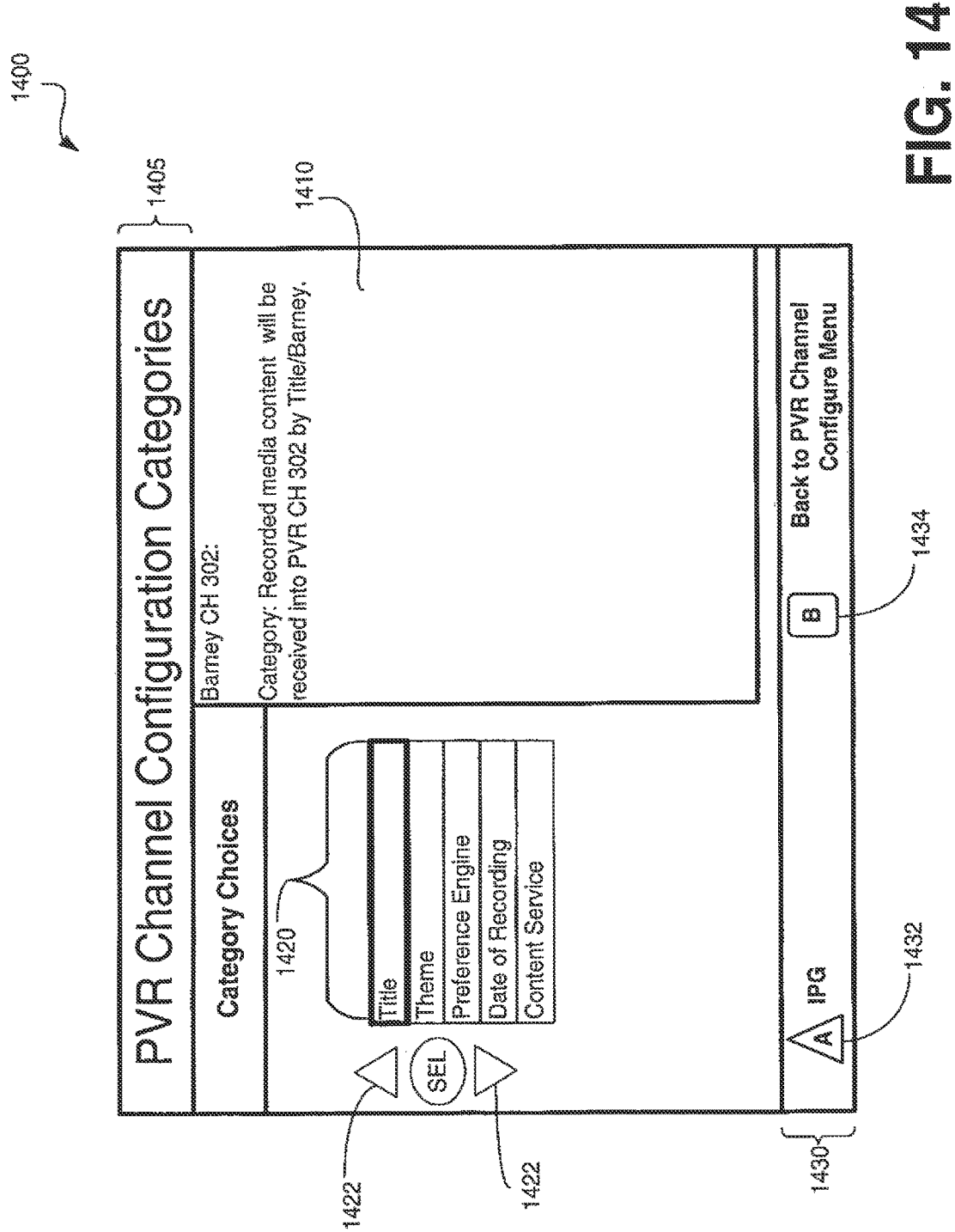
FIG. 14 is a screen diagram of an example PVR channel configuration categories screen prompted by the user selecting to configure a PVR channel from the example PVR channel configure menu screen of FIG. 13, in accordance with one embodiment of the invention.

By selecting the record options button icon 1334, the user is presented with a record options screen, such as that shown in FIG. 12. The title channel button icon 1336 enables a user to change the title of the PVR channel from, for example, PVR channel 302, to a title preferred by the user, such as a title more descriptive of the category of media content channel mapped to the particular PVR channel. As will be described below, since the user is configuring a PVR channel starting from the record options screen 1200 (FIG. 12), the default title will preferably be the title of the selected media content instance (for example, the Barney channel). In other embodiments, or when the user initiates PVR channel configuration from a user settings menu screen, the title of the PVR channel will be the last category configured in a sequence of category screens, as will be described below. Assume the user has selected the select button icon 1324, which results in the example PVR channel configuration categories screen 1400 shown in FIG. 14.

The example PVR channel configuration categories screen 1400 has a similar structure to the PVR channel configure menu screen 1300 (FIG. 13). The PVR channel configuration categories screen 1400 includes a header 1405, a display area 1410, a category choices list 1420, and a bottom header 1430. The header 1405 identifies the current screen 1400. The display area 1410 will identify the PVR channel under configuration, and in addition, will identify the category based on the highlighted choice from the category choices list 1420. As this particular PVR channel configuration implementation was initiated by highlighting an episode of Barney and configuring through a recorded programs list screen, the PVR channel 302 will default to some association with Barney depending on the highlighted choice in the category choices list 1420.

Figure 15:
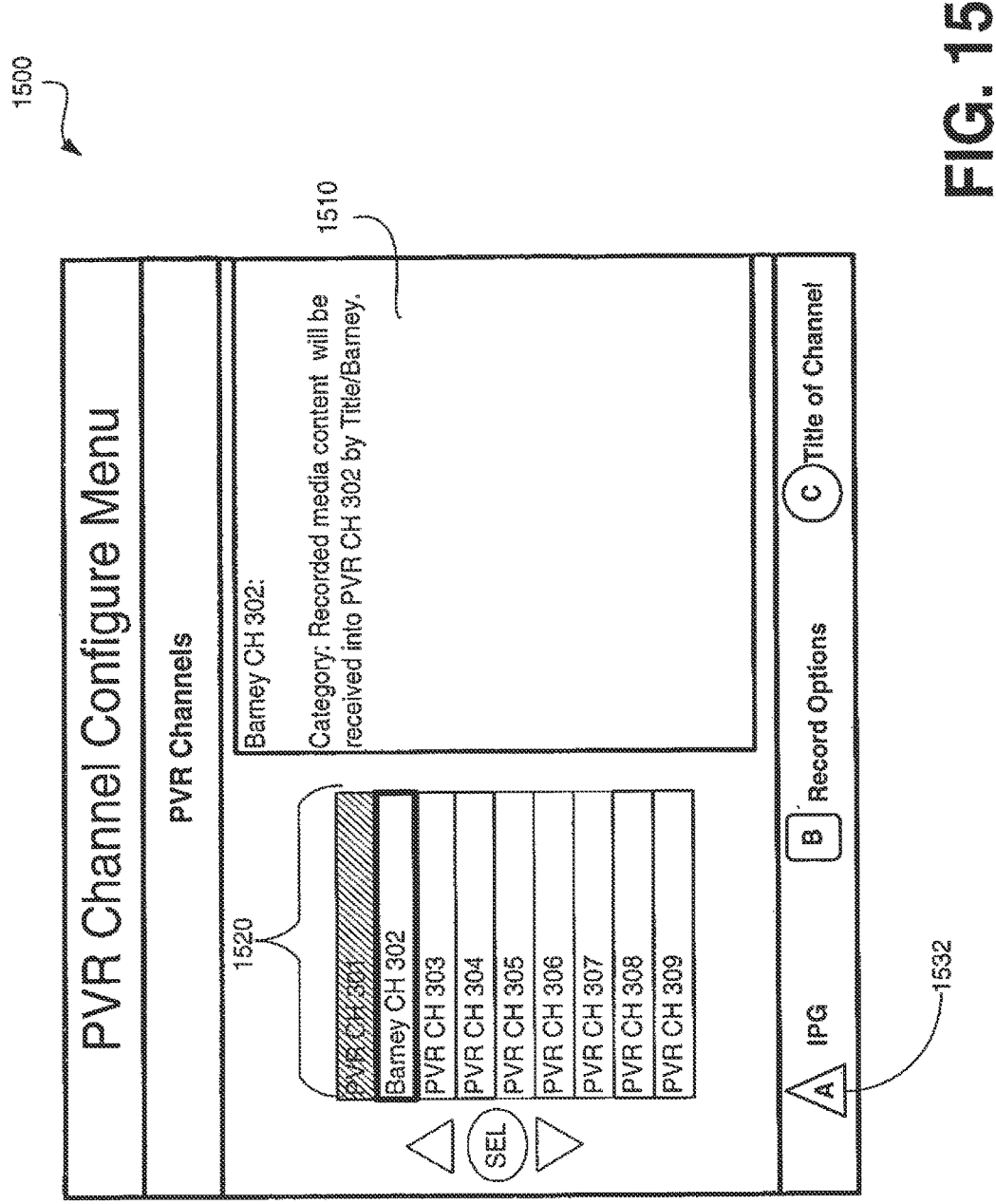
FIG. 15 is a screen diagram of an example PVR channel configure menu screen that results from the user selecting to configure the PVR channel by the defaulted title, Barney, in FIG. 14, in accordance with one embodiment of the invention.

For example, since the title choice is highlighted in the category choices list 1420, and Barney was the episode that was selected for the PVR channel configuration, the default channel title will be the Barney channel. Similarly, if the category choice entitled, content service, was highlighted in the category choice list 1420, then the default PVR channel title would be the Cartoon Network Channel 302. As shown, the category choices include title, theme, preference engine, date of recording, and content service. Theme choices include comedy, mystery, action, among others. A category choice of preference engine would utilize whatever search rule was used by the DHCT resources to scan for and/or select desired media content. Other category choices can be scrolled to using the navigation arrow icons 1422. Other category choices can include, but are not limited to, artists, data of composition, time of presentation, display channel, rating (e.g., Motion Pictures Artist Association, or MPAA), among others. The bottom header 1430 includes an IPG button icon 1432, as well as a back to PVR channel configuration menu button icon 1434. Assuming the user has highlighted and selected the title choice from the category choices list 1420, the user is presented with the example PVR channel configure menu screen 1500 shown in FIG. 15.

As noted by the PVR channel list 1520, the PVR channel 302 is now configured as the Barney channel 302. This fact is reflected by the top line in the display area 1510 and the category line, which describes how recorded media content is channel mapped in this PVR channel. Thus, any Barney recordings, scheduled or otherwise, will be received into the storage device 373 (FIG. 3A), with a corresponding listing displayed in an IPG screen grid under the Barney channel 302. Note that in the aforementioned embodiment the functions of recording and PVR channel configuration are distinguished, but in other embodiments, the functions of configuring a PVR channel and recording can be accomplished as combined functionality. By selecting the IPG button icon 1532, the user is presented with an IPG screen (not shown).

Figure 16:
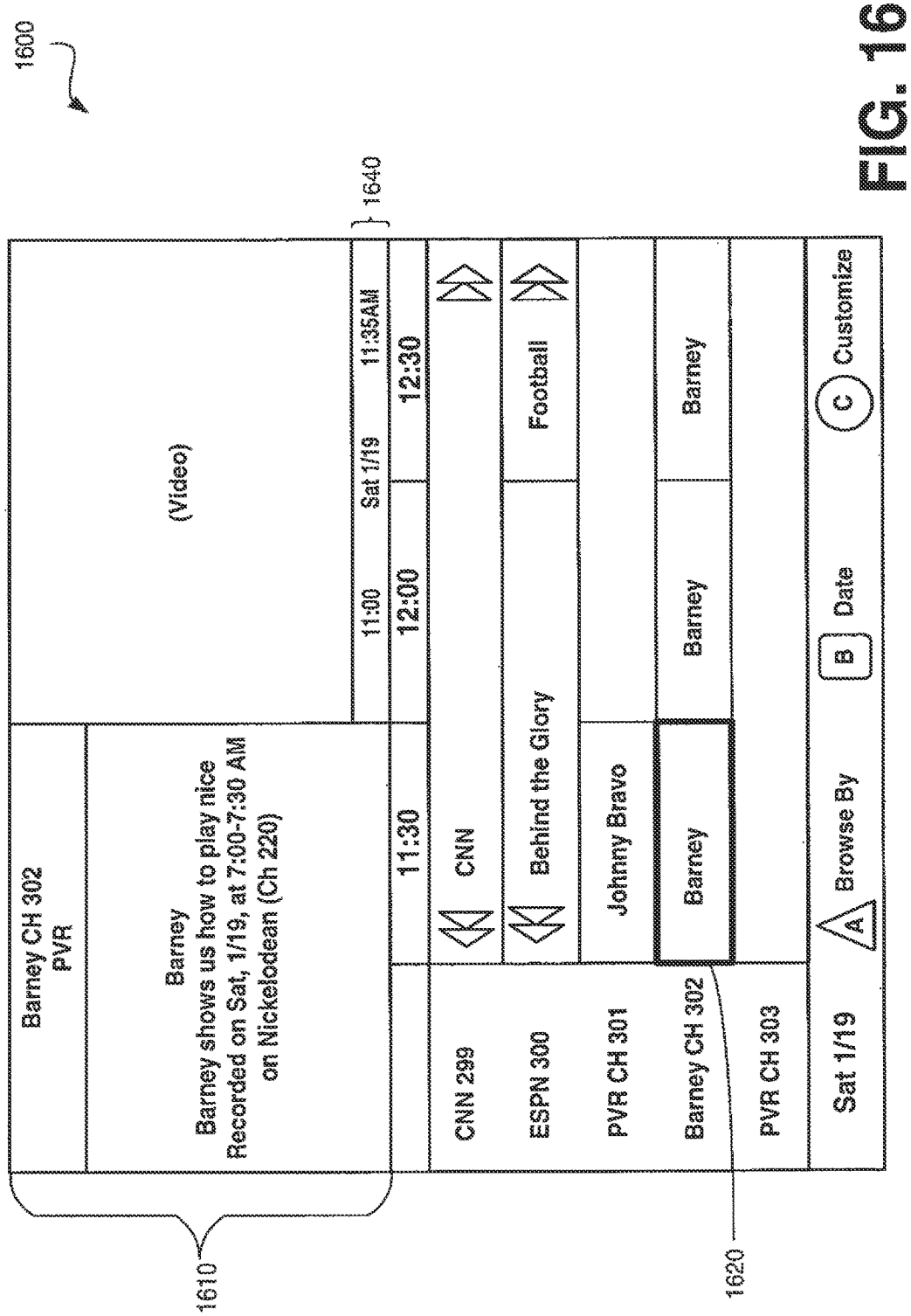
FIG. 16 is a screen diagram of an example IPG screen that is prompted by the user after the scheduled recordings of the Barney episodes have occurred for one day and now have listings in the Barney channel, in accordance with one embodiment of the invention.

FIG. 16 is a screen diagram of an example IPG screen 1600. Assume the user has tuned into this IPG screen 1600 after the scheduled recordings of the Barney episodes have been completed, as shown by the current time of 11:35 a.m. in the information area 1640, which is after the 7:00, 10:00 and 11:00 a.m. episodes of Barney that have been recorded into the storage device 373 (FIG. 3A) of the DHCT 16 (FIG. 3A). As shown in the example IPG screen 1600, the three scheduled recordings of the Barney episodes have been channel mapped into the Barney channel 302. By highlighting the Barney listing 1620, the user can learn more about that particular episode and recording information by viewing the detailed focus area 1610. In other embodiments, additional information may be included along with (or in place) the title. Note that in other embodiments, as describe above, this IPG screen 1600 can be presented before the scheduled recordings are completed using a similar format, except for different block coloring associated with the episodes that have not been recorded completely to distinguish from blocks associated with media content instances where the recordings to the storage device 373 (FIG. 3A) are complete.

Another recording process implementation includes providing the user with the ability to configure his or her own personalized PVR channel (e.g., Michael's channel), and mapping recorded media content under user direction, such as during a manual recording process. Or in other embodiments, the user could configure the personalized channel with categories to search for, with the result that media content with characterizing information matching the categories selected would be mapped to the personalized PVR channel.

Figure 17:
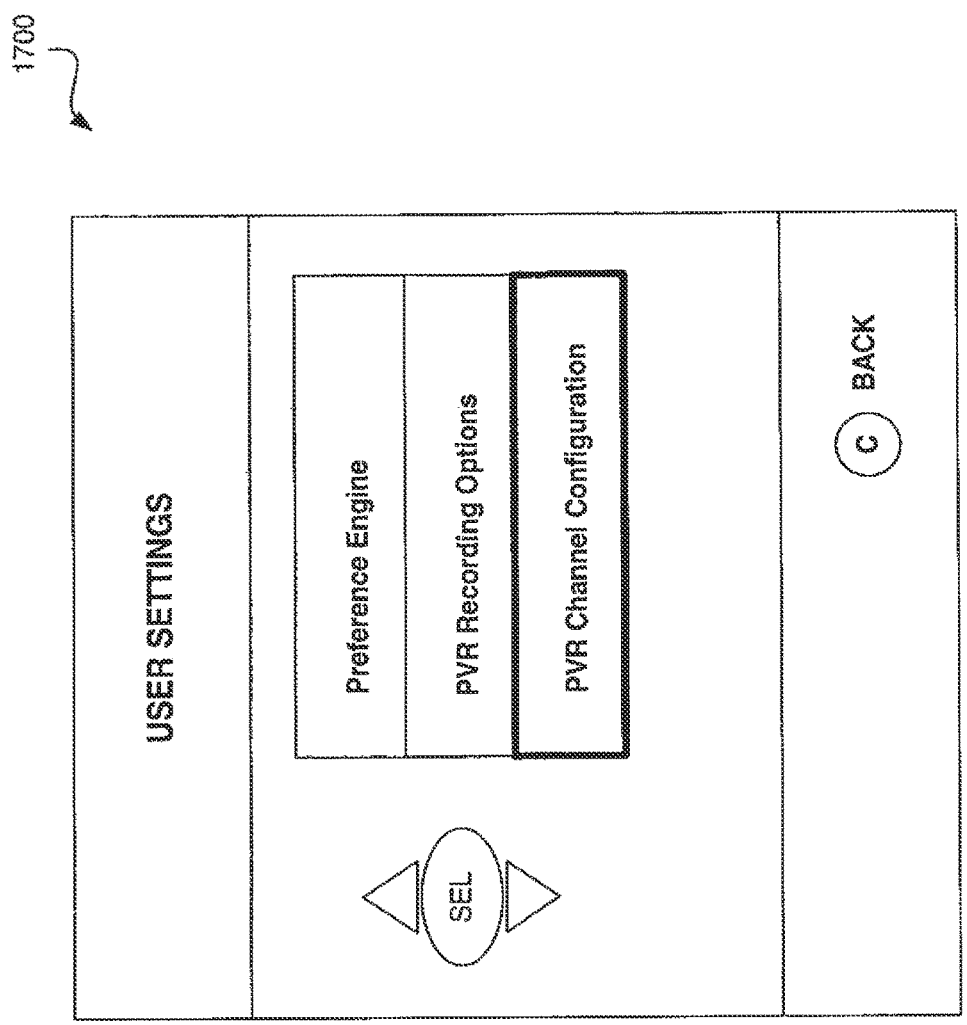
FIG. 17 is a screen diagram of an example user settings menu that enables a user to configure one or more PVR channels, in accordance with one embodiment of the invention.
Figure 18:
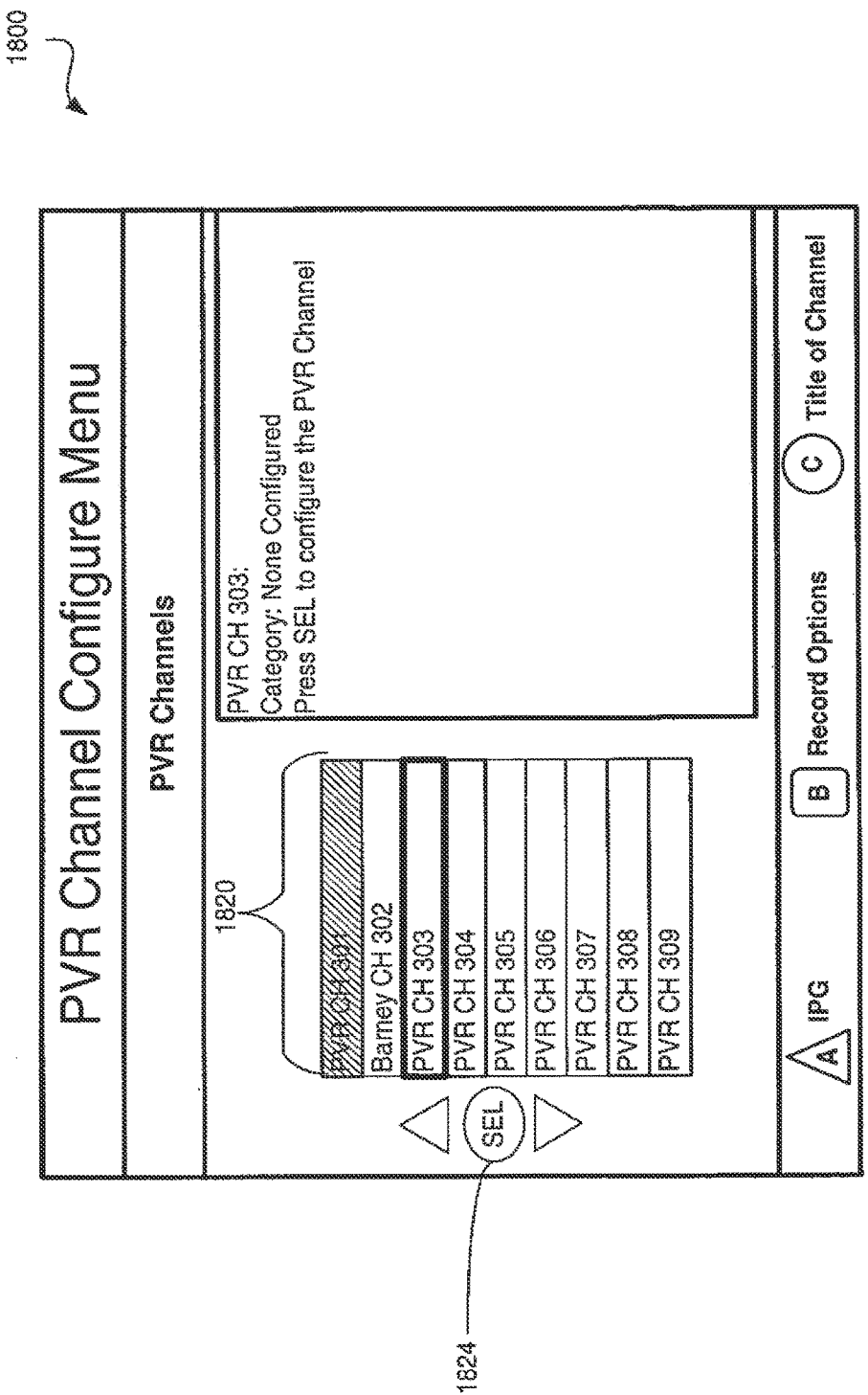
FIG. 18 is a screen diagram of an example PVR channel configure menu screen presented to the user after selecting to configure a PVR channel from the example user settings menu in FIG. 17, in accordance with one embodiment of the invention.

One implementation for configuring one or more PVR channels was through the recording process, as described above. Another mechanism for configuring one or more PVR channels is through a user settings menu, such as the example user settings menu screen 1700 shown in FIG. 17. As shown, the user can select the PVR channel configuration option among a plurality of user setting options. Assuming the user has highlighted and selected the PVR channel configuration option, the user is presented with the example PVR channel configure menu screen 1800 shown in FIG. 18. The PVR channel configure menu screen 1800 is similar in structure and functionality to the PVR channel configure menu screen 1300 described in association with FIG. 13. Continuing with the prior example, the defaulted highlighted entry in the PVR channel list 1820 is PVR channel 303. Above the PVR channel 303 entry is the prior configured Barney channel 302. By selecting the select button icon 1824, the user is presented with the example PVR channel configuration categories screen 1900 of FIG. 19.

FIGS. 19-24 will be used to illustrate time-based channel mapping. Assume the user has scrolled to, and highlighted, the time of recording choice of the category choices list 1920. As described earlier, the display area 1910 will display the highlighted choice from the category choices list 1920, which in this example is time of recording. By selecting the select button icon 1924, the user is presented with another example PVR channel configuration categories screen 2000 shown in FIG. 20.

Figure 19:
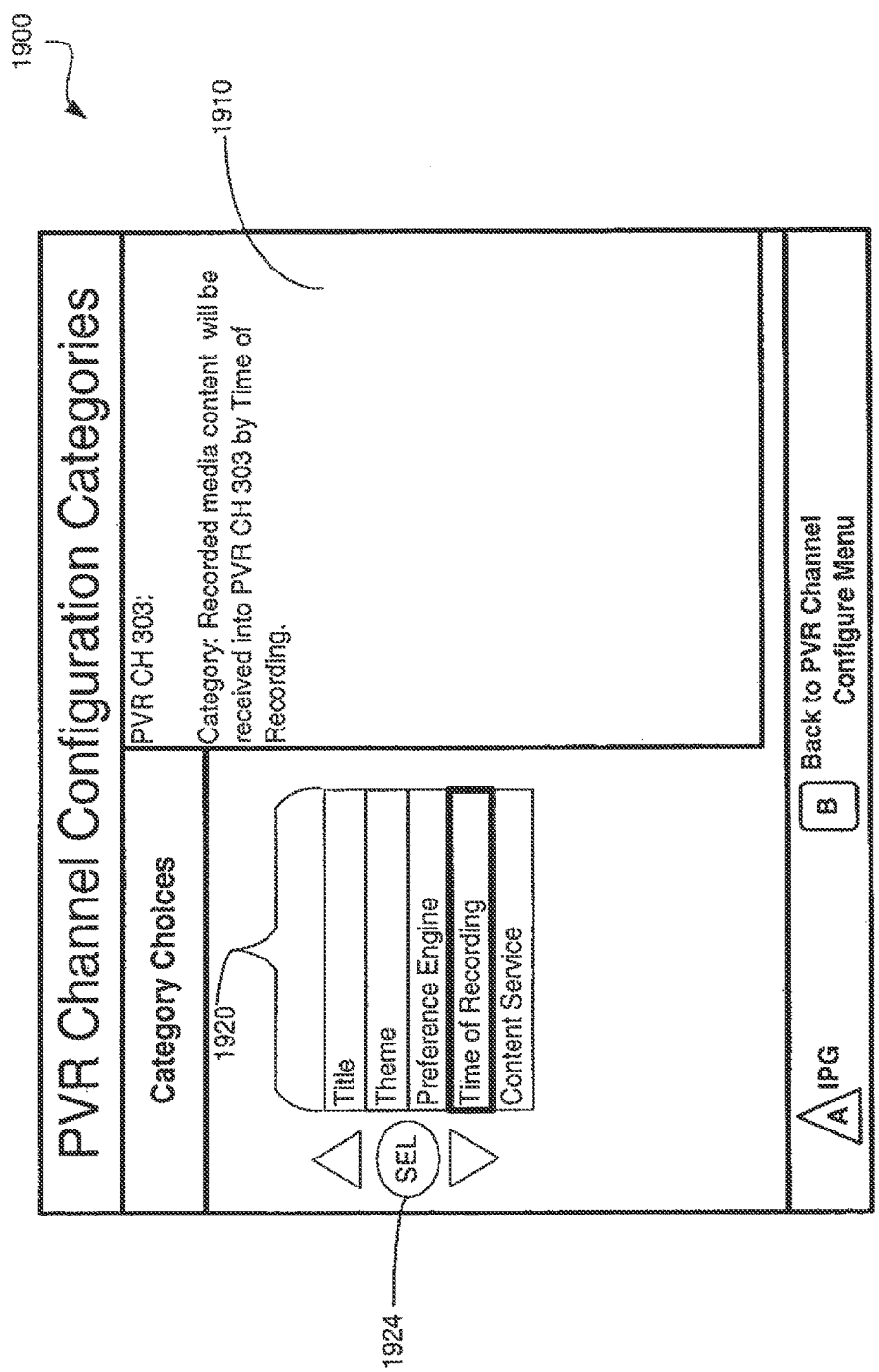
FIG. 19 is a screen diagram of an example PVR channel configuration categories screen from which the user seeks to configure a PVR channel by the category choice of time of recording, in accordance with one embodiment of the invention.
Figure 20:
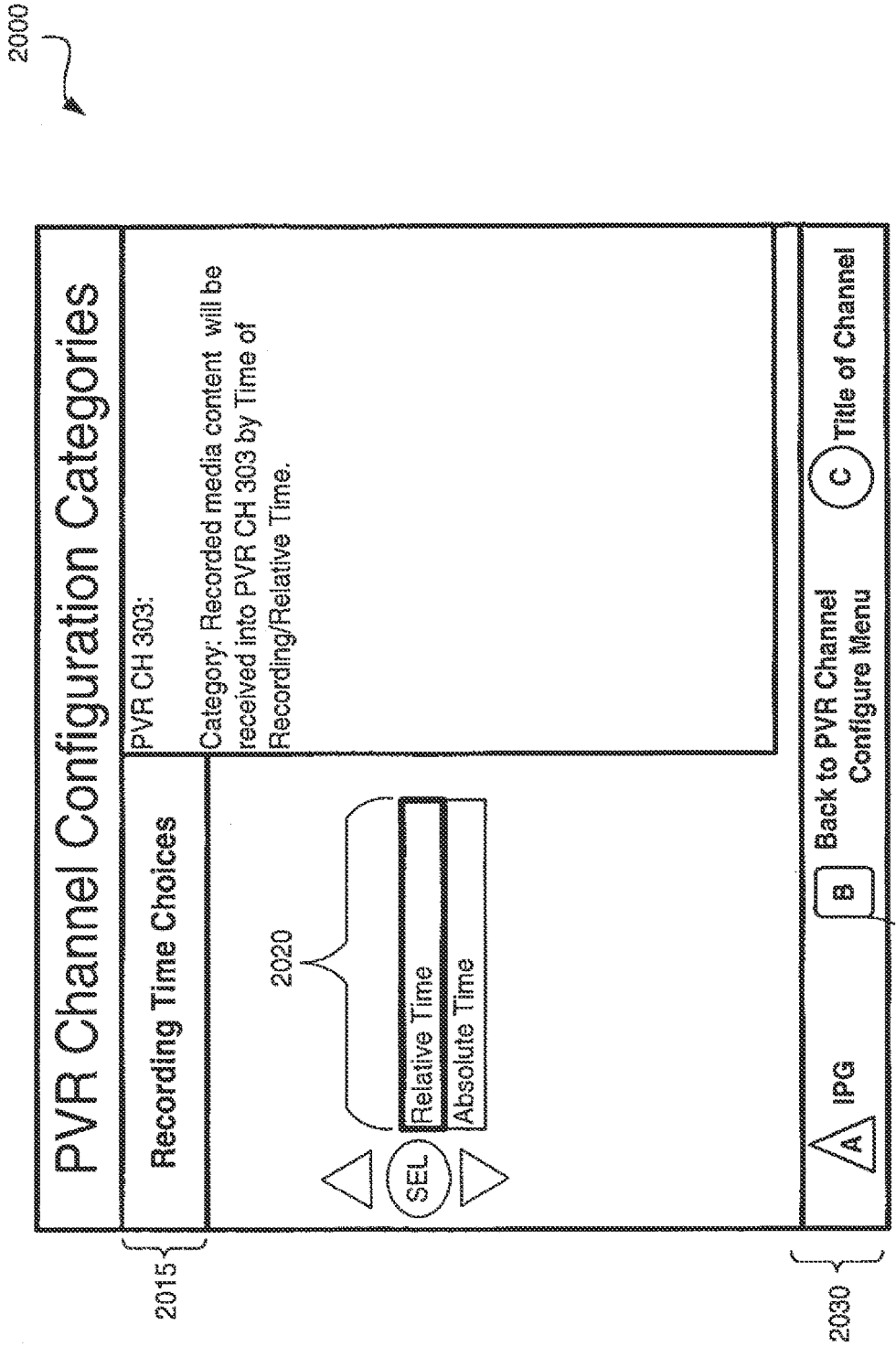
FIG. 20 is a screen diagram of an example PVR channel configuration categories screen prompted by the user selecting the time of recording category choice from the example screen shown in FIG. 19, in accordance with one embodiment of the invention.
Figure 22:
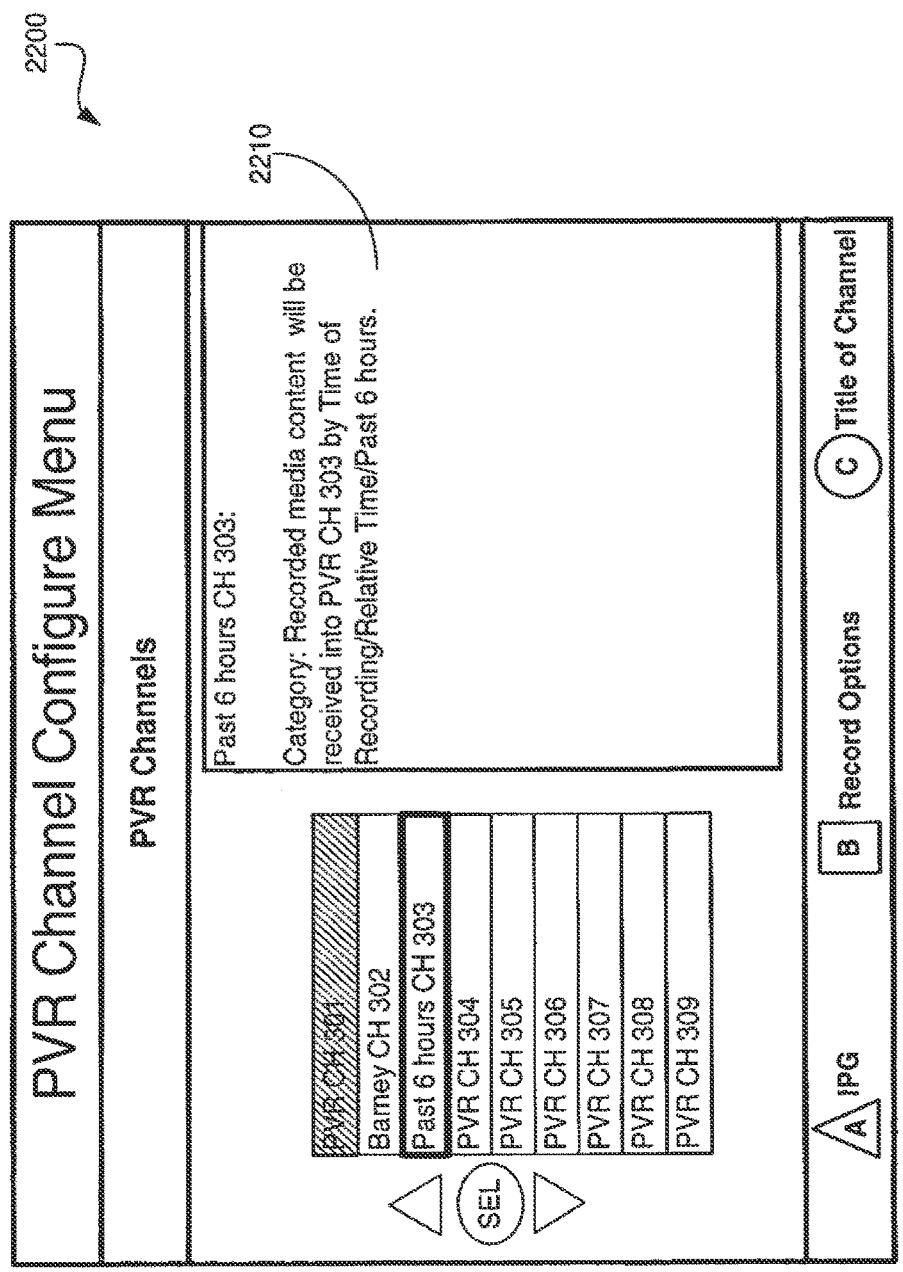
FIG. 22 is a screen diagram of an example PVR channel configure menu screen resulting from selecting a relative time of the past six hours in the example screen shown in FIG. 21, in accordance with one embodiment of the invention.

This screen 2000 is for configuring a category that further refines the time of recording choice selected in the prior screen 1900 (FIG. 19). The subheader 2015 indicates the refined category, which includes recording time choices. The recording time choices list 2020 includes two displayed options, including configuring by relative time and configuring by absolute time. The bottom header 2030 includes an additional function from the prior screen 1900, as shown by the back button icon 2036, which enables a user to go back to the prior screen 1900. Assume the user has highlighted and selected the recording time choice "relative time," which results in further refined categories displayed in an example PVR channel configuration categories screen 2100 (FIG. 21). FIG. 21 is a screen diagram of an example PVR channel configuration categories screen 2100, which enables further refinement of the relative time choice selected in the prior screen 2000. The subheader 2105 identifies the relative time choices list 2120 that is preferably positioned below it. The relative time choices list 2120 includes the past six hours, past seven hours, among other relative times in the past and future that are shown and not shown.

By choosing these relative time choices, a PVR channel can be configured that channel maps past recorded media content into this category based on the recording time relative to the current IPG display time (i.e., time-based channel mapping). For example, if an IPG screen is displayed at 12:00 midnight, all past recorded media content from 6:00 p.m. to 12:00 midnight would be channel mapped in the Past Six Hours channel in an IPG screen. Assume the user has highlighted and selected the past six hours choice of the relevant time choices list 2120, resulting in the example PVR channel configure menu screen 2200 shown in FIG. 22. As shown in the example PVR channel configure menu screen 2200, the PVR channel 303 is newly configured as the Past Six Hours channel 303. The display area 2210 displays this new title for the PVR channel 303, as well as the category line which includes time of recording, further refined by relative time, further refined by the past six hours of recorded media content.

Figure 23:
FIG. 23 is a screen diagram of an example IPG screen that illustrates how multiple, configured PVR channels are listed in the IPG, in accordance with one embodiment of the invention.

FIG. 23 is a screen diagram of an example IPG screen 2300. Assume the user has evoked this screen 2300 on Saturday morning. Recalling from the above description that Barney was scheduled to be recorded on Saturday morning, since Barney was recorded within the past six hours, it will be mapped under the Past Six Hours channel 303, in addition to being mapped in the Barney channel 302. As shown, it is possible that media content instances will be mapped under a plurality of PVR configured channels.

Figure 24:
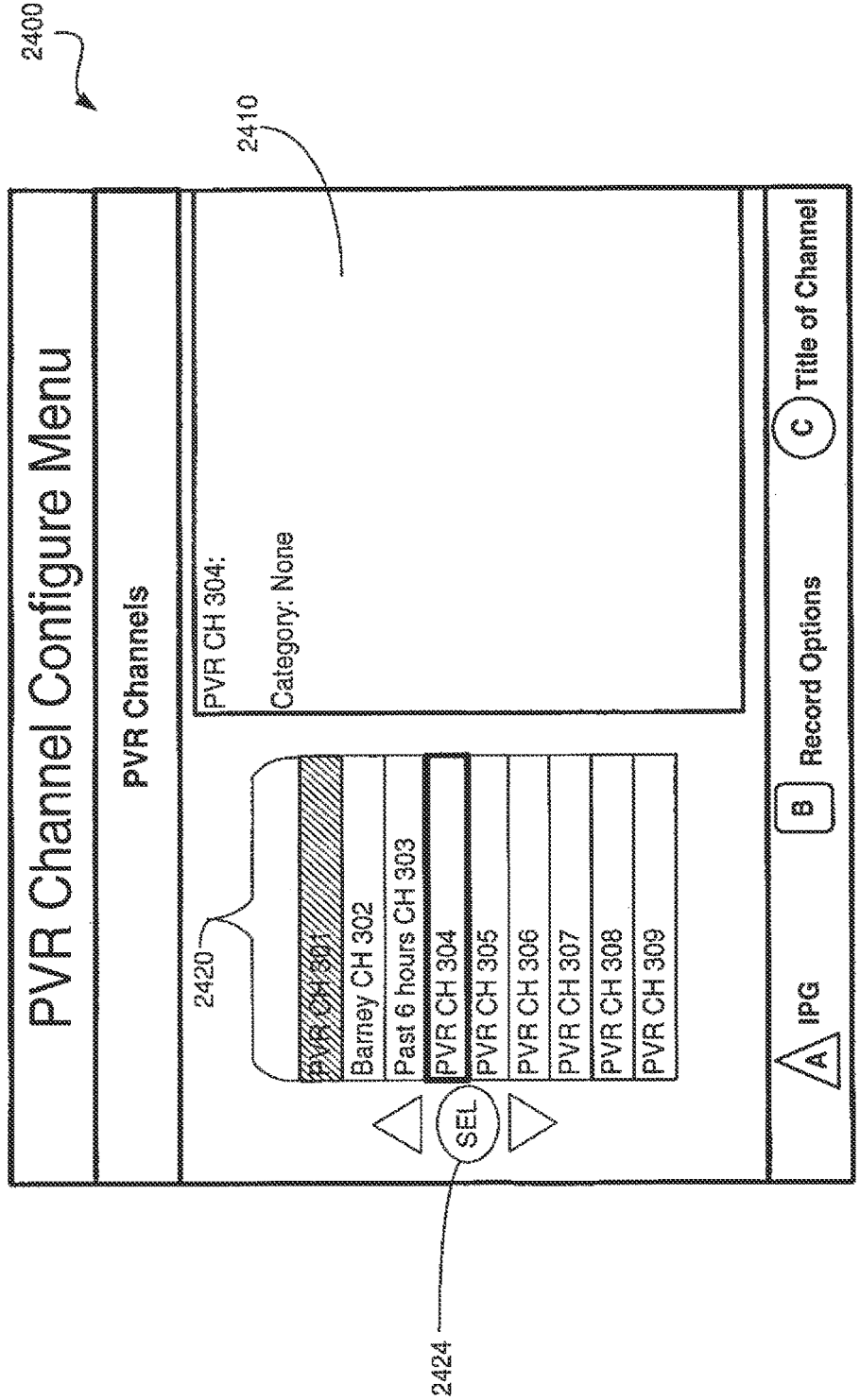
FIG. 24 is a screen diagram of an example PVR channel configure menu screen from which the user seeks to configure another PVR channel, in accordance with one embodiment of the invention.
Figure 25:
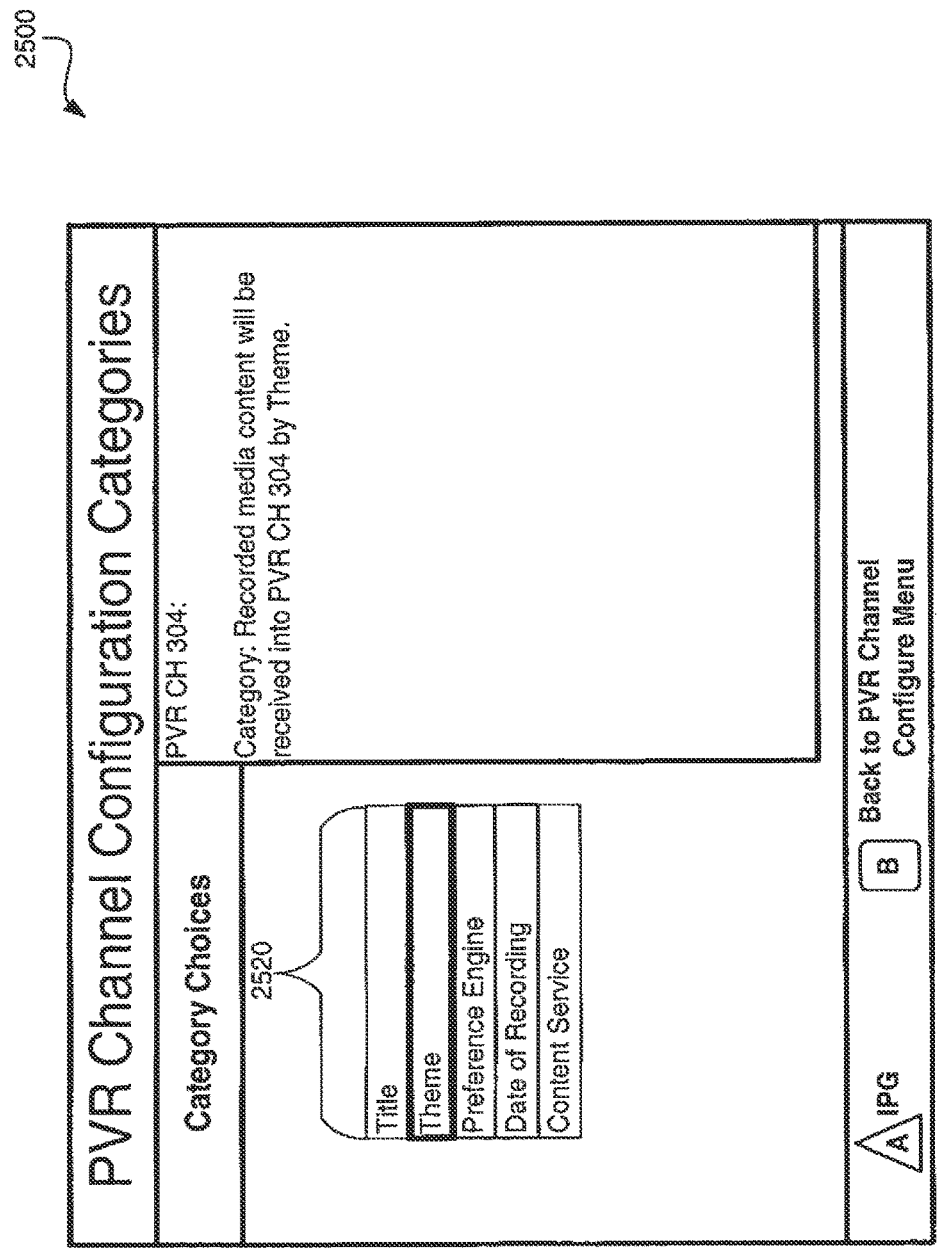
FIG. 25 is a screen diagram of an example PVR channel configuration categories screen, in which the user seeks to configure a PVR channel by the category choice of theme, in accordance with one embodiment of the invention.
Figure 26:
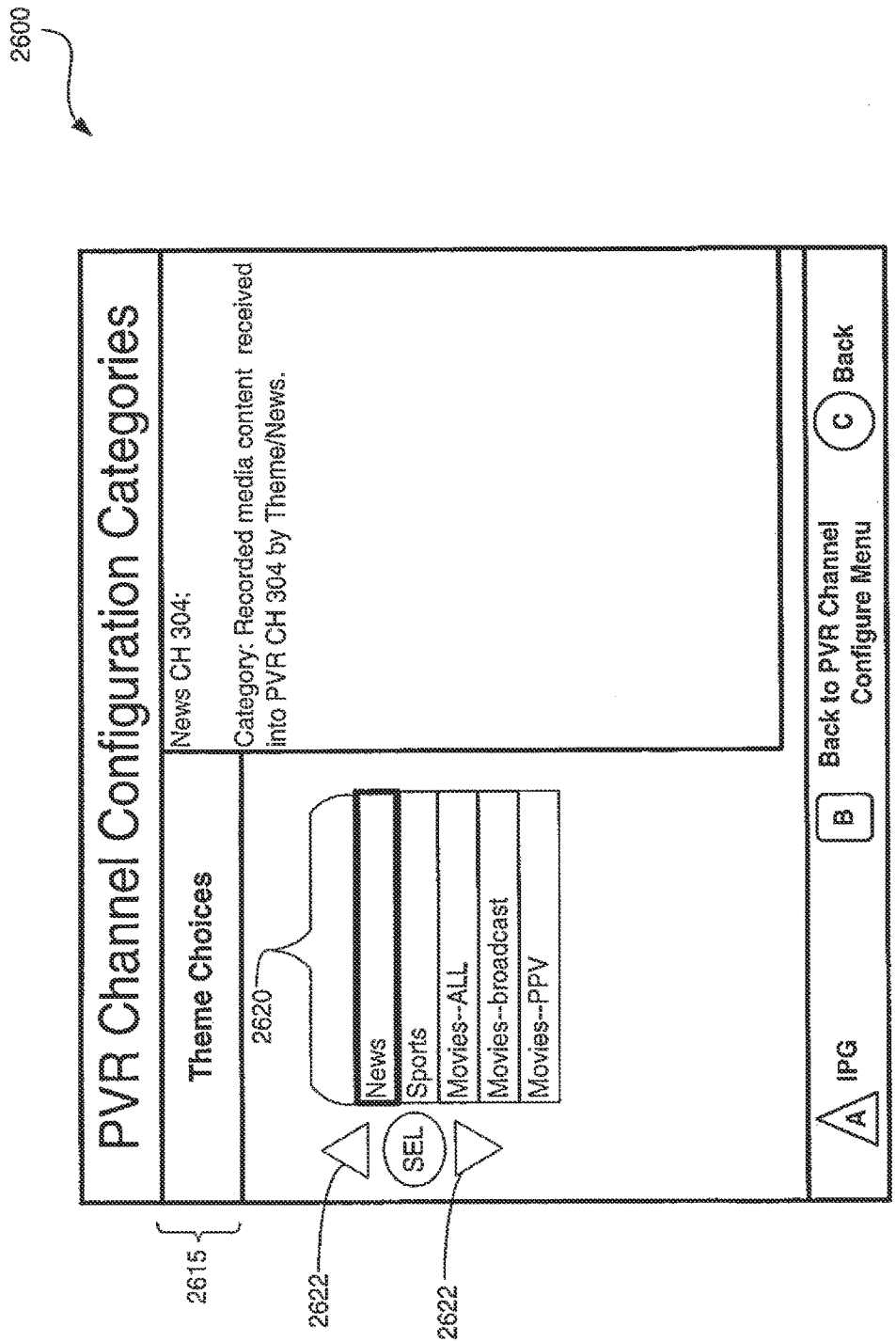
FIG. 26 is a screen diagram of an example PVR channel configuration categories screen that includes a news category that further refines the theme category selection made in the example screen shown in FIG. 25, in accordance with one embodiment of the invention.

FIGS. 24-35 will be used to illustrate content based channel mapping. FIG. 24 is a screen diagram of an example PVR channel configure menu screen 2400. Assume that the user has entered this screen through the user setting menu. The PVR channel list 2420 includes the prior configured Barney channel 302, as well as the prior configured Past Six Hours channel 303. Accordingly, this display screen 2400 defaults to the next nonconfigured PVR channel entry, which is the PVR channel 304 entry in the PVR channel list 2420. As shown by the display area 2410, no category has been configured for PVR channel 304 to date. Assume the user selects the select button icon 2424, resulting in the example PVR channel configuration categories screen 2500 illustrated in FIG. 25. For this example, assume the user is attempting to configure a PVR channel that maps recorded content comprising news programming into a News channel. Although the user can configure using several different category choices, assume the user begins by configuring by theme. Thus, the user highlights and selects the theme category choice of the category choices list 2520, resulting in the example PVR channel configuration categories screen 2600 illustrated in FIG. 26, which includes categories that are a further refinement of the theme category selected in the prior screen 2500.

Figure 27:
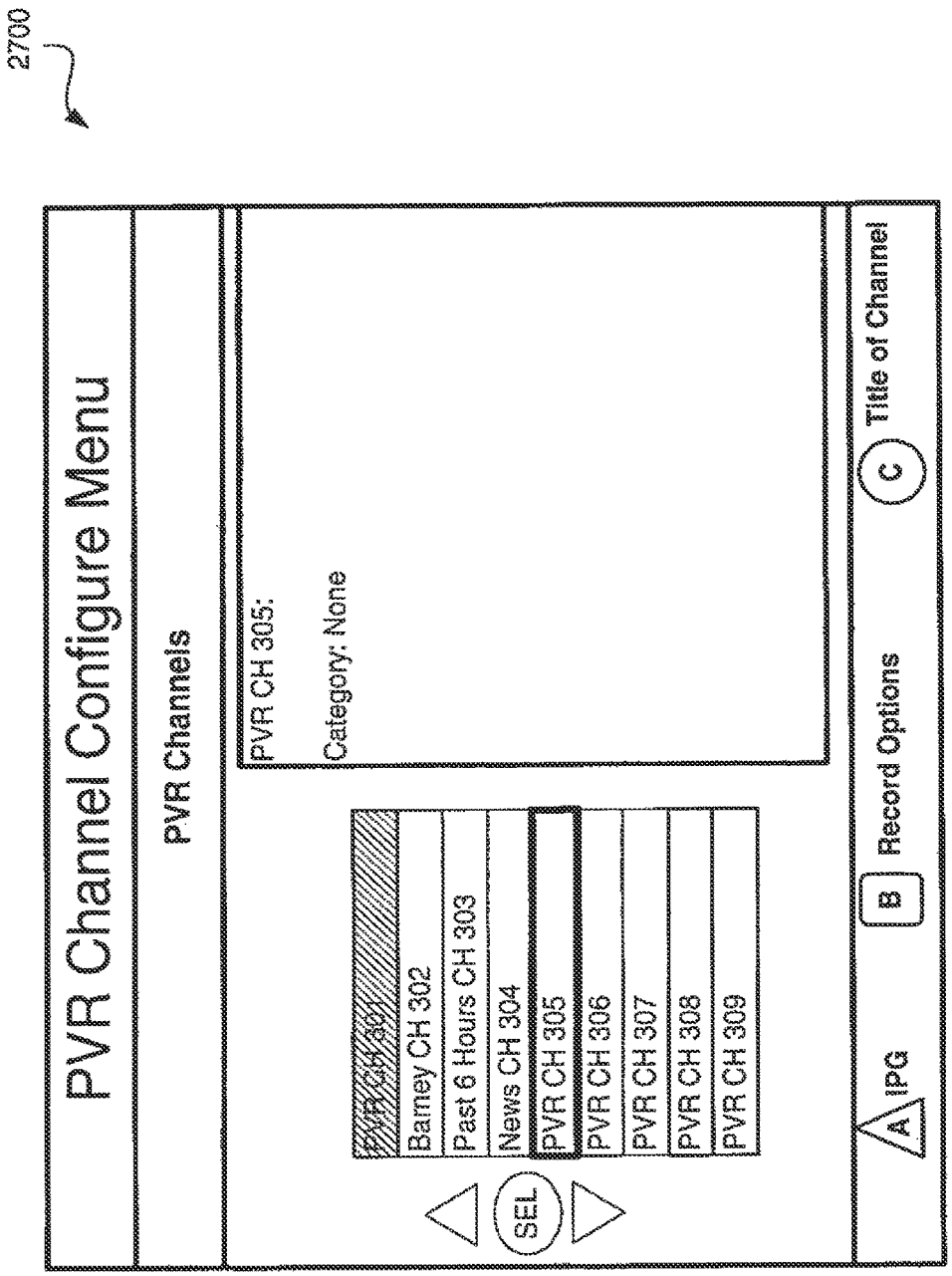
FIG. 27 is a screen diagram of an example PVR channel configure menu screen that illustrates the newly configured News channel, in accordance with one embodiment of the invention.
Figure 28:
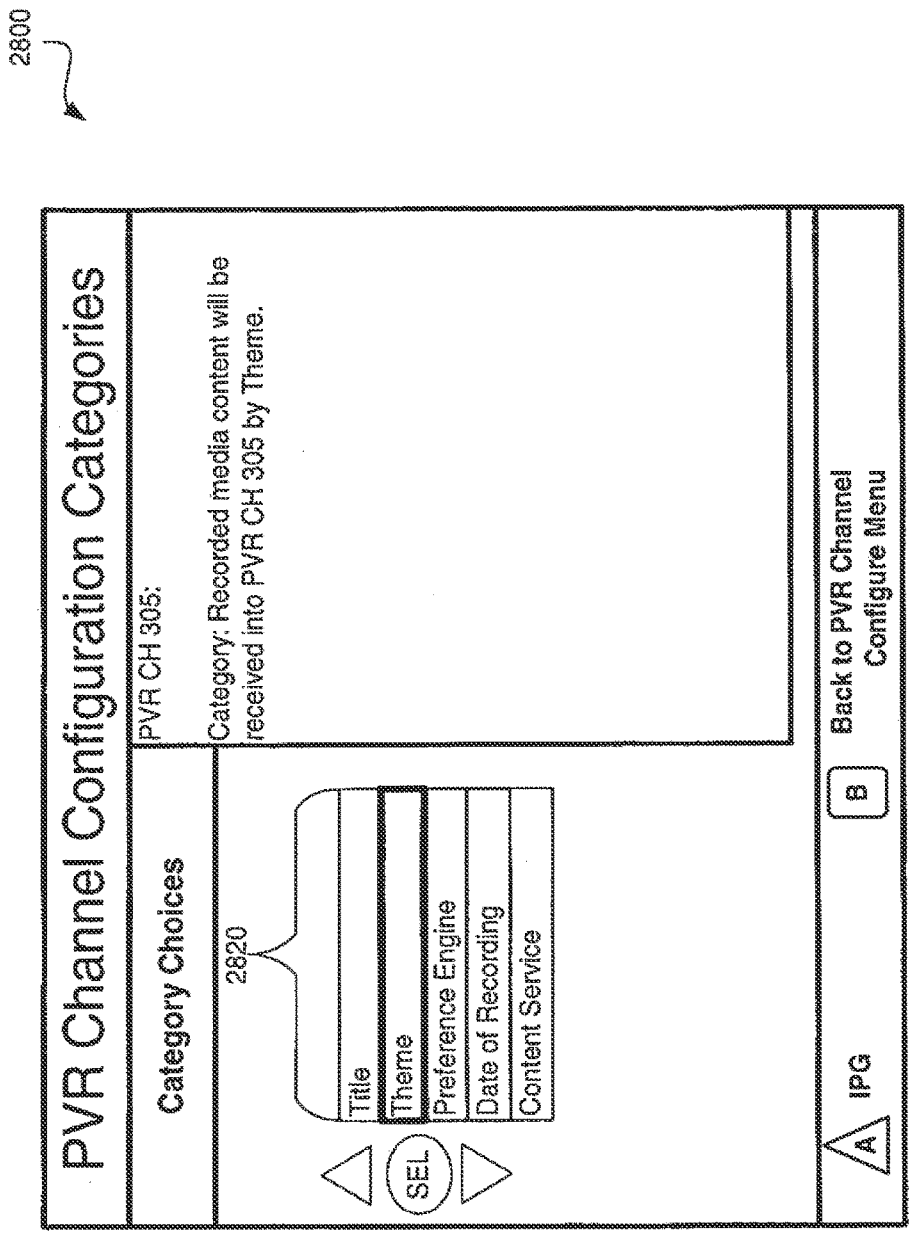
FIG. 28 is a screen diagram of an example PVR channel configuration categories screen from which the user seeks to configure another PVR channel beginning with the theme category choice, in accordance with one embodiment of the invention.
Figure 29:
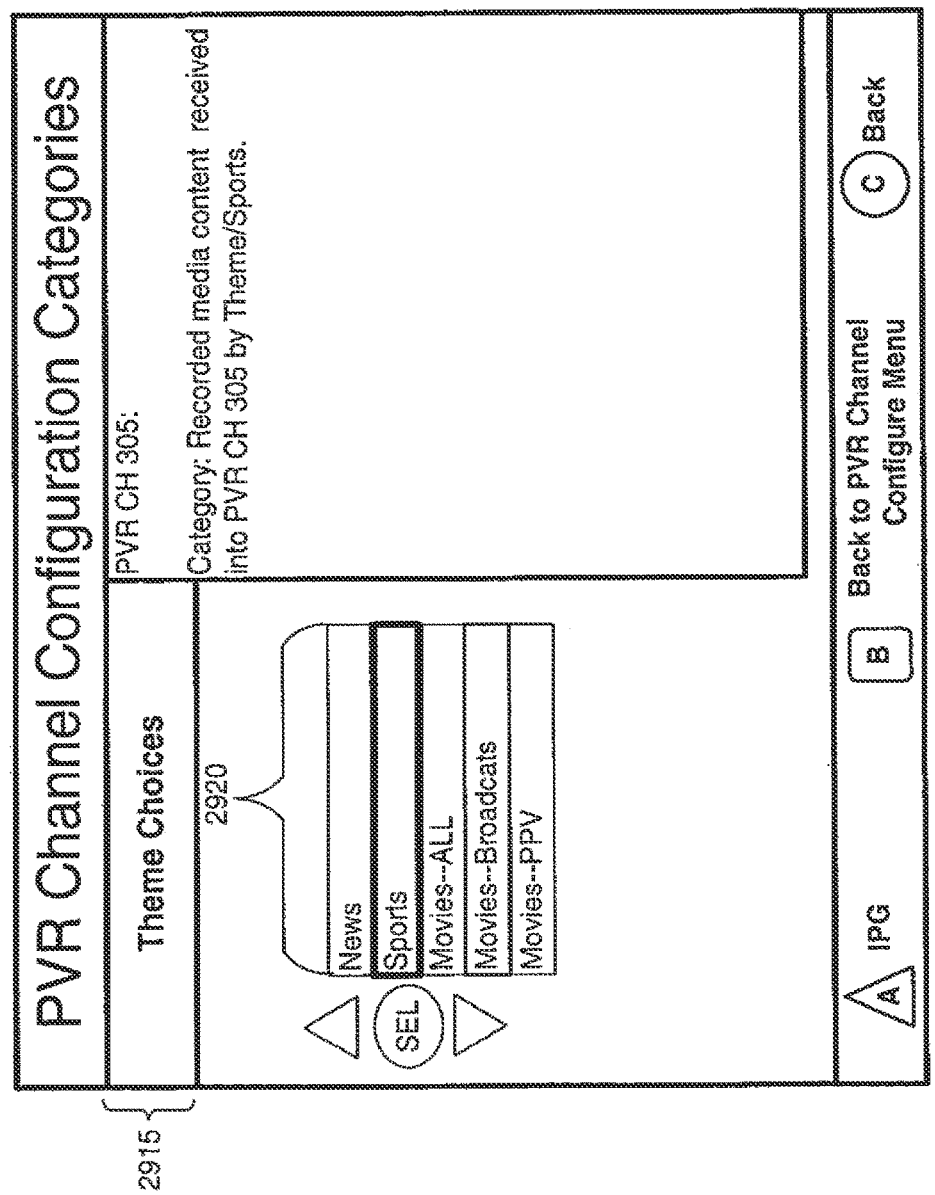
FIG. 29 is a screen diagram of an example PVR channel configuration categories screen that includes a sports theme category that further refines the theme selection made in the example screen shown FIG. 28, in accordance with one embodiment of the invention.
Figure 30:
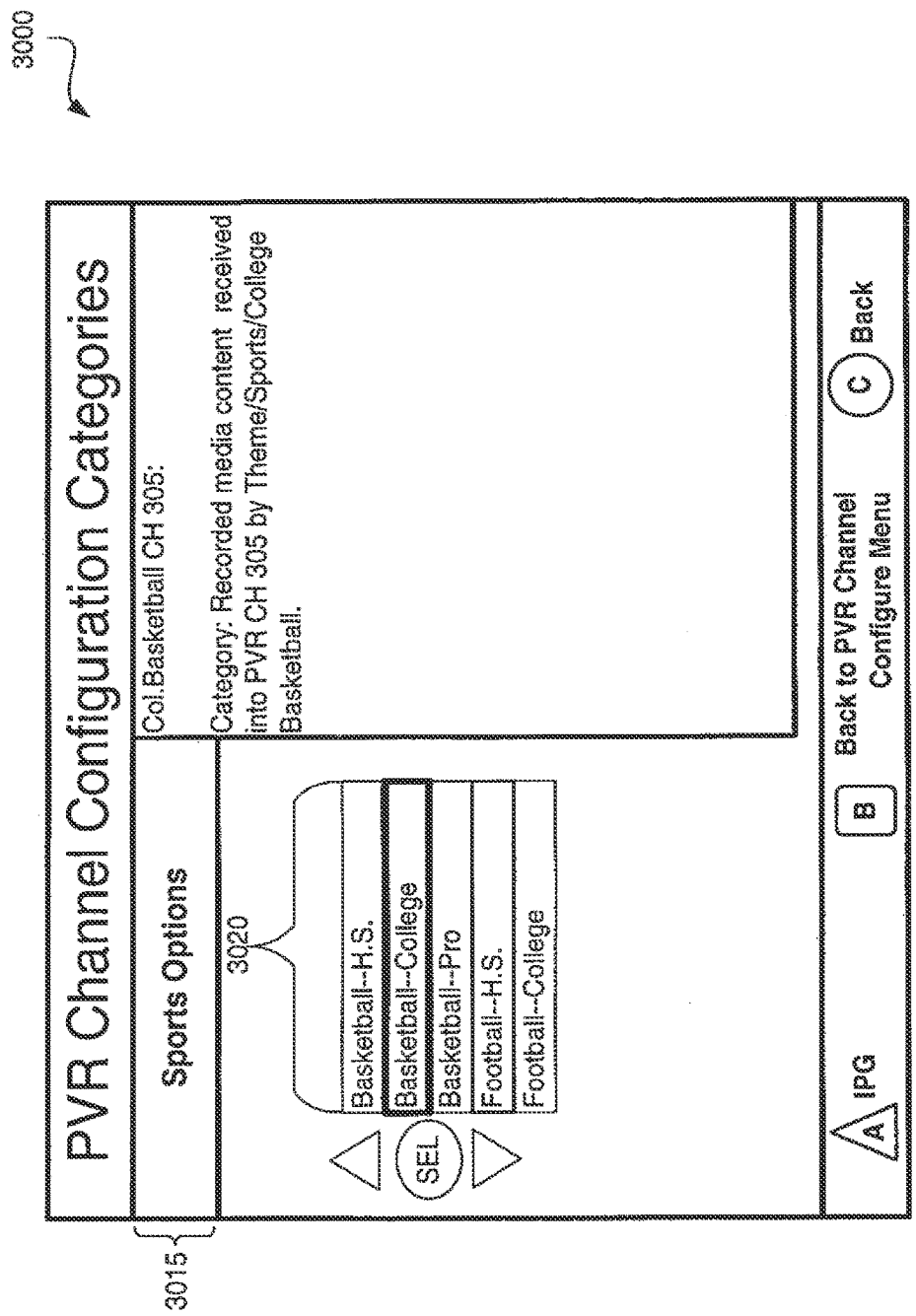
FIG. 30 is a screen diagram of an example PVR channel configuration categories screen that includes a college basketball option that further refines the sports theme selection made in the example screen of FIG. 29, in accordance with one embodiment of the invention.
Figure 31:
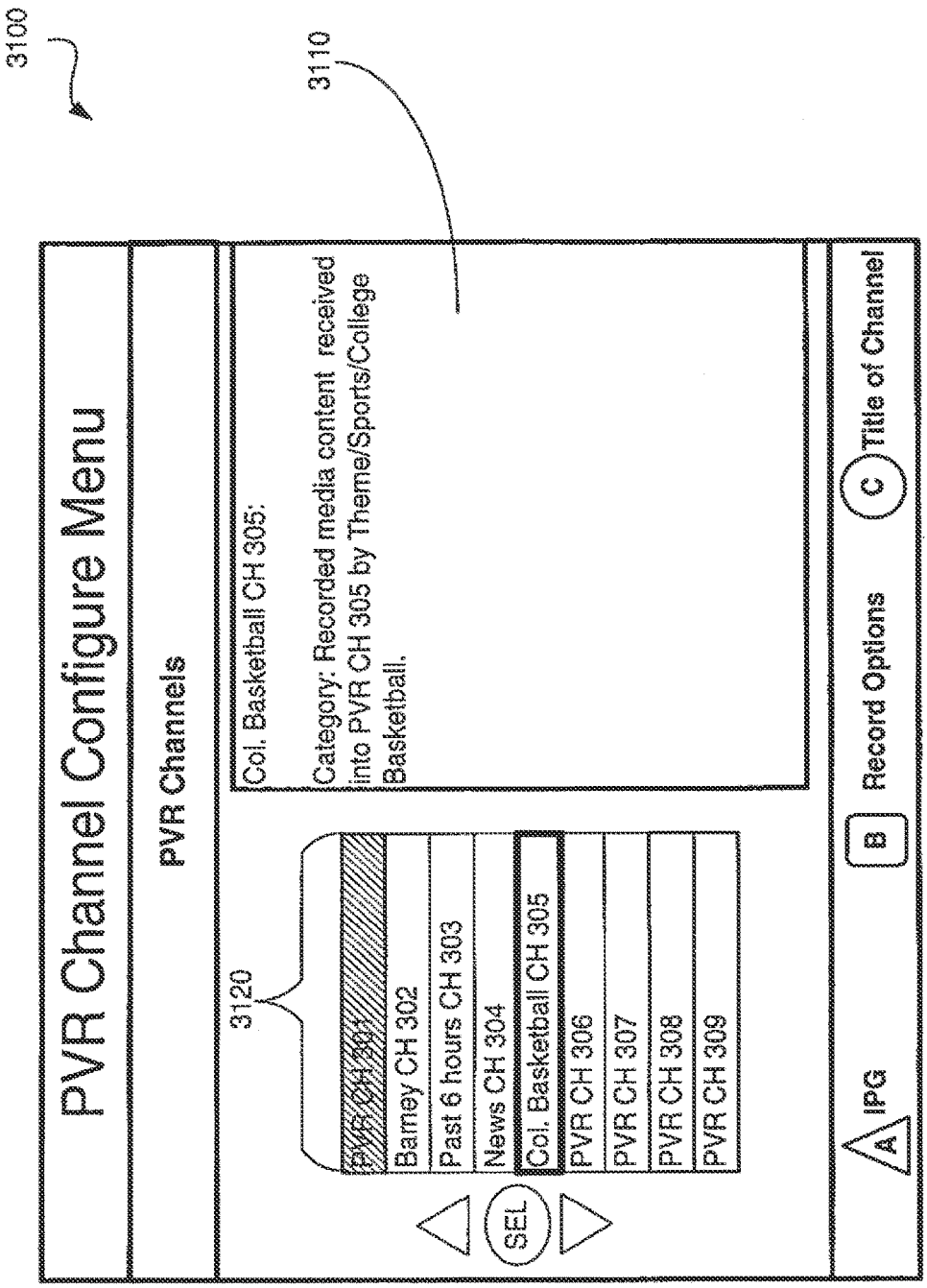
FIG. 31 is a screen diagram of an example PVR channel configure menu screen that illustrates the newly configured college basketball channel, in accordance with one embodiment of the invention.

As noted by the subheader 2615, this screen 2600 presents theme choices to the user. The theme choices list 2620 includes a plurality of choices that can be scrolled through using the navigation arrow icons 2622. Assume in this example the user has selected the news choice in the theme choices list 2620. As a result, the user is presented with the example PVR channel configure menu screen 2700 as illustrated in FIG. 27. Note that additional screens can be used to further refine the news theme category choice, for instance by service (e.g., ABC News), as will be demonstrated below for another PVR channel. As shown by the PVR channel configure menu screen 2700, the PVR channel 304 is newly configured as the News channel 304. Thus, any recorded media content with characterizing information, such as meta data, indicating that it is news content will be channel mapped into an IPG screen under the News channel 304. Meta data is data about data. Meta data describes, for example, how and when and by whom a particular set of data was collected, and how the data is formatted, as well as other characterizing information of the transmitted media content, and can be included in the transmission of television signals and/or stored locally. As the News channel 304 was the last configured PVR channel, the default highlight position in the PVR channel configure menu screen 2700 is PVR channel 305 entry.

In the next example, the user will attempt to configure a PVR channel that channel maps into an IPG screen all recorded media content that has meta data indicating that the media content includes Auburn basketball games. By selecting the PVR channel 305 entry in the example screen 2700, the user is presented with the example PVR channel configuration categories screen 2800 illustrated in FIG. 28.

Although there are several category choices to choose from to configure an Auburn basketball channel, in this example, the user begins by highlighting and selecting the category choice, theme, from the category choice list 2820. In response to that selection, the user is presented with the example PVR configuration categories screen 2900 illustrated in FIG. 29. As shown by the subheader 2915, this screen 2900 presents categories that are a further refinement of the theme category choice selected in the prior screen 2800. The theme choice the user highlighted in this screen 2900 is sports. By selecting the sports theme choice from the theme choices list 2920, the user is presented with the example PVR channel configuration categories screen 3000 illustrated in FIG. 30.

This screen 3000 presents categories that are a further refinement to the sports theme choice selected in the prior screen 2900, as suggested by the subheader 3015 which is entitled, sports options. Since the user desires to have an Auburn basketball channel, the user highlights and selects the basketball college option in the sports options list 3020, resulting in the example PVR channel configure menu screen 3100 illustrated in FIG. 31. As shown in this screen 3100, the PVR channel 305 has been configured as the college basketball channel 305, as shown in the PVR channel list 3120. This new configuration, in addition to the corresponding categories, is also presented in the display area 3110. However, the user desires to have an Auburn basketball channel. In one embodiment, a further refining category can be presented in a screen (not shown) following the last configuration categories screen 3000. Preferably, the user further refines the currently configured college basketball channel by selecting the college basketball channel 305 again and choosing other configuration categories to narrow the types of media content mapped into this channel. One category the user can choose is a keyword category, as described below.

Figure 32:
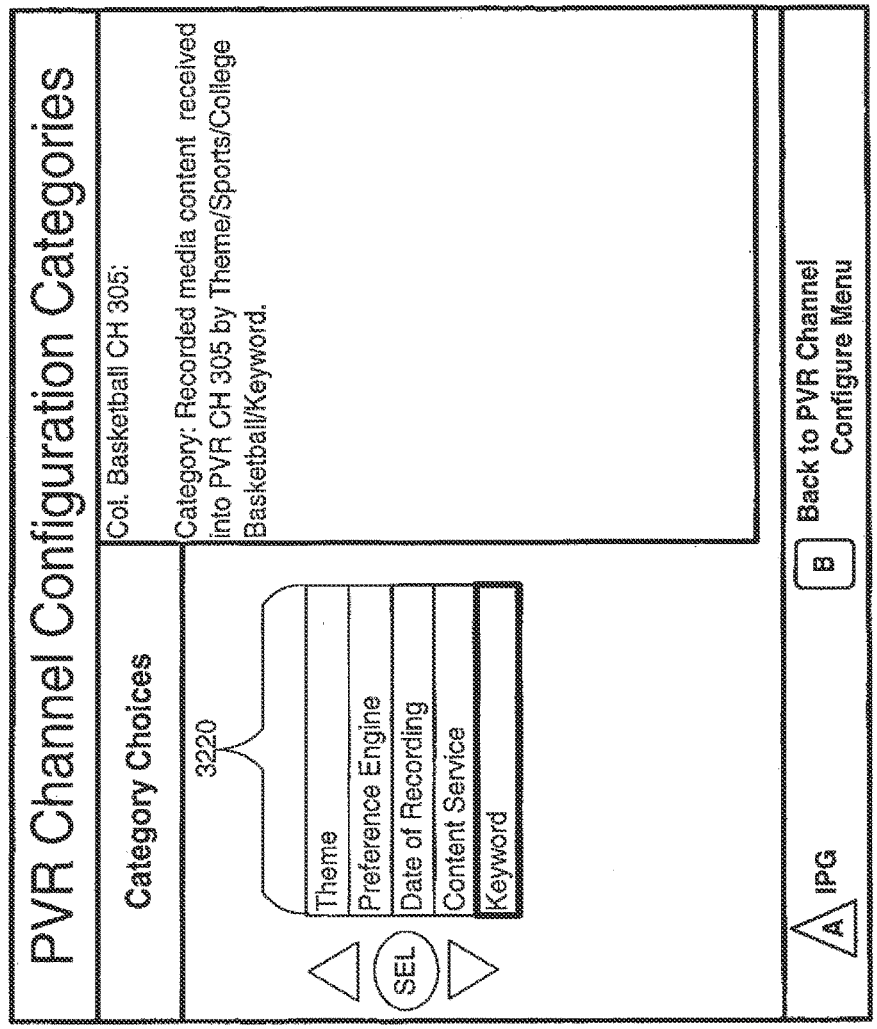
FIG. 32 is a screen diagram of an example PVR channel configuration categories screen that the user has evoked to further refine the college basketball channel category using a keyword search, in accordance with one embodiment of the invention.
Figure 33:
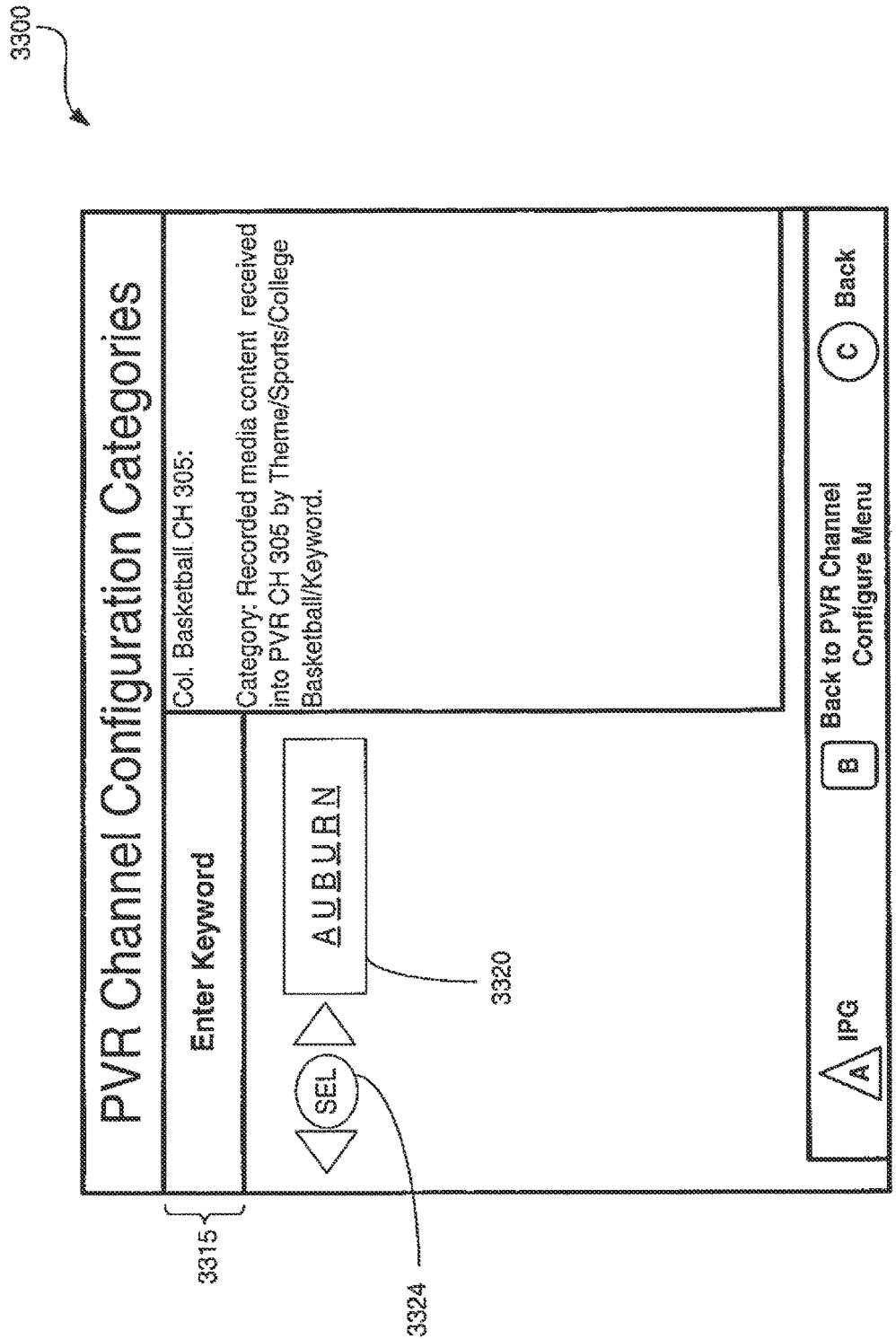
FIG. 33 is a screen diagram of an example PVR channel configuration categories screen that provides the user with the ability to enter a keyword search to further refine the college basketball channel category, in accordance with one embodiment of the invention.
Figure 34:
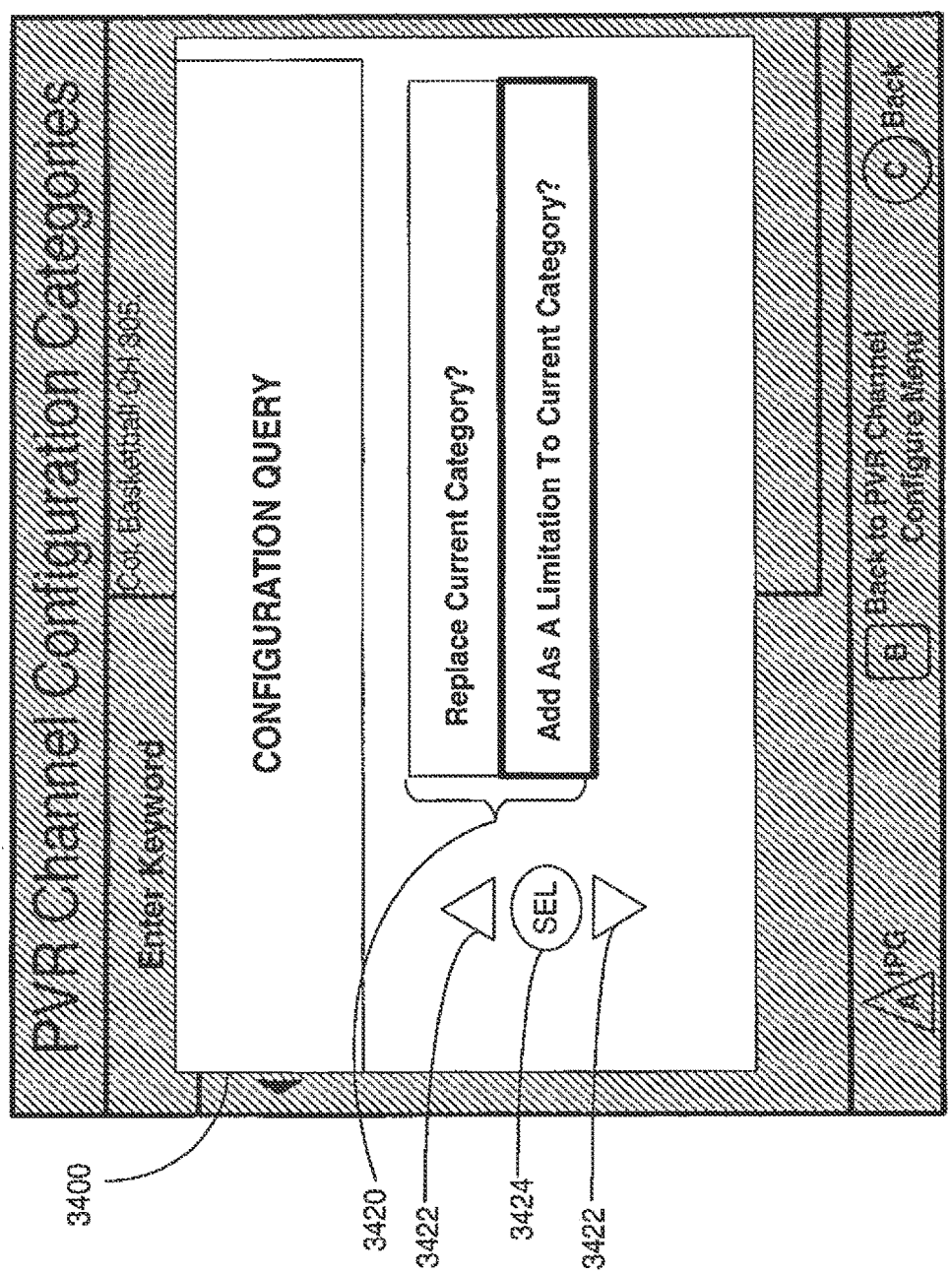
FIG. 34 is a screen diagram of an example configuration query screen prompted by the user selecting the keyword entry in the example screen shown in FIG. 33, and which presents the user with a series of options, in accordance with one embodiment of the invention.
Figure 35:
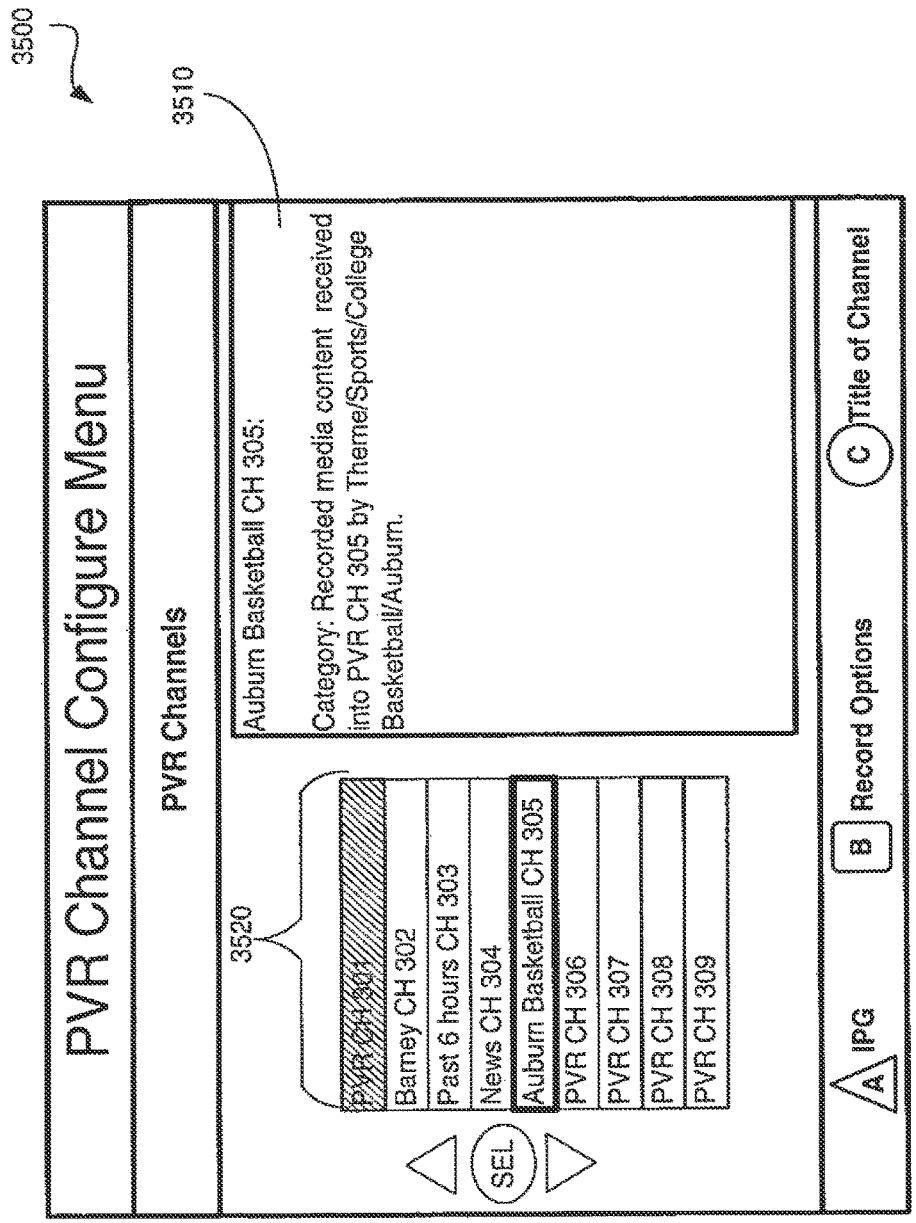
FIG. 35 is a screen diagram of an example PVR channel configure menu screen that illustrates the newly configured Auburn basketball channel, in accordance with one embodiment of the invention.

Assume the user has highlighted and selected the college basketball channel 305 entry in the PVR channel list 3120 resulting in the example PVR channel configuration categories screen 3200 illustrated in FIG. 32. The user can highlight and select the keyword choice of the category choices list 3220, resulting in the example PVR channel configuration categories screen 3300 illustrated in FIG. 33. In this screen 3300, the user is instructed in the subheader 3315 to enter a keyword. The user can enter a keyword into the keyword box 3320. In one implementation, the keyword box 3320 can display letters corresponding to numbered buttons on the remote control device 380 (FIG. 3B), according to well-known key entering mechanisms. Upon the user selecting the select button icon 3324, the user is preferably presented with a configuration query screen 3400 preferably overlaid on the PVR channel configuration categories screen 3300 (FIG. 33), as illustrated in FIG. 34. In other embodiments, the configuration query screen 3400 can be displayed independently from the PVR channel configuration categories screen 3300.

The configuration query screen 3400 includes an options block 3420, as well as select button icon 3424 and navigation arrow icons 3422. The user can scroll through a plurality of configuration query options, including whether he or she wants to replace the current category, or add the keyword as a limitation to the currently configured category, among others. In this example, the user desires an Auburn basketball channel, thus a logical choice from the option block 3420 is to add the keyword (e.g., Auburn) as a limitation to the current college basketball category by highlighting and then selecting that option, resulting in the example PVR configure menu screen 3500 illustrated in FIG. 35. As shown in this screen 3500, the college basketball channel is replaced with the narrower Auburn basketball channel as indicated in the display area 3510 and the PVR channel list 3520. Thus, recorded media content with meta data that indicates that the recorded media content has the title Barney in it, or has been recorded within the past six hours of the current time, or was a News channel that was recorded, or an Auburn basketball game, will all be channel mapped into an IPG screen according to the configured PVR channels shown in the PVR channel list 3520 of the example screen 3500.

Figure 36:
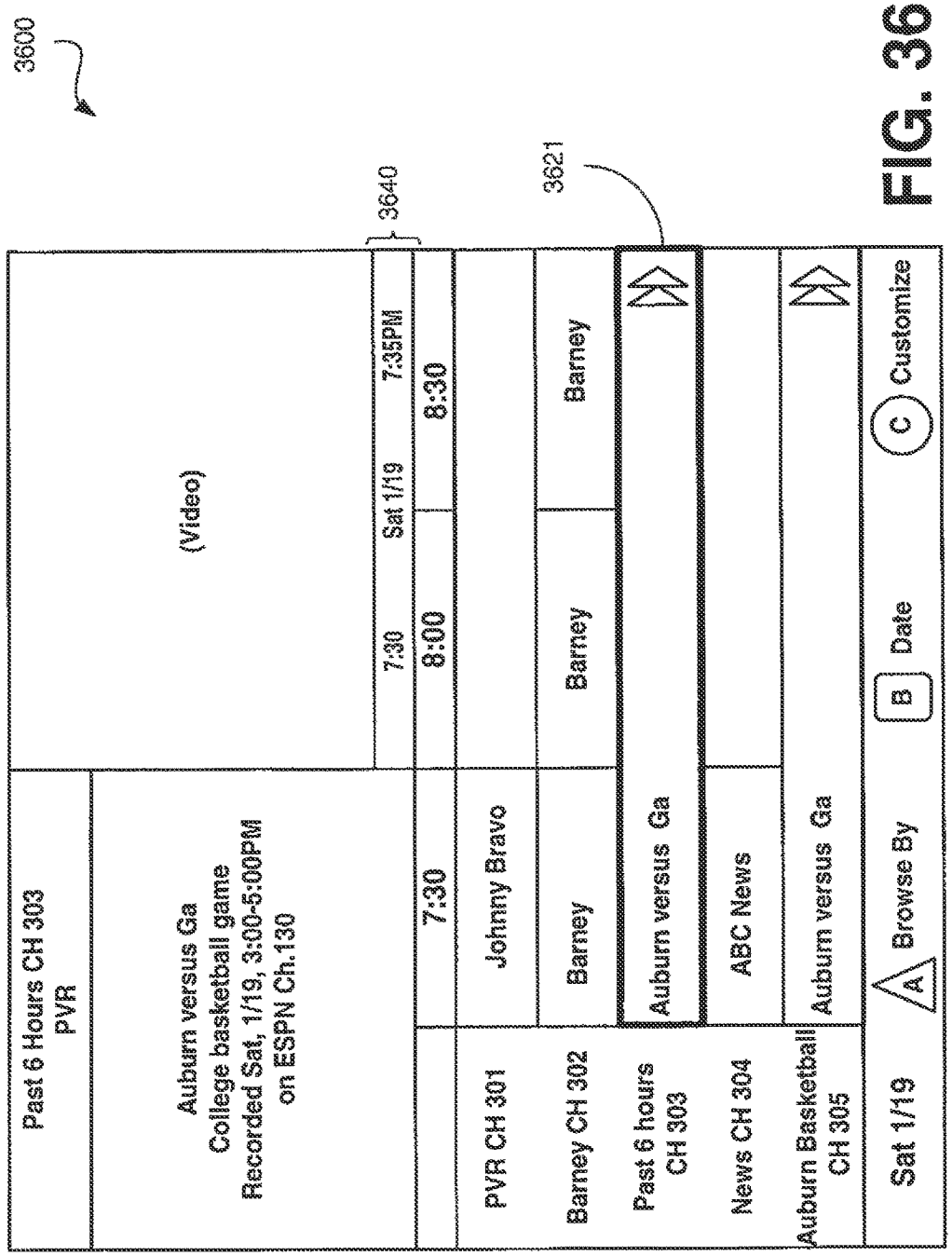
FIG. 36 is a screen diagram of an example IPG screen prompted by the user after the scheduled recordings to the newly configured PVR channels have occurred, in accordance with one embodiment of the invention.

FIG. 36 is a screen diagram of an example IPG screen 3600. As shown by the information banner 3640, the user in this example is presented with this IPG screen 3600 at 7:35 p.m. on Saturday, January 19th. Thus, the user can expect to see completely recorded media content instance listings in the PVR channels that were previously configured. As shown, the PVR channels that were configured include the Barney channel, the Past Six Hours channel, the News channel, and the Auburn basketball channel.

As described above, the user, at this point in time, has at his or her disposal completed recordings for several Barney episodes, an Auburn basketball game, a news program, and whatever would have been recorded in the past six hours from this time. Looking at the Past Six Hours channel 303, the Auburn basketball game listing 3621 is highlighted and has a double arrow icon on the right most side of this listing in the IPG screen 3600 to indicate that the duration of this recording extends beyond the hour and one-half duration shown in the IPG screen 3600. Note that the Auburn basketball channel 305 also includes this Auburn vs. Georgia basketball game as a media content instance listing. The user can scroll to the right by using the right navigation arrow button 386 on the remote control device 380 (FIG. 3B), which would result in the example IPG screen 3700 shown in FIG. 37. As illustrated in this IPG screen 3700, all of the listings for the mapped media content instances in the PVR channels have advanced and their corresponding blocks are positioned beneath the first column of the time area 3770. The positioning beneath the time area 3770 for the listings in the PVR channels 301, 302, 304, and 305 appear the same as in the example screen 3600, except with different time slots presented in the time area 3770. Since the Past Six Hours channel includes more recorded content than the other configured PVR channels, the listings for the Past Six Hours channels 303 continue to advance as the user scrolls in that row from the example screen 3600 to the example screen 3700.

Figure 39:
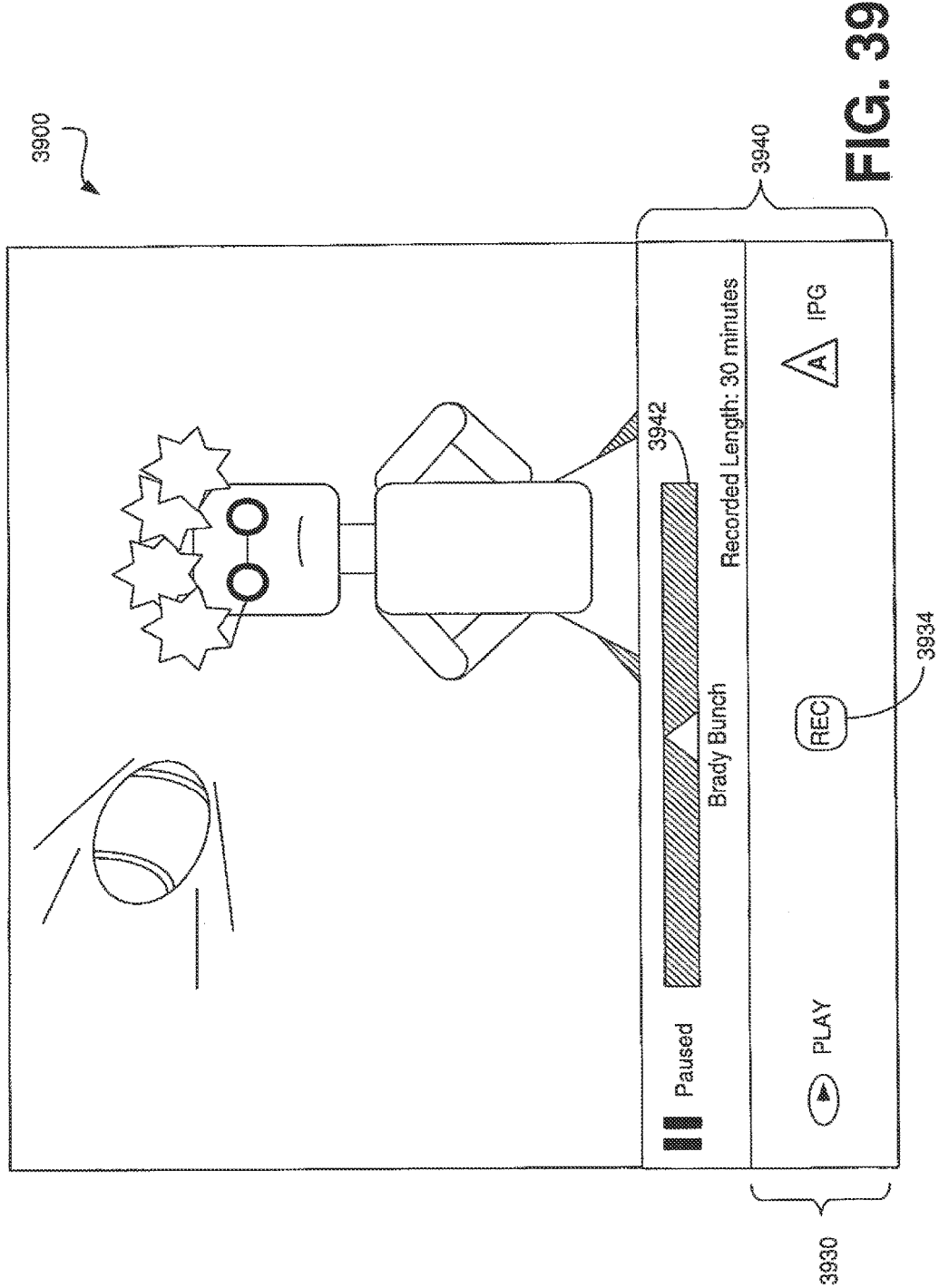
FIG. 39 is a screen diagram of an example screen display of a Brady Bunch episode selected for viewing from a PVR buffer channel in the example IPG screen shown in FIG. 38, in accordance with one embodiment of the invention.

FIG. 38 is a screen diagram of an example IPG screen 3800 that is used to illustrate media content instance listings for temporarily stored PVR media content (i.e., buffered media content instances). As shown here, two buffer PVR channels 321 and 322 are displayed in the IPG screen 3800, suggesting that two tuner buffers corresponding to the use of two tuners are employed in this example DHCT 16 (FIG. 3A). Greater or fewer numbers of buffers (and accordingly, greater or fewer numbers of media content instance listings and tuners) can be employed and be within scope of the preferred embodiments. In one implementation, as media content is buffered into the DHCT 16 (FIG. 3A), the listings for the corresponding buffered media content are inserted after the last listing corresponding to the media content instance last buffered, and thus the user preferably scrolls to the right of the IPG screen 3800 to access, view, and/or permanently record the media content instance corresponding to that listing. Accessing of media content from listings in the PVR buffer channel for display results in a time-shifted display presentation of the associated media content instance. In other embodiments, the most recent buffered media content instance can have a listing that is inserted at the left hand side of the IPG screen 3800. In one preferred embodiment, the user can highlight and select for permanent recording, from the IPG screen 3800, any of the media content instance listings among the PVR buffer channels 321 and 322. For example, assume the user is interested in permanently recording the Brady Bunch episode that has been buffered into PVR buffer 322. In one implementation, the user highlights the Brady Bunch listing and presses the record button 390 on the remote control device 380 (FIG. 3B), resulting in the displayed episode of the Brady Bunch, as illustrated in FIG. 39.

Figure 40:
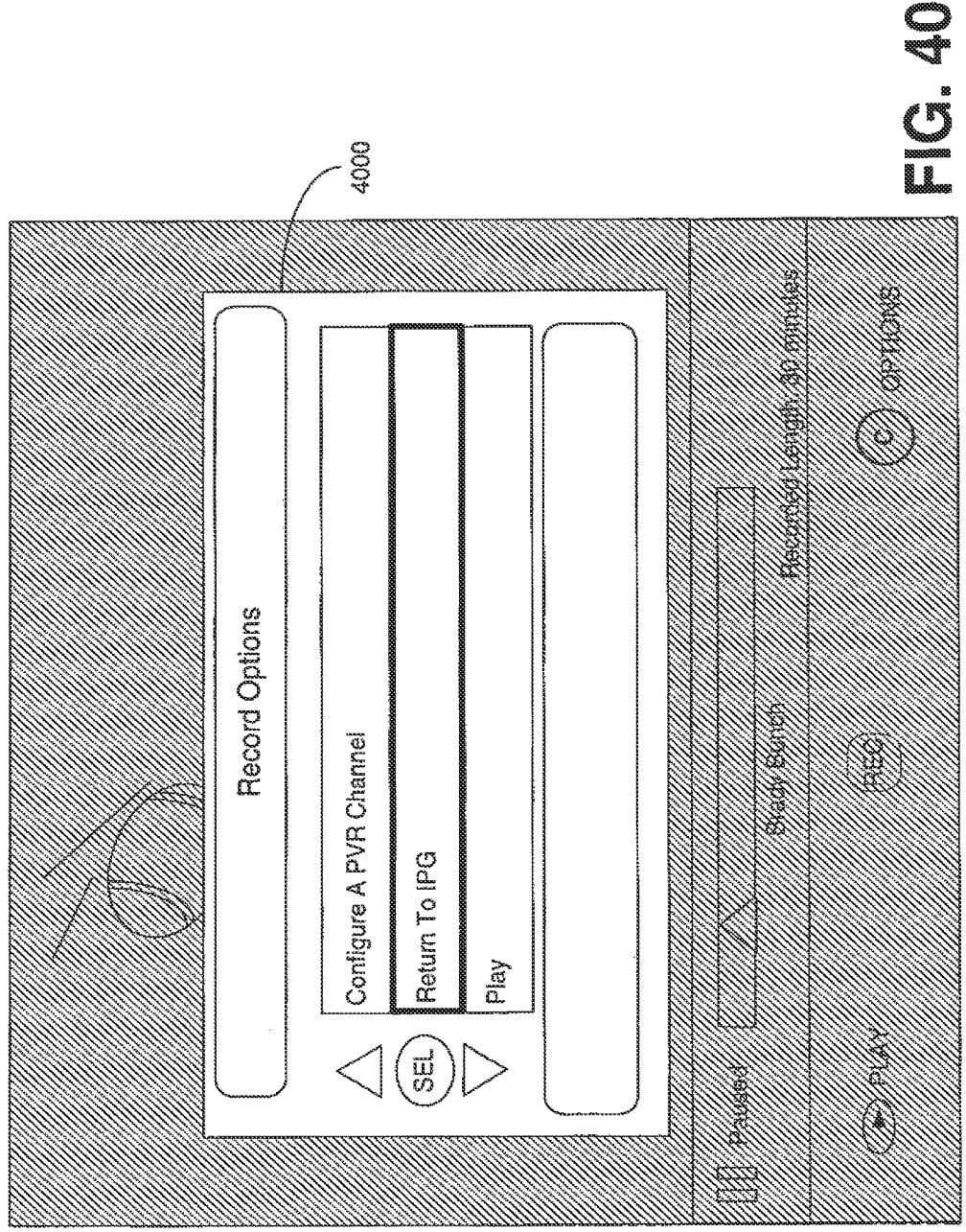
FIG. 40 is a screen diagram of an example record options screen resulting from the user selecting to permanently record the Brady Bunch episode shown in FIG. 39, in accordance with one embodiment of the invention.

In one implementation, since the user highlighted and selected the Brady Bunch listing at 5:15 p.m. (as shown in the information banner 3840 of FIG. 38), the display that is presented to the user shows the episode 15 minutes past the start of the scheduled presentation. In other implementations, the user selecting to record the Brady Bunch from the IPG screen 3800 can be presented with the beginning of that scheduled presentation. This feature can be user configurable in some embodiments. As shown in FIG. 39, the user is presented with a pause banner 3940, that includes a progress bar 3942 similar to that described for the example screen 800 in FIG. 8, except this screen 3900 corresponds to a temporary recording. The user is also presented with options to play, record, or return to the IPG screen as shown in the bottom header 3930. Assuming that the user desires to record this buffered episode of the Brady Bunch, the user selects the record button icon 3934, resulting in the record options screen 4000 illustrated in FIG. 40.

The record options screen 4000 is similar to that described already for FIG. 12. The user is presented with several options shown and not shown, including the option to configure a PVR channel (e.g., a Brady Bunch channel), or to just return to the IPG screen 3800 (FIG. 38), or the option to play the current episode of the Brady Bunch. By choosing to return to the IPG screen 3800, the Brady Bunch episode will preferably appear as a listing in the PVR channel 301, which has been described as a default or miscellaneous channel. Note that the Brady Bunch episode selected was actually buffered hours ago, and thus this recording procedure described above simply designates this episode from temporary to permanent.

The PVR application 377 and the IPG application 394 and associated IPG modules can be implemented in hardware, software, firmware, or a combination thereof. In the preferred embodiment(s), the PVR application 377 and the IPG application 394 and associated IPG modules are implemented in software or firmware that is stored in a memory and that is executed by a suitable instruction execution system. If implemented in hardware, as in an alternative embodiment, the PVR application 377 and the IPG application 394 and associated IPG modules may be implemented with any or a combination of the following technologies, which are all well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

The PVR application 377 and the IPG application 394 and associated IPG modules, which comprises an ordered listing of executable instructions for implementing logical functions, can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can contain, store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection (electronic) having one or more wires, a portable computer diskette (magnetic), a random access memory (RAM) (electronic), a read-only memory (ROM) (electronic), an erasable programmable read-only memory (EPROM or Flash memory) (electronic), an optical fiber (optical), and a portable compact disc read-only memory (CDROM) (optical). Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory.

It should be emphasized that the above-described embodiments of the present invention, particularly, any "preferred embodiments" are merely possible examples of implementations, merely setting forth a clear understanding of the principles of the inventions. Many variations and modifications may be made to the above-described embodiments of the invention without departing substantially from the spirit of the principles of the invention. All such modifications and variations are intended to be included herein within the scope of the disclosure and present invention and protected by the following claims.

What is claimed is:

1. A method for mapping media content information to an interactive program guide display, the method comprising:
    recording a media content instance on a storage device of a digital home communication terminal device, the recorded media content instance listed as a personal video recording in a personal video recording display channel;
    displaying the personal video recording display channel via an output system of the digital home communication terminal device that drives a display device, the personal video recording display channel included in the display of an interactive program guide, the interactive program guide comprising a plurality of channels identifying media content listings corresponding to future broadcasts of media content instances and in-progress broadcasts of media content instances and including a time area display section;
    enabling a configuration of the time area display section of the interactive program guide displayed via the output system for the display device, wherein the configuration comprises altering the time area display section of the interactive program guide while displaying the plurality of channels in the interactive program guide to depict a scrolling ticker banner upon highlighting the recorded media content instance on the personal video recording display channel; and
    selecting the recorded media content instance highlighted in the personal video recording display channel in the interactive program guide, accessing the recorded media content instance from the storage device, and playing back the recorded media content instance on the display device via the output system of the digital home communication terminal device.

2. The method of claim 1, wherein the configuration further comprises altering the time display area section of the interactive program guide to depict an index number corresponding to a number for a recorded sequence of the recorded media content instance.

3. An apparatus comprising:
    a communication interface of a digital communication terminal device to receive media content and program guide information relating to the media content:
    a storage device to record a media content instance, the recorded media content instance listed as a personal video recording in a personal video recording display channel;
    an output interface to drive an external display; and
    a processor configured to:
    drive the output interface providing display information comprising an interactive program guide including the personal video recording display channel, the interactive program guide further including a plurality of channels identifying media content listings corresponding to future broadcasts of media content instances and in-progress broadcasts of media content instances and including a time area display section;
    configure the time area display section in the interactive program guide wherein the time area display section of the interactive program guide is configured while displaying the plurality of channels in the interactive program guide to depict a scrolling ticker banner displayed upon highlighting of the recorded media content instance on the personal video recording display channel in the interactive program guide;
    retrieve the highlighted recorded media content instance from the storage device after the highlighted recorded media content instance is selected; and
    drive the output interface providing display content for the retrieved recorded media content instance to the external display.

4. The apparatus of claim 3, wherein the communication interface is a network interface to a headend providing the media content and the program guide information.

5. The apparatus of claim 3, wherein the output interface drives an interface to a television as a display device.

6. The apparatus of claim 3, wherein the processor is configured to alter the time area display section of the interactive program guide to depict an index number corresponding to a number for a recorded sequence of the recorded media content instance.

* * * * *